United States Patent [19]

Gerken et al.

[11] Patent Number: 4,951,417
[45] Date of Patent: * Aug. 28, 1990

[54] METHOD OF CONTAMINATED SOIL REMEDIATION AND APPARATUS THEREFOR

[75] Inventors: Steven L. Gerken; Brian M. Bell; John P. Isley, all of Valparaiso, Ind.

[73] Assignee: Canonie Environmental Services Corp., Porter, Ind.

[*] Notice: The portion of the term of this patent subsequent to Nov. 8, 2005 has been disclaimed.

[21] Appl. No.: 268,106

[22] Filed: Nov. 4, 1988

Related U.S. Application Data

[63] Continuation-in-part of Ser. No. 34,295, Apr. 3, 1987, Pat. No. 4,782,625.

[51] Int. Cl.⁵ .............................................. F23G 5/04
[52] U.S. Cl. ..................................... 47/1.42; 110/226; 110/228
[58] Field of Search ................ 47/58, 1.42, DIG. 10; 171/18; 110/226, 227, 228

[56] References Cited

U.S. PATENT DOCUMENTS

| | | | |
|---|---|---|---|
| 4,280,415 | 7/1981 | Wirguin et al. | 110/228 X |
| 4,351,250 | 8/1982 | Chartand | 110/228 X |
| 4,504,222 | 3/1985 | Christian | 110/228 X |
| 4,544,374 | 10/1985 | Mallele | 110/226 X |
| 4,606,283 | 8/1986 | DesOrmeaux | 110/228 X |
| 4,738,206 | 4/1988 | Noland | 110/228 X |
| 4,782,625 | 11/1988 | Gerken | 47/1.42 |
| 4,815,398 | 3/1989 | Keating et al. | 110/229 X |

Primary Examiner—Henry E. Raduazo
Assistant Examiner—Jerrold D. Johnson
Attorney, Agent, or Firm—Flynn, Thiel, Boutell & Tanis

[57] ABSTRACT

A method and apparatus for on-site remedial soil restortation activity of a work site contaminated with volatile organic compounds. Soil is removed from the ground and hauled to an initial feed hopper whereat it is conveyed to an inlet end of a hollow rotating cylinder having plural flights therein for effecting a moving of the contaminated soil lengthwise of the rotating cylinder toward an outlet end. The soil is heated as it tumbles about in the cylinder and the volatile organic compounds (VOCs) are volatilized inside the rotating cylinder. The soil exiting the outlet end of the cylinder is thence recirculated through the rotating cylinder and thereafter fed to a conveying mechanism, whereat the cleaned soil is delivered to a selected location. The hot gases are scrubbed to remove therefrom any organics, acids and phosgenes and, if present, soil fines. The now cleansed gases are thereafter allowed to escape into the atmosphere as clean air.

72 Claims, 25 Drawing Sheets

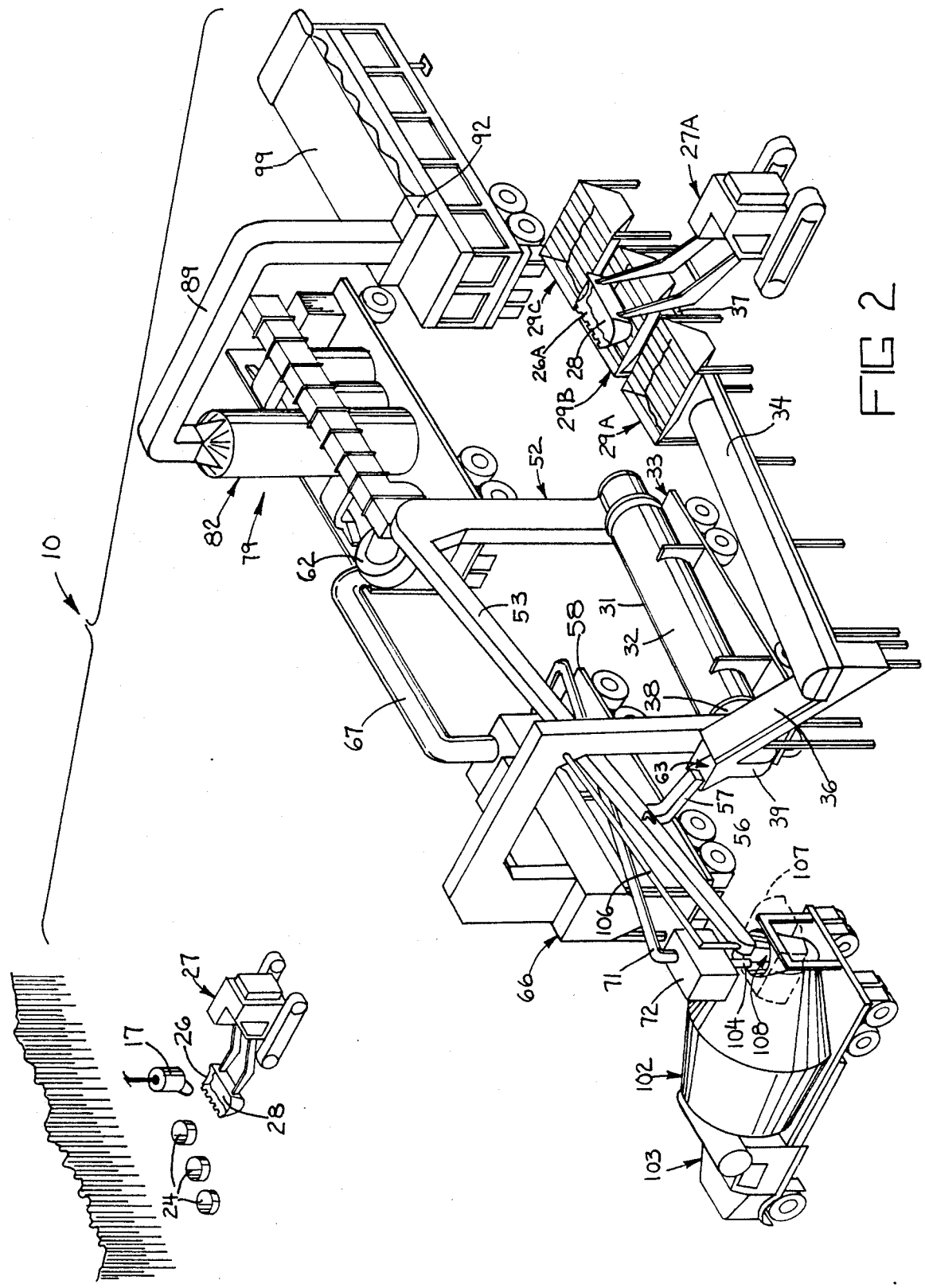

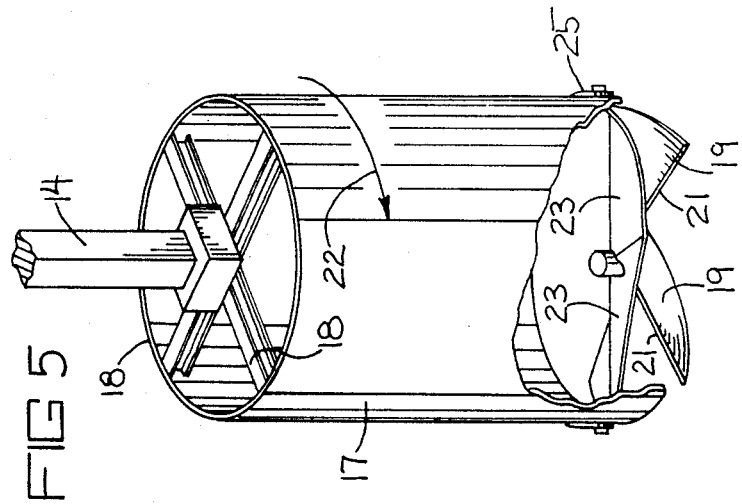
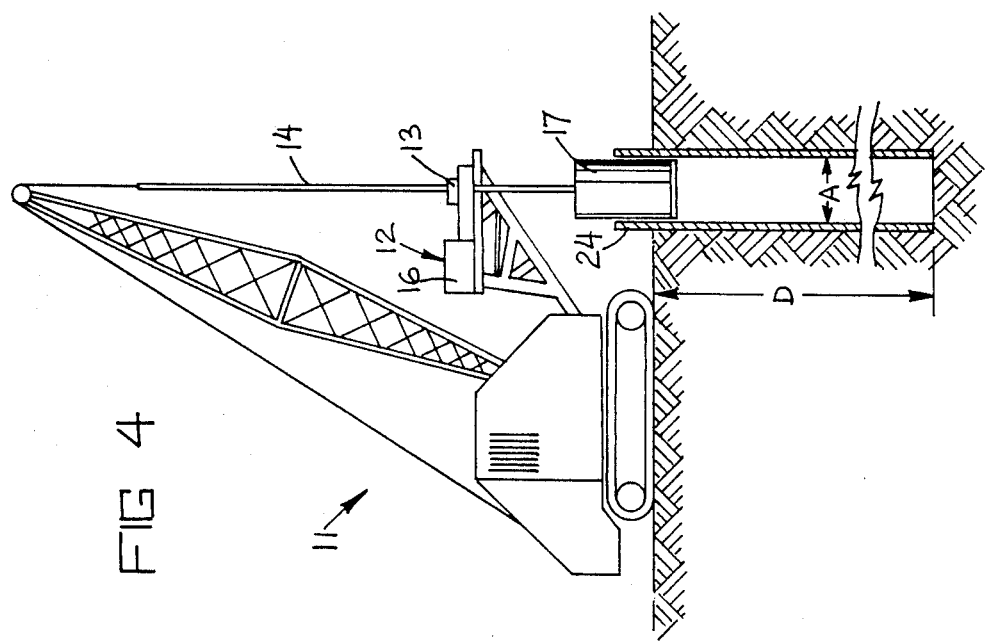

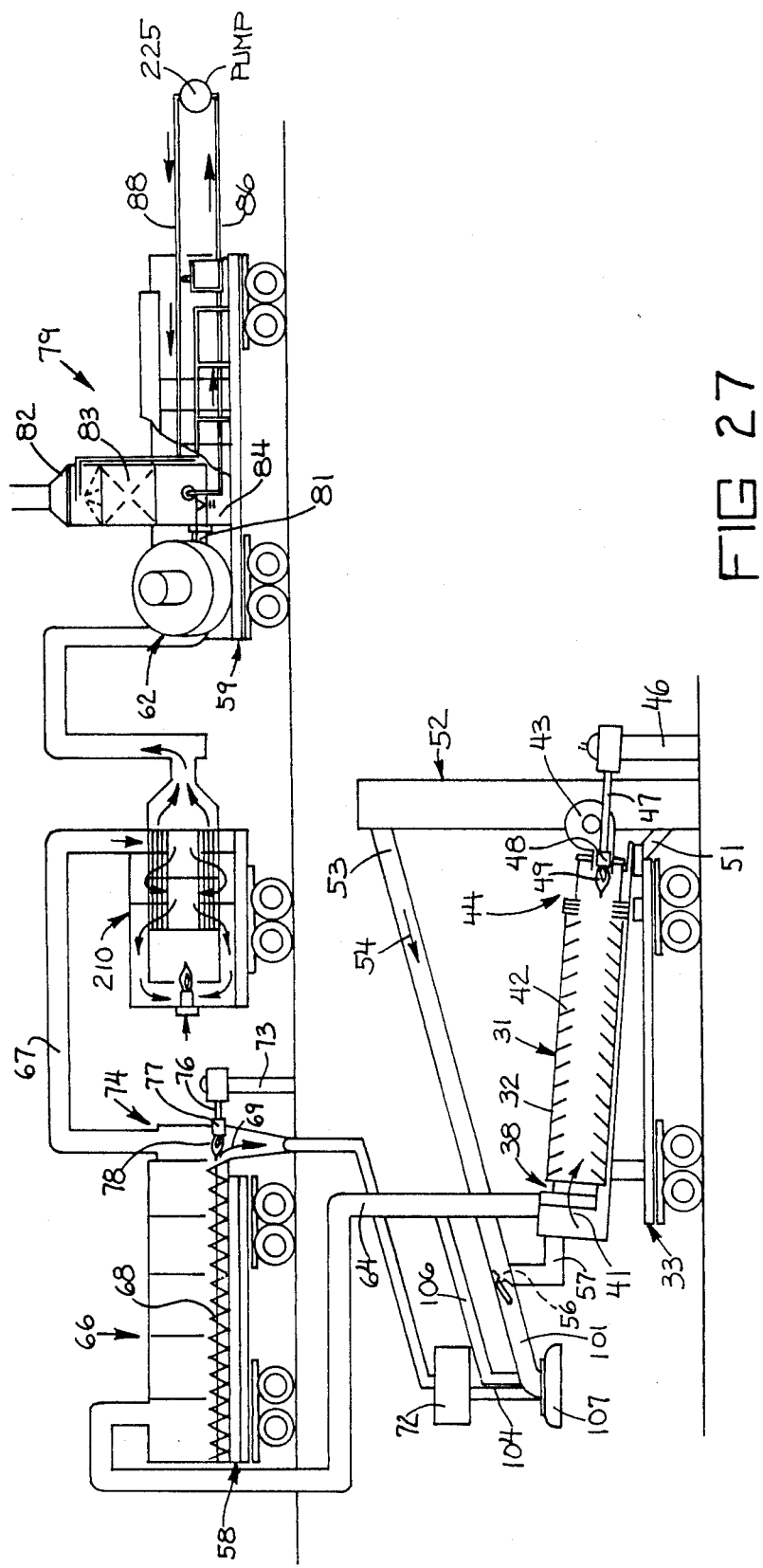

METHOD OF CONTAMINATED SOIL REMEDIATION AND APPARATUS THEREFOR

CROSS REFERENCE TO RELATED APPLICATION

This application is a continuation-in-part of application Ser. No. 034,295, filed on Apr. 3, 1987, now U.S. Pat. No. 4,782,625, issued Nov. 8, 1988.

FIELD OF THE INVENTION

This invention relates to a method and apparatus for facilitating an on-site remedial soil restoration activity of a work site contaminated with volatile organic compounds (VOCs), including halogenated hydrocarbons, petroleum hydrocarbons and derivatives of petroleum hydrocarbons, including halogenated petroleum hydrocarbons, and petroleum hydrocarbons substituted with, for example, alkyl, hydroxy, nitro, nitroso and other substituent groups disposed at the site at an earlier time, which volatile organic compounds (VOCs) have soaked into the soil.

BACKGROUND OF THE INVENTION

Remedial soil restoration activity on a given work site is generally problematic due to the hazardous chemicals released into the air during a handling of the soil. Generally, work sites with such chemicals in the soil, such as tank farms, gasoline stations, manufacturing sites and other land uses, are close to populated areas and, as a result, any volatilization of the chemicals into the air may be problematic from a health standpoint. Further, as the soil is handled, dust containing the chemicals will generally be developed and disperse into the local neighborhoods and create further problems.

Another problem associated with remedial soil restoration activity is that contaminated soil is generally removed from the site and hauled to a "safer" site for proper disposal. Objection is usually raised by local communities surrounding the new site thus introducing further problems with which to contend. It is feared by the local communities in and around the new site that their area will at some future date become contaminated by the contaminated soils introduced into their local landfill site.

Further, local communities near the existing work site are reluctant to allow, or opposed to, the long-term storage of untreated soils and/or wastes at the work site in "secure" impoundments due to a fear that the impoundments may eventually leak and again expose the soils and/or wastes to the environment. Finally, it is the intent of the Congress of the United States, as stated in the Superfund Amendments and Reauthorization Act of 1986 (PL 99-499), the United States Environmental Protection Agency, and many other regulatory agencies and citizens that the most appropriate response in the restoration of a work site is to treat the soil and/or waste on-site to reduce or eliminate the volume, toxicity, or mobility of chemicals in the soil and/or wastes and thereby effect a permanent remediation of the site.

Accordingly, it is an object of the present invention to provide both a method and an apparatus for on-site remedial soil restoration activity which allows a work site, contaminated with volatile organic compounds (VOCs) disposed or released at the site at an earlier time and permitted to soak into the soil, to be restored through the removal of the VOCs consistent with standards promulgated by appropriate regulatory agencies.

It is further the object of the invention to provide an on-site remedial soil restoration activity which is capable of maintaining ambient air quality at the site and of complying with relevant air quality standards as promulgated by appropriate regulatory agencies.

It is a further object of the invention to provide an on-site remedial soil restoration activity which is capable of entrapping all of the volatile organic compounds (VOCs) that might likely become airborne during a treatment of the soil as well as entrapping soil particles that may likely adversely impact ambient air quality.

It is a further object of the invention to provide an on-site remedial soil restoration activity utilizing trailerized equipment capable of being disassembled and trucked to other locations for remedial soil restoration activity.

It is a further object of the invention to provide an on-site remedial soil activity, for work sites containing large volumes of soil to be treated over the course of long periods of time, utilizing equipment which is generally constructed on permanent foundations, but may be disassembled and trucked to other locations for remedial soil restoration activity.

It is a further object of the invention to provide an on-site remedial soil restoration activity wherein the soils, which contain the volatile organic compounds (VOCs), are treated on-site and rendered harmless and thereafter collected, permitting a return of the treated soil back to the place from which it was excavated, or alternatively, to another location.

It is a further object of the invention to provide an on-site remedial soil restoration activity, as aforesaid, wherein the volatile organic compounds (VOCs) are collected in a form allowing a removal of the volatile organic compounds (VOCs) from the site for incineration or other purposes, thereby eliminating the problem associated with a placement of the organic compounds into another landfill site or the use of other less desirable disposal alternatives.

SUMMARY OF THE INVENTION

In general, the objects and purposes of the invention are met by providing a method and apparatus for on-site remedial soil restoration activity of a work site contaminated with volatile organic compounds (VOCs), including halogenated hydrocarbons, petroleum hydrocarbons and derivatives of petroleum hydrocarbons, including halogenated petroleum hydrocarbons, and petroleum hydrocarbons substituted with, for example, alkyl, hydroxy, nitro, nitroso and other substituent groups disposed at the site at an earlier time, which substances have been permitted to soak into the ground. The method and apparatus facilitate a removing of the soil from the ground and transmitting it to an initial feed hopper whereat it is conveyed to an inlet end of a low temperature thermal treatment chamber having a soil mixing capability. In addition, the method and apparatus facilitates a heating of the contaminated soil as it is mixed about in the thermal treatment chamber, the volatile organic compounds (VOCs) being volatilized inside the thermal treatment chamber. The interior of the thermal treatment chamber is evacuated by drawing hot gases out therefrom, which hot gases contain the volatile organic compounds (VOCs). The now cleaned soil is delivered to a selected location. The hot gases on the other hand are scrubbed clean by using air and a liquid to remove therefrom any organics, acids and phosgenes that might be present therein. The gases are thereafter discharged into the atmosphere.

BRIEF DESCRIPTION OF THE DRAWINGS

Further objects and purposes of this invention will be apparent to persons acquainted with methodology and apparatus of this general type upon reading the following specification and inspecting the accompanying drawings, in which:

FIG. 2 is a perspective view of the inventive apparatus;

FIG. 4 is a side elevational view of a caisson rig;

FIG. 5 is a front perspective view of a digging bucket which may be employed during the removal of the contaminated soil from the ground;

FIG. 27 is a side elevational view of a tenth alternate embodiment.

DETAILED DESCRIPTION

Figure 1A:
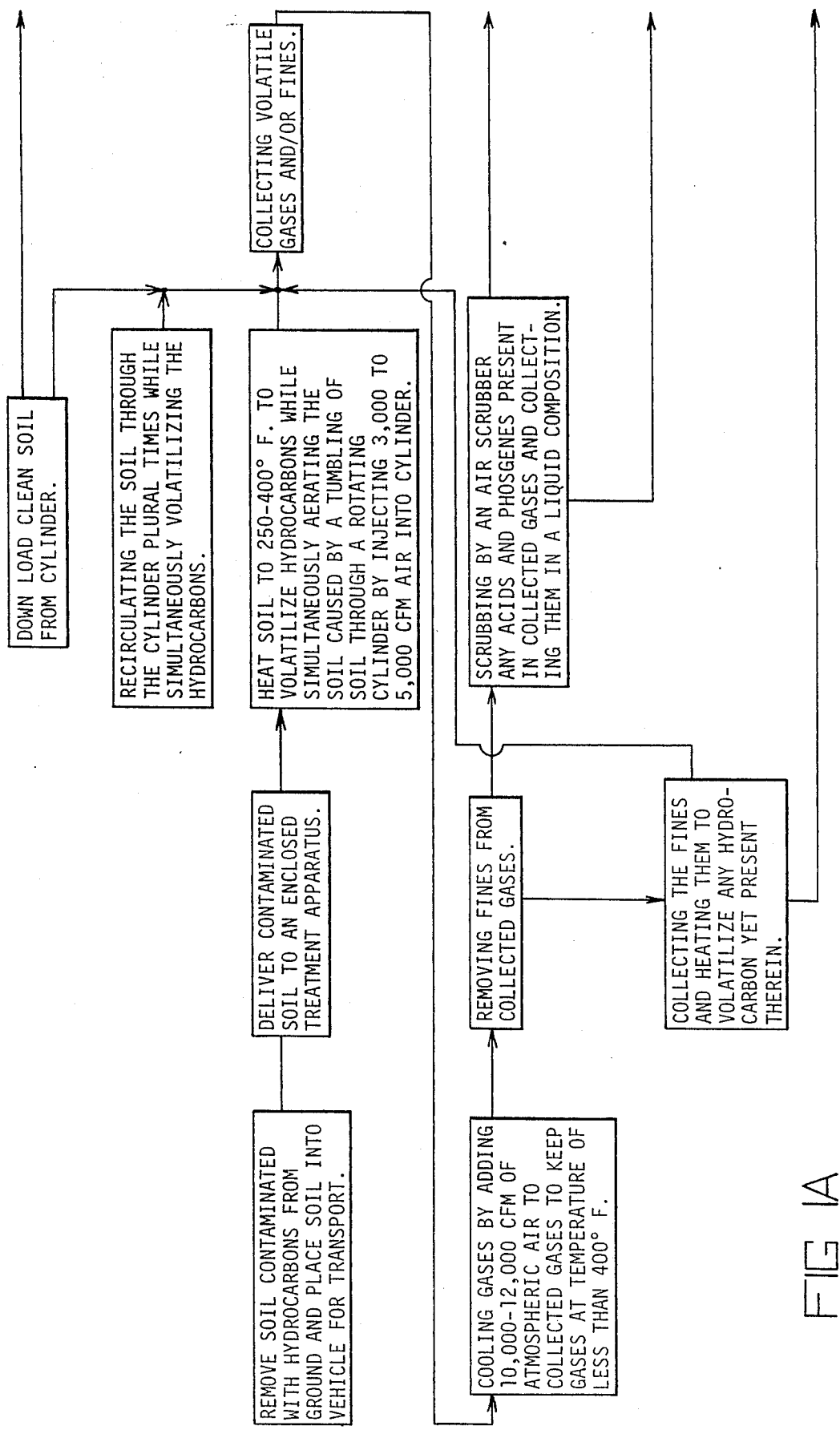
FIGS. 1A and 1B are a flow chart of the inventive methodology employed in the invention.

Certain terminology may be used in the following description for convenience in reference only and will not be limiting. The words "up", "down", "right" and "left" will designate directions in the drawings to which reference is made. The words "forward" and "rearward" will refer to the directions of material flow through the device, "forwardly" being the normal flow direction. The words "in" and "out" will refer to directions toward and away from, respectively, the geometric center of the device and designated parts thereof. Such terminology will include the words above specifically mentioned, derivatives thereof and words of similar import.

The apparatus employed in effecting an on-site remedial soil restoration activity is generally indicated by the reference numeral 10 in FIG. 2. The apparatus 10 includes a caisson rig 11 (FIG. 4) having a drilling attachment 12 affixed thereto. The drilling attachment has a hollow sleevelike member 13 adapted to receive therein a generally square kelly bar 14 therethrough. The sleeve 13 on the drilling attachment 12 has a square opening therethrough and in which is received the kelly bar 14. The drilling attachment 12 has a motor 16 thereon capable of driving the sleeve 13 for rotation and, thence, the kelly bar 14 for rotation.

As shown in FIG. 5, the kelly bar 14 is fixed to a digging bucket 17 which is generally a hollow cylindrical member having at the upper end thereof cross bracing 18. The lower end of the kelly bar 14 is secured by any conventional structure to the cross bracing 18 as shown. Plural digging flights 19 are provided at the bottom of the digging bucket 17. The digging flights 19 have a sharp edge 21 facilitating a digging of the flights into the earth as the digging bucket is rotated in the direction of the arrow 22. As soil is moved up by the digging flights 19 into the interior of the digging bucket 17, rubber check flaps 23 are provided so as to facilitate the passing of the soil into the interior of the digging bucket 17 but prevent soil from exiting the digging bucket 17 as it is lifted from the ground.

More specifically, the digging flights 19 and the heavy rubber check flaps 23 are mounted on a ring 25 which is attached to the digging bucket 17 by a hinge and a latch arrangement (not shown). When the soils have been brought to the surface and are ready to be unloaded, the crane operator releases the latch allowing the bucket bottom to hinge open, and the soils to discharge out of the digging bucket 17. The operator then re-latches the hinged bottom to the digging bucket 17 and the excavation cycle is repeated as necessary. The aforementioned digging bucket is of a conventional design and, as a result, further discussion of the specific structure of the digging bucket is believed unnecessary.

A casing 24 (FIGS. 2 and 4) is first placed into the ground to a specified depth D. The depth to which the casing will be placed is determined by preliminary testing of the soil to determine the depth at which the contaminated soil lies. A conventional casing length is generally about 20 feet. Each casing has an outer diameter A. The internal diameter of the interior of the casing is slightly greater than the external diameter of the digging bucket 17. Adjacent casings are also placed into the ground and in a common row and are spaced from one another a distance A, centerline to centerline of each casing. As a result of this spacing, the casings can be emptied of the soil contained therein by lowering the digging bucket 17 into a selected one of the casings as shown in FIG. 4 and rotated to cause soil to enter the interior of the digging bucket 17. The caisson rig 11, following a filling of the digging bucket 17, raises the digging bucket 17 from the ground and swings it to a bucket 26 on a front end loader 27. A tarp or the like (not illustrated) is placed over the bucket 26 during transit of the front end loader to the location of a front end loader 27A illustrated in FIG. 2 whereat the bucket 26A filled with contaminated soil 28 is dumped into one of several hoppers 29A, 29B or 29C. The provision of multiple hoppers 29A, 29B and 29C facilitate a continued operation of the front end loader during periods of time that contaminated soil is being removed from a respective one of the hoppers. That is, appropriate gating is utilized on each hopper to allow only the contaminated soil of one hopper to be removed therefrom at a time.

Figure 3:
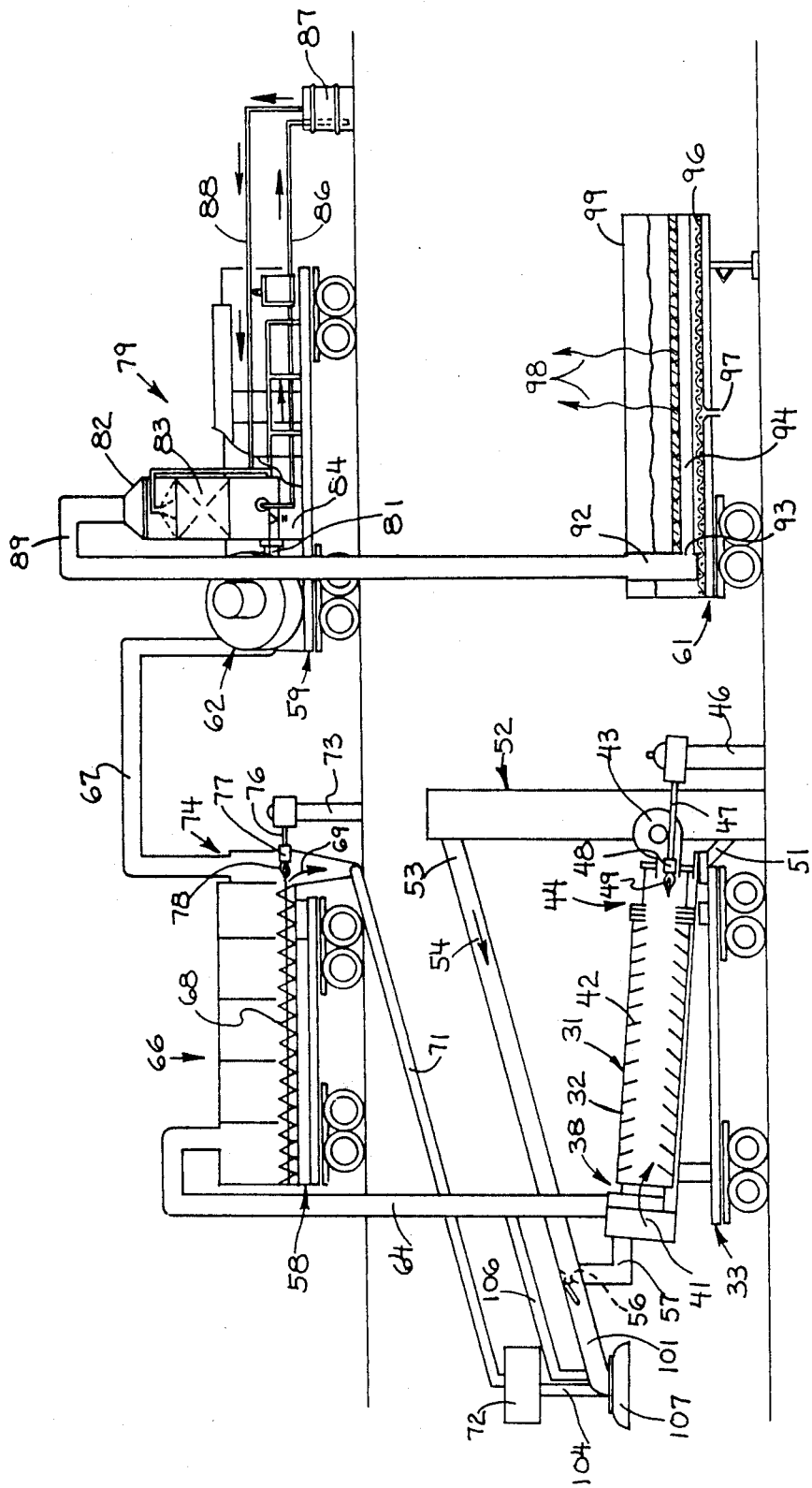
FIG. 3 is a side elevational view of the inventive apparatus.

A materials dryer 31 is provided and includes a rotatably supported and elongated hollow cylinder 32. Rotating cylinders are known and, therefore, the specific drive arrangement for effecting a rotation of the cylinder 32 is not shown. Reference can be made and incorporated herein, however, to the structure supporting an elongate and hollow cylinder for rotation in U.S. Pat. No. 4,285,773. The cylinder 32 may be mounted on the bed of a semi-truck trailer 33 to allow easy movement of the materials dryer 31 to any convenient location on a given site as well as between respective sites. The materials dryer 31 is inclined upwardly from right to left (FIG. 3) with the inlet end being at the left end and the material outlet being at the right end. A covered material conveyor 36 is located near the discharge of the integrally mounted and covered material conveyor 34, which extends beneath the outlet openings of the respective hoppers 29A, 29B and 29C. Conveyor 34 discharges the soil placed in the hoppers onto the receiving end of conveyor 36. Conveyor 36 conveys the soil up to chute 39 at the inlet end 38 of the materials dryer 31. The materials conveyor 36 dumps into an inlet chute 39 which delivers contaminated soil to the interior of the materials dryer 31 at the inlet end 38 in the direction of the arrow 41 (FIG. 3). The inside of the materials dryer 31 has a plurality of material conveying flights 42 which serve to lift the contaminated soil as the cylinder 32 is rotated and cause it to fall from the top portion of the arc as the cylinder 32 is rotated. This tumbling action of the contaminated soil is an important facet of the materials dryer 31. A blower 43 is provided at the outlet end 44 of the materials dryer 31 and introduces fresh air into the outlet end 44 and at a rate that is approximately 3000 cfm, but may vary depending upon size of the cylinder 31 utilized. In addition, a fuel tank 46 is provided adjacent the outlet end 44. Fuel is delivered through an appropriate conduit 47 to a burner nozzle 48 whereat the fuel is atomized and ignited to produce a flame 49. The combined effect of the flame 49 and the fresh air from the blower 43 travels lengthwise of the materials dryer 31 toward the inlet end 38. This flame commonly effects a heating of the soil to a range of 250° F. to 400° F., as measured by the temperature of the exiting material at the outlet end. The burner, in the preferred embodiment, consumes approximately two gallons of No. 2 diesel fuel per dry ton of material processed. The heat produced in the materials dryer 31 effects a volatilizing of the VOCs from the soil. The volatilized organic compounds are collected in a gaseous form by structure that will be described in more detail below.

Treated soil exits the outlet end 44 of the materials dryer 31 through a chute 51 to an elevator 52 which lifts the treated soil vertically upwardly (as by plural buckets not shown) and delivers the treated soil to a further chute 53. The treated soil travels down the chute 53 in direction of the arrow 54 to a gate 56 which directs the soil through a still further chute 57 into the inlet end 38 of the materials dryer. Thus, the treated soil is recirculated multiple times through the materials dryer 31 to effect a nearly complete volatilization of all VOCs contained in the contaminated soil.

As stated above, contaminated soil, in discrete volumes generally totalling approximately three cubic yards, is processed at a single time. This means that the operation of the apparatus is completed on a batch basis, with the soil batch recirculated through the materials dryer 31 until satisfactory treatment is obtained.

In the preferred embodiment, the dryer 31 is approximately seven feet in diameter and 28 feet in length. The cylinder 32 normally rotates at a rate of six revolutions per minute and has approximately 15 flights inside the drum to promote the mixing of the soil and the exposure of the soil to the hot air forced into the drum by the burner unit. The cold, damp soil is fed into the elevated inlet end of the cylinder 32 and is dried as it slowly works its way to the low outlet end of the cylinder. Under normal operating conditions, the materials dryer 31 processes about two tons of soil per minute with operating temperatures as aforesaid. The materials dryer will provide the most efficient aeration of the soils. The rotation and mixing of the soils by the longitudinal flights will promote intimate contact of the soils with heated fresh air within an enclosed environment. The retention time of the soils within the dryer may be varied by adjusting the angle of inclination of the cylinder.

In addition to the materials dryer trailer 33, there is a baghouse trailer 58, an air scrubber trailer 59 and a carbon adsorption unit trailer 61. A blower unit 74 is mounted on, in this particular embodiment, the baghouse trailer 58. Fresh air is drawn into an inlet 63 (FIG. 2) adjacent the inlet end 38 of the materials dryer 31 as well as the air from the blower unit 43, and conduits or chutes 51, 57, 101 and 106 into a conduit 64, through a baghouse filter arrangement 66 on the baghouse trailer 58 by the blower 74. Thus, any dust that may likely be generated as material from hoppers 29A, 29B and 29C is delivered to the inlet end 38 of the materials dryer 31 or as material is recycled through chute 57 or as material is discharged through chute 101 will be prevented from exiting the opening 63 or escaping from around shroud 107 by the suction force generated by blower 74. In addition, the hot volatilized gases generated in the materials dryer 31 will exit the materials dryer 31 into the conduit 64 and enter the baghouse arrangement 66. Material fines will be removed from the volatilized gases by the filtering structure in the baghouse arrangement 66. Generally, the baghouse arrangement is of a conventional design and requires no further discussion other than to state that inflatable bags are present in the baghouse arrangement 66, which bags trap material fines and allow the volatilized gases to continue their passage to the blower 74. Periodically, the bags in the baghouse arrangement are pulsed by compressed air and the material fines collected on the bags are dislodged and permitted to drop therefrom into a trough in which an auger 68 is provided. The auger removes the material fines from the baghouse arrangement 66, in the direction of arrow 69, and introduces them into an auger 71 and thence to a slurry box 72 whereat the material fines are mixed into a slurry form.

A fuel tank 73 is provided adjacent the blower 74 of the baghouse arrangement 66. Fuel is supplied through a conduit 76 to a nozzle 77 whereat the fuel is atomized and ignited to produce a flame 78. The flame acts directly on the material fines as they exit the baghouse arrangement 66 to volatilize any volatile organic compounds (VOCs) that may yet remain on the material fines prior to their introduction into the auger 71 for delivery to the slurry box 72.

The fresh air introduced into the opening 63 will effectively cool the hot gases exiting from the materials dryer 31 and to a sufficient extent such as to not damage the material of the bags in the baghouse arrangement 66. The blower 74 will operate in the range of 10,000 to 15,000 cfm so that the total air flow through the baghouse arrangement 66 will be approximately 15,000 cfm.

An air scrubber unit 79 is mounted on the air scrubber trailer 59. A blower unit 62 is mounted on, in the preferred embodiment, the air scrubber trailer 59, and draws air through conduit 67 from blower 74. The air scrubber unit 79 is of a conventional design and, therefore, further detailed comment concerning its structure is believed unnecessary. Nevertheless, it should be sufficient to state that the outlet conduit 81 from the blower unit 62 enters the bottom end of an air scrubber tower 82 and moves upwardly through a packing 83 therein while liquid passes downwardly through the packing and collected in a reservoir 84 at the bottom portion of the tower 82. The volatilized gases passing up through the packing 83 will have removed therefrom any organics, acids or phosgenes that may have collected in the volatilized gases following a passage of the contaminated material through the materials dryer 31. Periodically, the liquid collected in the reservoir 84 is delivered through a conduit 86 to a carbon adsorption unit 87 whereat the liquid is circulated therethrough for the purpose of removing organics. The liquid then returns via the conduit 88 to the top of the packed tower 82 for purposes of recirculating the now cleansed liquid back through the packing 83 for purposes of collecting further organics, acids and phosgenes.

The air blown up through the packed tower 82 exits the tower via a conduit 89 and is delivered to a carbon adsorption unit 90 on a carbon adsorption unit trailer 61 whereat there is provided a bed of activated carbon. A plenum or manifold structure 92 with each conduit 94 covered with a mesh of fabric to prevent entry of the activated carbon to the interior of the conduit 94 is provided adjacent one end of the trailer 61 and the conduit 89 introduces the volatilized gases into the plenum 92. Plural outlet openings 93 are provided adjacent the bottom of the plenum, to each of which is connected an elongated and perforated hose or conduit 94. In the preferred embodiment, there are a total of four conduits 94 extending lengthwise of the trailer and from the bottom of the plenum 92. The conduits 94 are mounted on a mesh 96 so as to elevate the conduits 94 from the bed of the trailer 61. Any moisture collecting within the carbon adsorption unit trailer 61 will be permitted to drop onto the mesh 96 and eventually make its way to an exhaust opening 97 to facilitate a removal of the collected moisture from within the trailer 61. The volatilized gases will pass through the activated carbon bed 91 in direction of the arrows 98 for the purpose of removing the volatile organics from the gas allowing, therefore, only clean air to enter the atmosphere. A canvaslike top 99 may be placed over the top of the bed of activated carbon to prevent water from collecting on the carbon bed from snow, rain or the like.

As indicated by the foregoing discussion, it should be apparent that none of the volatilized gases are permitted to escape into the atmosphere. All of the volatilized gases are drawn into the baghouse arrangement 66 and thence the air scrubber unit 79 and thence the carbon adsorption unit 90 for purposes of removing organics and the like therefrom. Thus, only clean air is permitted to enter the atmosphere as schematically represented by the arrows 98 in FIG. 3.

Following the processing of a batch of soil in the materials dryer 31, the gate 56 effects a closing of the inlet to the chute 57 and an opening of the conduit 53 to allow an emptying of the materials dryer 31 through a chute section 101 into the cement mixer drum 102 of a cement mixer vehicle 103. Simultaneously, the slurry box 72 is emptied through a conduit 104 into the cement mixer drum 102. Any dust generated by this dumping process into the cement mixer drum 102 is drawn through a conduit 106 into the conduit 64. A shroud 107 is provided to cover the opening 108 into the cement mixer drum 102. The cement mixer vehicle rotates the cement mixing drum 102 to effect a thorough mixing of the dry and treated soil exiting the materials dryer 31 with the slurry emptied from the slurry box 72. In addition, a supply of cement is introduced into the cement mixing drum 102 along with any additional water that may be needed so that the aggregate can be thoroughly mixed as the vehicle moves toward the casings 24. Once the vehicle arrives at the casings 24, and following a thorough mixing of the aggregate within the cement mixing drum 102, the contents of the cement mixing drum 102 is emptied into an appropriate one of the casings 24 from which contaminated soil has been removed. Thereafter, the aggregate in the casing 24 is permitted to harden and become a stable item in the soil. Following the discharge of the aggregate, the casing 24 is removed from the ground leaving the aggregate, in a columnar form, which stabilizes into a self-supporting mass of now clean soil and cement. The casing so removed from the ground can be reused by replacing into the ground between two adjacent casings since, as stated above, sufficient space has been provided between the casings to allow this to take place. A careful spacing of the initial casings placed into the ground will enable further casings to be placed therebetween so that virtually all of the contaminated soil from a region within the ground can be excavated and treated by the above discussed apparatus.

If heavy metals and the like are not present in the cleaned soil, a mixing of the soil with cement is deemed not necessary. The cleaned soil can be conveyed direct to a selected location and returned to the ground.

Atmospheric air around the work site is continuously monitored by conventional air monitoring equipment, not shown. If at any time during the operation of the aforementioned apparatus there should be a detection of emissions in excess of a predefined limit, an alarm will be sounded and the operation will be brought to a halt until the presence of the emissions is dissipated.

Figure 1B:
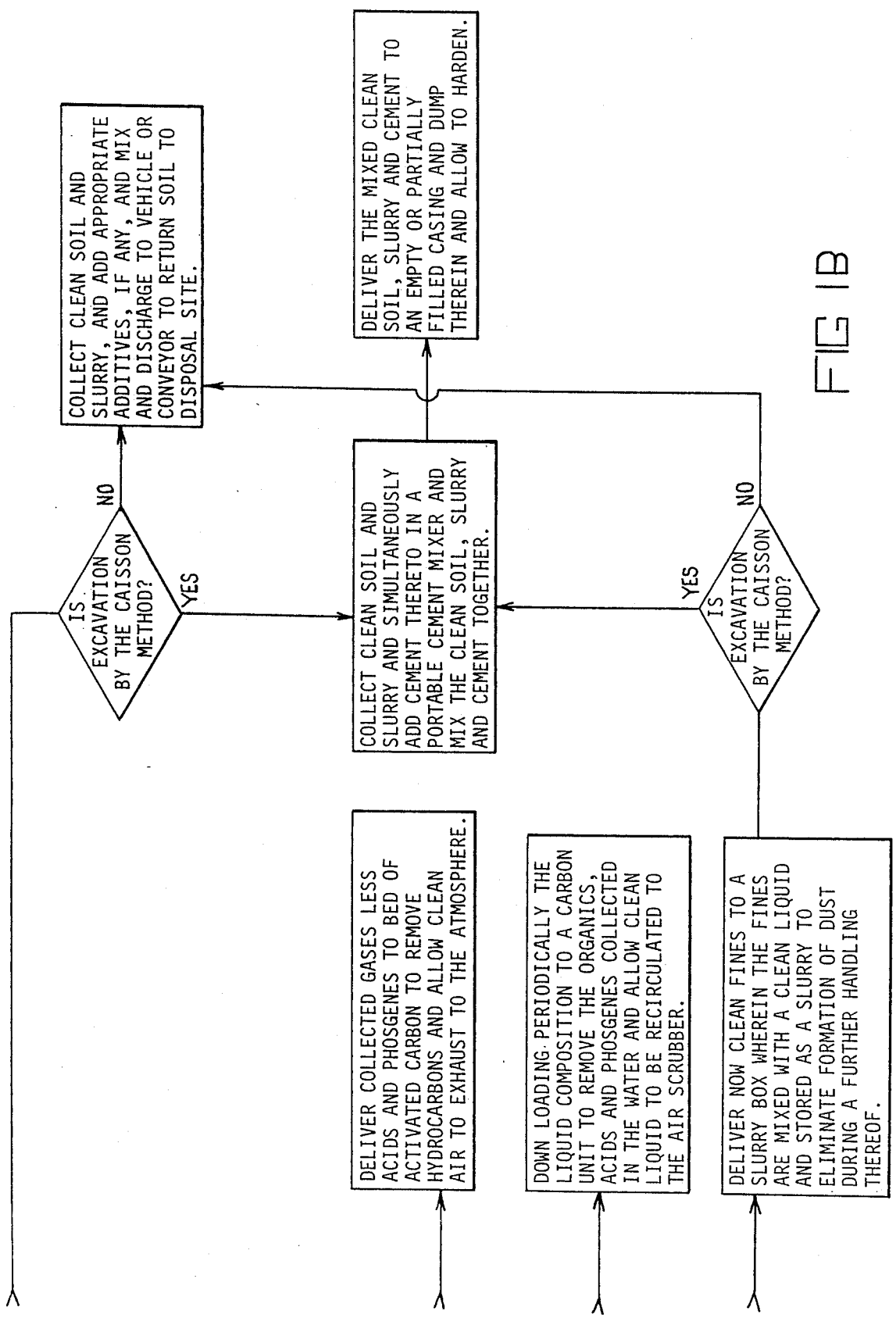

As is shown in FIGS. 1A and 1B, the methodology employed by the above-discussed apparatus is shown therein. Each of the method steps has been described above and, therefore, further discussion thereof is believed unnecessary.

EXAMPLE

Tests of the method have been performed at the McKin Superfund Site at Gray, Maine. In a first series of tests, soil samples were taken from various locations within test zones at the McKin Site, which zones had been previously identified as being contaminated with organic soil contaminants. The soil test samples from the different locations contained different concentrations of the contaminants. The soil test samples were each treated by the method according to the invention, wherein the soil test samples were passed through the materials dryer three times. No appreciable change in the data occurred when a soil sample was passed through the materials dryer for a fourth time. U.S. EPA methods 8020 and 8010 were used to measure the concentrations of various volatile organic compounds in soil samples, before and after the soil samples were treated by the method according to the invention. The test results are set forth in the following Table I.

TABLE I

COMPARISON OF PRETREATMENT AND POST-TREATMENT SOIL CHARACTERIZATION
LOW TEMPERATURE THERMAL AERATION PROCESS
MCKIN SUPERFUND SITE
GRAY, MAINE

| SAMPLE I.D. | 31368.9 Pretreatment | 31368.9 Post-treatment | 31683.9 Pretreatment | 31683.9 Post-treatment | 32083.5 Pretreatment | 32083.5 Post-treatment | 32077.5 Pretreatment | 32077.5 Post-treatment |
|---|---|---|---|---|---|---|---|---|
| Type | Location 1 | | Location 2 | | Location 3 | | Location 4 | |
| U.S. EPA Method 8020 | | | | | | | | |
| Benzene | ND 10. | ND 1. | ND 10. | ND 1. | ND 5. | ND 1. | ND 10. | ND 1. |
| Chlorobenzene | ND 1 | | ND 0.02 | | ND 0.1 | | ND 0.2 | |
| 1,2-Dichlorobenzene | ND 1 | ND 0.02 | 16 | ND 0.02 | 300 | ND 0.02 | 15 | ND 0.02 |
| 1,3-Dichlorobenzene | ND 1 | ND 0.02 | | ND 0.02 | | ND 0.02 | | ND 0.02 |
| 1,4-Dichlorobenzene | ND 1 | ND 0.02 | | ND 0.02 | | ND 0.02 | | ND 0.02 |
| Ethylbenzene | 28 | ND 1. | 20 | ND 1. | 130 | ND 1. | ND 10. | ND 1. |
| Toluene | 35 | ND 1. | ND 10. | ND 1. | ND 5. | ND 1. | ND 10. | ND 1. |
| Xylenes | 84 | ND 1. | 38 | ND 1. | 840 | ND 1. | ND 10. | ND 1. |
| U.S. EPA Method 8010 | | | | | | | | |
| Bromodichloromethane | ND 0.02 | | ND 0.02 | | ND 0.1 | | ND 0.2 | |
| Bromoform | ND 0.02 | | ND 0.02 | | ND 0.1 | | ND 0.2 | |
| Bromomethane | ND 0.02 | | ND 0.02 | | ND 0.1 | | ND 0.2 | |
| Carbon Tetrachloride | ND 0.02 | | ND 0.02 | | ND 0.1 | | ND 0.2 | |
| Chlorobenzene | ND 0.02 | | ND 0.02 | | ND 0.1 | | ND 0.2 | |
| Chloroethane | ND 0.02 | | ND 0.02 | | ND 0.1 | | ND 0.2 | |
| 2-Chloroethylvinyl ether | ND 0.02 | | ND 0.02 | | ND 2 | | ND 0.2 | |
| Chloroform | ND 0.02 | | ND 0.02 | | ND 0.1 | | ND 0.2 | |
| Chloromethane | ND 0.02 | | ND 0.02 | | ND 0.1 | | ND 0.2 | |
| Dibromochloromethane | ND 0.02 | | ND 0.02 | | ND 0.1 | | ND 0.2 | |
| 1,2-Dichlorobenzene | ND 0.02 | | 16 | ND 0.02 | 300 | ND 0.02 | 15 | ND 0.02 |
| 1,3-Dichlorobenzene | ND 0.02 | | | ND 0.02 | | ND 0.02 | | ND 0.02 |
| 1,4-Dichlorobenzene | ND 0.02 | | | ND 0.02 | | ND 0.02 | | ND 0.02 |
| Dichlorodifluoromethane | ND 0.02 | | | | | | | |
| 1,1-Dichloroethane | ND 0.02 | | | | | | | |
| 1,2-Dichloroethane | ND 0.02 | | | | | | | |
| 1,1-Dichloroethene | ND 0.02 | | | | | | | |
| trans-1,1-Dichloroethene | ND 0.02 | ND 0.02 | | ND 0.02 | | ND 0.02 | | ND 0.02 |
| 1,2-Dichloropropane | ND 0.02 | | | | | | | |
| cis-1,3-Dichloropropene | ND 0.02 | | | | | | | |
| trans-1,3-Dichloropropene | ND 0.02 | | | | | | | |
| 1,1,2,2-Tetrachloroethane | ND 0.02 | | | | | | | |
| Tetrachloroethane | 0.09 | ND 0.02 | ND 0.02 | ND 0.02 | 40 | ND 0.02 | 15 | ND 0.02 |
| 1,1,1-Trichloroethane | 0.13 | ND 0.02 | 0.04 | ND 0.02 | 1.1 | ND 0.02 | | ND 0.02 |
| 1,1,2-Trichloroethane | ND 0.02 | | ND 0.02 | | ND 0.1 | | ND 0.2 | |
| Trichloroethene | 7.3 | ND 0.02 | 20 | ND 0.02 | 650 | | 0.35 | ND 0.02 |
| Trichlorofluoromethane | ND 0.02 | | ND 0.02 | | ND 0.1 | | 0.54 | 0.04 |
| Vinyl chloride | ND 0.02 | | ND 0.02 | | ND 0.1 | | ND 0.2 | |
| Methylene chloride | ND 0.02 | | ND 0.02 | | ND 0.1 | | 0.53 | |

| SAMPLE I.D. | 32073.5 Pretreatment | 32073.5 Post-treatment | 32068.5 Pretreatment | 32068.5 Post-treatment | 32365.3 Pretreatment | 32365.3 Post-treatment | 32483.5 Pretreatment | 32483.5 Post-treatment |
|---|---|---|---|---|---|---|---|---|
| Type | Location 5 | | Location 6 | | Location 7 | | Location 8 | |
| U.S. EPA Method 8020 | | | | | | | | |
| Benzene | ND 10. | ND 1. | ND 1. | ND 1. | | 2.7 | ND 100 | ND 1. |
| Chlorobenzene | ND 0.2 | | ND 0.02 | | ND 0.02 | ND 1. | ND 2 | |
| 1,2-Dichlorobenzene | 43 | ND 0.02 | 320 | ND 0.02 | 33 | ND 0.02 | 31 | ND 0.02 |

TABLE I-continued

| | 32683.5 Pretreatment | 32683.5 Post-treatment | 32678.5 Pretreatment | 32678.5 Post-treatment | 32673.5 Pretreatment | 32673.5 Post-treatment | 32668.5 Pretreatment | 32668.5 Post-treatment |
|---|---|---|---|---|---|---|---|---|
| SAMPLE I.D. Type | Location 9 | | Location 10 | | Location 11 | | Location 12 | |
| 1,3-Dichlorobenzene | ND 0.2 | ND 0.02 | ND 0.02 | ND 0.02 | | | ND 2 | ND 0.02 |
| 1,4-Dichlorobenzene | ND 0.2 | ND 0.02 | ND 0.02 | ND 0.02 | | | ND 2 | ND 0.02 |
| Ethylbenzene | ND 10. | ND 1. | ND 1. | ND 1. | 1.8 | ND 1. | | ND 1. |
| Toluene | 19 | ND 1. | 72 | ND 1. | 4 | | 130 | ND 1. |
| Xylenes | 44 | ND 1. | 160 | ND 1. | 12.9 | | 140 | ND 1. |
| U.S. EPA Method 8010 | | | | | | | | |
| Bromodichloromethane | ND 0.2 | | ND 1 | | ND 4 | | ND 2 | |
| Bromoform | ND 0.2 | | ND 1 | | ND 4 | | ND 2 | |
| Bromomethane | ND 0.2 | | ND 1 | | ND 4 | | ND 2 | |
| Carbon Tetrachloride | ND 0.2 | | ND 1 | | ND 4 | | ND 2 | |
| Chlorobenzene | ND 0.2 | | ND 1 | | ND 4 | | ND 2 | |
| Chloroethane | ND 0.2 | | ND 1 | | ND 4 | | ND 2 | |
| 2-Chloroethylvinyl ether | ND 0.2 | | ND 1 | | ND 4 | | ND 2 | |
| Chloroform | ND 0.2 | | ND 1 | | ND 4 | | ND 2 | |
| Chloromethane | ND 0.2 | | ND 1 | | ND 4 | | ND 2 | |
| Dibromochloromethane | ND 0.2 | | ND 1 | | ND 4 | | ND 2 | |
| 1,2-Dichlorobenzene | 43 | ND 0.02 | 320 | ND 0.02 | 33 | ND 0.02 | 30 | ND 0.02 |
| 1,3-Dichlorobenzene | ND 0.2 | ND 0.02 | ND 1 | | ND 4 | | ND 2 | |
| 1,4-Dichlorobenzene | ND 0.2 | ND 0.02 | ND 1 | | ND 4 | ND 0.02 | ND 2 | |
| Dichlorodifluoromethane | ND 0.2 | | ND 1 | | ND 4 | | ND 2 | |
| 1,1-Dichloroethane | ND 0.2 | | ND 1 | | ND 4 | | ND 2 | |
| 1,2-Dichloroethane | ND 0.2 | | ND 1 | | ND 4 | | ND 2 | |
| 1,1-Dichloroethene | ND 0.2 | | ND 1 | | ND 4 | | ND 2 | |
| trans-1,1-Dichloroethene | ND 0.2 | ND 0.02 | 6.1 | ND 0.02 | ND 4 | ND 0.02 | ND 2 | ND 0.02 |
| 1,2-Dichloropropane | ND 0.2 | | ND 1 | | ND 4 | | ND 2 | |
| cis-1,3-Dichloropropene | ND 0.2 | | ND 1 | | ND 4 | | ND 2 | |
| trans-1,3-Dichloropropene | ND 0.2 | | ND 1 | | ND 4 | | ND 2 | |
| 1,1,2,2-Tetrachloroethane | ND 0.2 | | ND 1 | | ND 4 | | ND 2 | |
| Tetrachloroethene | 8.8 | ND 0.02 | 120 | ND 0.02 | 4.3 | ND 0.02 | 19 | ND 0.02 |
| 1,1,1-Trichloroethane | 0.4 | ND 0.02 | 19 | ND 0.02 | 8.6 | ND 0.02 | | ND 0.02 |
| 1,1,2-Trichloroethane | ND 0.2 | | ND 1 | | ND 4 | | ND 2 | |
| Trichloroethene | 210 | | 3310 | | 1000 | ND 0.02 | 140 | ND 0.02 |
| Trichlorofluoromethane | ND 0.2 | | ND 1 | | ND 4 | | ND 2 | |
| Vinyl chloride | ND 0.2 | | ND 1 | | ND 4 | | ND 2 | |
| Methylene chloride | | 0.04 | 3.8 | .04 | | | 12 | |

| | 32683.5 Pretreatment | 32683.5 Post-treatment | 32678.5 Pretreatment | 32678.5 Post-treatment | 32673.5 Pretreatment | 32673.5 Post-treatment | 32668.5 Pretreatment | 32668.5 Post-treatment |
|---|---|---|---|---|---|---|---|---|
| SAMPLE I.D. Type | Location 9 | | Location 10 | | Location 11 | | Location 12 | |
| U.S. EPA Method 8020 | | | | | | | | |
| Benzene | ND 50 | ND 1. | ND 1. | ND 1. | ND 50 | ND 1. | ND 50 | ND |
| Chlorobenzene | ND 1 | | ND 0.02 | | ND 1 | | ND 1 | |
| 1,2-Dichlorobenzene | ND 1 | ND 0.02 | 7.6 | ND 0.02 | | ND 0.02 | ND 1 | ND 0.02 |
| 1,3-Dichlorobenzene | ND 1 | ND 0.02 | | ND 0.02 | ND 1 | ND 0.02 | ND 1 | ND 0.02 |
| 1,4-Dichlorobenzene | ND 1 | ND 0.02 | | ND 0.02 | 22 | ND 0.02 | ND 1 | ND 0.02 |
| Ethylbenzene | ND 50 | ND 1. | 20 | ND 1. | ND 1 | ND 1. | ND 50 | ND 1. |
| Toluene | ND 50 | ND 1. | 1 | ND 1. | ND 1 | ND 1. | ND 50 | ND 1. |
| Xylenes | ND 50 | ND 1. | 34 | ND 1. | 62 | ND 1. | ND 50 | ND 1. |
| U.S. EPA Method 8010 | | | | | | | | |
| Bromodichloromethane | ND 2 | | ND 0.02 | | ND 1 | | ND 2 | |
| Bromoform | ND 2 | | ND 0.02 | | ND 1 | | ND 2 | |
| Bromomethane | ND 2 | | ND 0.02 | | ND 1 | | ND 2 | |
| Carbon Tetrachloride | ND 2 | | ND 0.02 | | ND 1 | | ND 2 | |
| Chlorobenzene | ND 2 | | ND 0.02 | | ND 1 | | ND 2 | |

TABLE I-continued

| Compound | | | | | | | | | |
|---|---|---|---|---|---|---|---|---|---|
| Chloroethane | ND 2 | | ND 0.02 | | ND 1 | | ND 2 | | |
| 2-Chloroethylvinyl ether | ND 2 | | ND 0.02 | | ND 1 | | ND 2 | | |
| Chloroform | | 7.3 | | 0.43 | | | | | |
| Chloromethane | ND 2 | | ND 0.02 | | ND 1 | | ND 2 | 30 | |
| Dibromochloromethane | ND 2 | | ND 0.02 | | ND 1 | | ND 2 | | |
| 1,2-Dichlorobenzene | | 15 | | 7.6 | ND 0.02 | | 22 | | 15 |
| 1,3-Dichlorobenzene | ND 2 | | ND 0.02 | | ND 0.02 | ND 1 | | ND 0.02 | ND 2 | | ND 0.02 |
| 1,4-Dichlorobenzene | ND 2 | | ND 0.02 | | ND 0.02 | ND 1 | | ND 0.02 | ND 2 | | ND 0.02 |
| Dichlorodifluoromethane | ND 2 | | ND 0.02 | | | ND 1 | | | ND 2 | | |
| 1,1-Dichloroethane | ND 2 | | ND 0.02 | | | ND 1 | | | ND 2 | | |
| 1,2-Dichloroethane | ND 2 | | ND 0.02 | | | ND 1 | | | ND 2 | | |
| 1,1-Dichloroethene | ND 2 | | ND 0.02 | | | ND 1 | | | ND 2 | | |
| trans-1,1-Dichloroethene | ND 2 | ND 0.02 | ND 0.02 | | ND 0.02 | ND 1 | | ND 0.02 | ND 2 | | ND 0.02 |
| 1,2-Dichloropropane | ND 2 | | ND 0.02 | | | ND 1 | | | ND 2 | | |
| cis-1,3-Dichloropropene | ND 2 | | ND 0.02 | | | ND 1 | | | ND 2 | | |
| trans-1,3-Dichloropropene | ND 2 | | ND 0.02 | | | ND 1 | | | ND 2 | | |
| 1,1,2,2-Tetrachloroethane | | 8.3 | ND 0.02 | | | ND 1 | | | ND 2 | | |
| Tetrachloroethene | ND 2 | | ND 0.02 | | 3.6 | ND 0.02 | ND 1 | 2.7 | ND 0.02 | ND 2 | 6 | ND 0.02 |
| 1,1,1-Trichloroethane | ND 2 | | ND 0.02 | | | ND 0.02 | ND 1 | 0.14 | ND 0.02 | ND 2 | 2.9 | ND 0.02 |
| 1,1,2-Trichloroethane | ND 2 | | ND 0.02 | | 7.9 | ND 0.02 | ND 1 | | | ND 2 | | |
| Trichloroethene | | 150 | ND 0.02 | | | | ND 1 | 34 | ND 0.02 | | 314 | ND 0.02 |
| Trichlorofluoromethane | ND 2 | | ND 0.02 | | | | ND 1 | | | ND 2 | | ND 0.02 |
| Vinyl chloride | ND 2 | | ND 0.02 | | | | ND 1 | | | ND 2 | | ND 0.02 |
| Methylene chloride | | 9.7 | | | 1 | | | | | | 15 | |

Note:
All values shown are in mg/kg. ND x indicates that compound was not detected at a concentration in excess of x mg/kg. Where no value is reported for a particular compound, that compound was not analyzed in post-treatment soil samples.

In a second series of tests, soil samples were taken from various locations within test zones 323, 326 and 329 at the McKin Site, which zones had been previously identified as being contaminated with organic soil contaminants of a petroleum origin. The soil test samples from the different locations contained different concentrations of the contaminants. The soil test samples were each treated by the method according to the invention, wherein the soil test samples were passed through the materials dryer three times. No appreciable change in the data occurred when a soil sample was passed through the materials dryer for a fourth time performed at the McKin Superfund Site at Gray, Maine. U.S. EPA methods 8020 and 8270 were used to measure the concentrations of various volatile organic compounds in soil samples, before and after the soil samples were treated by the method according to the invention. The test results are set forth in the following Table II.

TABLE II

COMPARISON OF PRETREATMENT AND POST-TREATMENT SOIL CHARACTERIZATION
PETROLEUM AREA SOILS REMEDIATION
LOW TEMPERATURE THERMAL AERATION PROCESS
MCKIN SUPERFUND SITE
GRAY, MAINE

| SAMPLE I.D. Type | 323A Pretreatment | 323B Post-treatment | 329A Pretreatment | 329B Post-treatment | 326A Pretreatment | 326B Post-treatment |
|---|---|---|---|---|---|---|
| U.S. EPA Method 8020 | Location 13 | | Location 14 | | Location 15 | |
| Benzene | ND 0.2 | ND 0.2 | ND 0.2 | ND 0.2 | ND 0.2 | ND 0.2 |
| Chlorobenzene | ND 0.2 | ND 0.2 | ND 0.2 | ND 0.2 | ND 0.2 | ND 0.2 |
| 1,2-Dichlorobenzene | 1.5 | ND 0.2 | 1.7 | ND 0.2 | 1.5 | ND 0.2 |
| 1,3-Dichlorobenzene | ND 0.2 | ND 0.2 | ND 0.2 | ND 0.2 | ND 0.2 | ND 0.2 |
| 1,4-Dichlorobenzene | ND 0.2 | ND 0.2 | ND 0.2 | ND 0.2 | ND 0.2 | ND 0.2 |
| Ethylbenzene | 1.5 | ND 0.2 | 2 | ND 0.2 | 1.3 | ND 0.2 |
| Toluene | ND 0.2 | ND 0.2 | 0.3 | ND 0.2 | 0.2 | ND 0.2 |
| Xylenes | 3.7 | ND 0.2 | 4.9 | ND 0.2 | 3.3 | ND 0.2 |
| U.S. EPA Method 8270 | | | | | | |
| N-Nitrosodiethylamine | ND 0.330 | ND 0.330 | ND 0.330 | ND 0.330 | ND 0.330 | ND 0.330 |
| Phenol | ND 0.330 | ND 0.330 | ND 0.330 | ND 0.330 | ND 0.330 | ND 0.330 |
| bis (-2-Chloroethyl) Ether | ND 0.330 | ND 0.330 | ND 0.330 | ND 0.330 | ND 0.330 | ND 0.330 |
| 2-Chlorophenol | ND 0.330 | ND 0.330 | ND 0.330 | ND 0.330 | ND 0.330 | ND 0.330 |
| 1,3-Dichlorobenzene | ND 0.330 | ND 0.330 | ND 0.330 | ND 0.330 | ND 0.330 | ND 0.330 |
| 1,4-Dichlorobenzene | ND 0.330 | ND 0.330 | ND 0.330 | ND 0.330 | ND 0.330 | ND 0.330 |
| 1,2-Dichlorobenzene | 0.920 | ND 0.330 | 1.900 | ND 0.330 | 0.710 | ND 0.330 |
| bis (2-chloroisopropyl) Ether | ND 0.330 | ND 0.330 | ND 0.330 | ND 0.330 | ND 0.330 | ND 0.330 |
| N-Nitroso-Di-Propylamine | ND 0.330 | ND 0.330 | ND 0.330 | ND 0.330 | ND 0.330 | ND 0.330 |
| Hexachloroethane | ND 0.330 | ND 0.330 | ND 0.330 | ND 0.330 | ND 0.330 | ND 0.330 |
| Nitrobenzene | ND 0.330 | ND 0.330 | ND 0.330 | ND 0.330 | ND 0.330 | ND 0.330 |
| Isophorone | 0.740 | ND 0.330 | 0.790 | ND 0.330 | 0.450 | ND 0.330 |
| 2-Nitrophenol | ND 0.330 | ND 0.330 | ND 0.330 | ND 0.330 | ND 0.330 | ND 0.330 |
| 2,4-Dimethylphenol | ND 0.330 | ND 0.330 | ND 0.330 | ND 0.330 | ND 0.330 | ND 0.330 |
| bis (-2-Chloroethoxy) Methane | ND 0.330 | ND 0.330 | ND 0.330 | ND 0.330 | ND 0.330 | ND 0.330 |
| 2,4-Dichlorophenol | ND 0.330 | ND 0.330 | ND 0.330 | ND 0.330 | ND 0.330 | ND 0.330 |
| 1,2,4-Trichlorobenzene | ND 0.330 | ND 0.330 | ND 0.330 | ND 0.330 | ND 0.330 | ND 0.330 |
| Naphthalene | 0.800 | ND 0.330 | 0.750 | ND 0.330 | ND 0.330 | ND 0.330 |
| Hexachlorobutadiene | ND 0.330 | ND 0.330 | ND 0.330 | ND 0.330 | ND 0.330 | ND 0.330 |
| 4-Chloro-3-Methylphenol | ND 0.330 | ND 0.330 | ND 0.330 | ND 0.330 | ND 0.330 | ND 0.330 |
| Hexachlorocyclopentadiene | ND 0.330 | ND 0.330 | ND 0.330 | ND 0.330 | ND 0.330 | ND 0.330 |
| 2,4,6-Trichlorophenol | ND 0.330 | ND 0.330 | ND 0.330 | ND 0.330 | ND 0.330 | ND 0.330 |
| 2-Chloronaphthalene | ND 0.330 | ND 0.330 | ND 0.330 | ND 0.330 | ND 0.330 | ND 0.330 |
| Dimethyl Phthalate | ND 0.330 | ND 0.330 | ND 0.330 | ND 0.330 | ND 0.330 | ND 0.330 |
| Acenaphthylene | ND 0.330 | ND 0.330 | ND 0.330 | ND 0.330 | ND 0.330 | ND 0.330 |
| 2,6-Dinitrotoluene | ND 0.330 | ND 0.330 | ND 0.330 | ND 0.330 | ND 0.330 | ND 0.330 |
| Acenaphthene | ND 0.330 | ND 0.330 | ND 0.330 | ND 0.330 | ND 0.330 | ND 0.330 |
| 2,6-Dinitrophenol | ND 0.330 | ND 1.650 | ND 0.330 | ND 1.650 | ND 0.330 | ND 1.650 |
| 4-Nitrophenol | ND 0.330 | ND 0.330 | ND 0.330 | ND 0.330 | ND 0.330 | ND 0.330 |
| 2,4-Dinitrotoluene | ND 0.330 | ND 0.330 | ND 0.330 | ND 0.330 | ND 0.330 | ND 0.330 |
| Diethylphthalate | ND 0.330 | ND 0.330 | ND 0.330 | ND 0.330 | ND 0.330 | ND 0.330 |
| 4-Chlorophenyl-phenylether | ND 0.330 | ND 0.330 | ND 0.330 | ND 0.330 | ND 0.330 | ND 0.330 |
| Fluorene | ND 0.330 | ND 0.330 | ND 0.330 | ND 0.330 | ND 0.330 | ND 0.330 |
| Benzidine | ND 0.330 | ND 0.330 | ND 0.330 | ND 0.330 | ND 0.330 | ND 0.330 |
| 4,6-Dinitro-2-Methylphenol | ND 0.330 | ND 1.650 | ND 0.330 | ND 1.650 | ND 0.330 | ND 1.650 |
| N-Nitrosodiphenylamine | ND 0.330 | ND 0.330 | ND 0.330 | ND 0.330 | ND 0.330 | ND 0.330 |
| 4-Bromophenyl-phenylether | ND 0.330 | ND 0.330 | ND 0.330 | ND 0.330 | ND 0.330 | ND 0.330 |
| Hexachlorobenzene | ND 0.330 | ND 0.330 | ND 0.330 | ND 0.330 | ND 0.330 | ND 0.330 |
| Pentachlorophenol | ND 0.330 | ND 1.650 | ND 0.330 | ND 1.650 | ND 0.330 | ND 1.650 |
| Phenanthrene | 0.850 | 0.630 | 1.200 | 0.510 | 1.100 | 0.540 |
| Anthracene | 0.790 | ND 0.330 | 1.200 | ND 0.330 | 0.810 | ND 0.330 |
| Di-N-Butylphthalate | ND 0.330 | ND 0.330 | ND 0.330 | ND 0.330 | ND 0.330 | ND 0.330 |
| Fluoranthene | 0.330 | ND 0.330 | 0.340 | ND 0.330 | 0.800 | ND 0.330 |
| Pyrene | ND 0.330 | ND 0.330 | ND 0.330 | ND 0.330 | ND 0.330 | ND 0.330 |
| Butylbenzylphthalate | ND 0.330 | ND 0.330 | ND 0.330 | ND 0.330 | 0.440 | ND 0.330 |
| 3,3'-Dichlorobenzidine | ND 0.660 | ND 0.660 | ND 0.660 | ND 0.660 | ND 0.660 | ND 0.660 |
| Benzo(a)Anthracene | ND 0.330 | ND 0.330 | ND 0.330 | ND 0.330 | ND 0.330 | ND 0.330 |
| bis-(2-Ethylhexyl) Phthalate | ND 0.330 | ND 0.330 | ND 0.330 | ND 0.330 | ND 0.330 | ND 0.330 |
| Chrysene | ND 0.330 | ND 0.330 | ND 0.330 | ND 0.330 | ND 0.330 | ND 0.330 |
| Di-N-Octyl Phthalate | ND 0.330 | ND 0.330 | ND 0.330 | ND 0.330 | ND 0.330 | ND 0.330 |
| Benzo(b)Fluoranthene | ND 0.330 | ND 0.330 | ND 0.330 | ND 0.330 | ND 0.330 | ND 0.330 |
| Benzo(k)Fluoranthene | ND 0.330 | ND 0.330 | ND 0.330 | ND 0.330 | ND 0.330 | ND 0.330 |
| Benzo(a)Pyrene | ND 0.330 | ND 0.330 | ND 0.330 | ND 0.330 | ND 0.330 | ND 0.330 |

TABLE II-continued
COMPARISON OF PRETREATMENT AND POST-TREATMENT SOIL CHARACTERIZATION
PETROLEUM AREA SOILS REMEDIATION
LOW TEMPERATURE THERMAL AERATION PROCESS
MCKIN SUPERFUND SITE
GRAY, MAINE

| SAMPLE I.D.<br>Type | 323A<br>Pretreatment | 323B<br>Post-treatment | 329A<br>Pretreatment | 329B<br>Post-treatment | 326A<br>Pretreatment | 326B<br>Post-treatment |
|---|---|---|---|---|---|---|
| Indendo(1,2,3-cd)Pyrene | ND 0.330 | ND 0.330 | ND 0.330 | ND 0.330 | ND 0.330 | ND 0.330 |
| Dibenzo(a,h)Anthracene | ND 0.330 | ND 0.330 | ND 0.330 | ND 0.330 | ND 0.330 | ND 0.330 |
| Benzo(g,h,i)Perylene | ND 0.330 | ND 0.330 | ND 0.330 | ND 0.330 | ND 0.330 | ND 0.330 |
| Total Extractable Hydrocarbons | 1800 | 690 | 1600 | 700 | | |

Note:
All values shown are in mg/kg. ND x indicates that compound was not detected at a concentration in excess of x mg/kg.

During an excavating of soil while employing the methodology and apparatus discussed above, variations in the concentrations and/or types of volatile organic compounds (VOCs), semi-volatile, and/or relatively nonvolatile types may be found to be present thereby necessitating an altering of the structural components embodied in the apparatus. For example, if the organic compounds (i.e. petroleum hydrocarbons, consisting of heavier ends such as No. 6 diesel fuel or refinery residuals) heavily contaminate the soil, the materials dryer 31 will effect a heating of the soil so that the volatilized gases will be substantial, and in some instances, produce a "blue smoke". In other words, the volatilized gases will be of a heavy aerosol form and may pose problems to the equipment being utilized downstream in the apparatus. Therefore, and to alleviate this sort of problem, several alternative embodiments have been devised for handling variations in the concentration of volatile organic compounds in the soil being processed. These alternate embodiments will be separately discussed below.

In each of the embodiments, the same materials dryer 31 has been shown as being the piece of equipment being utilized to effect a volatilization of the VOCs. As a result, the same reference numerals that have been used hereinabove have been utilized in the drawings to reference structure that has already been described. Thus, further discussion with respect to the materials dryer will not be presented in each of the alternate embodiments described below.

FIRST ALTERNATE EMBODIMENT (FIGS. 6-7)

Figure 6:
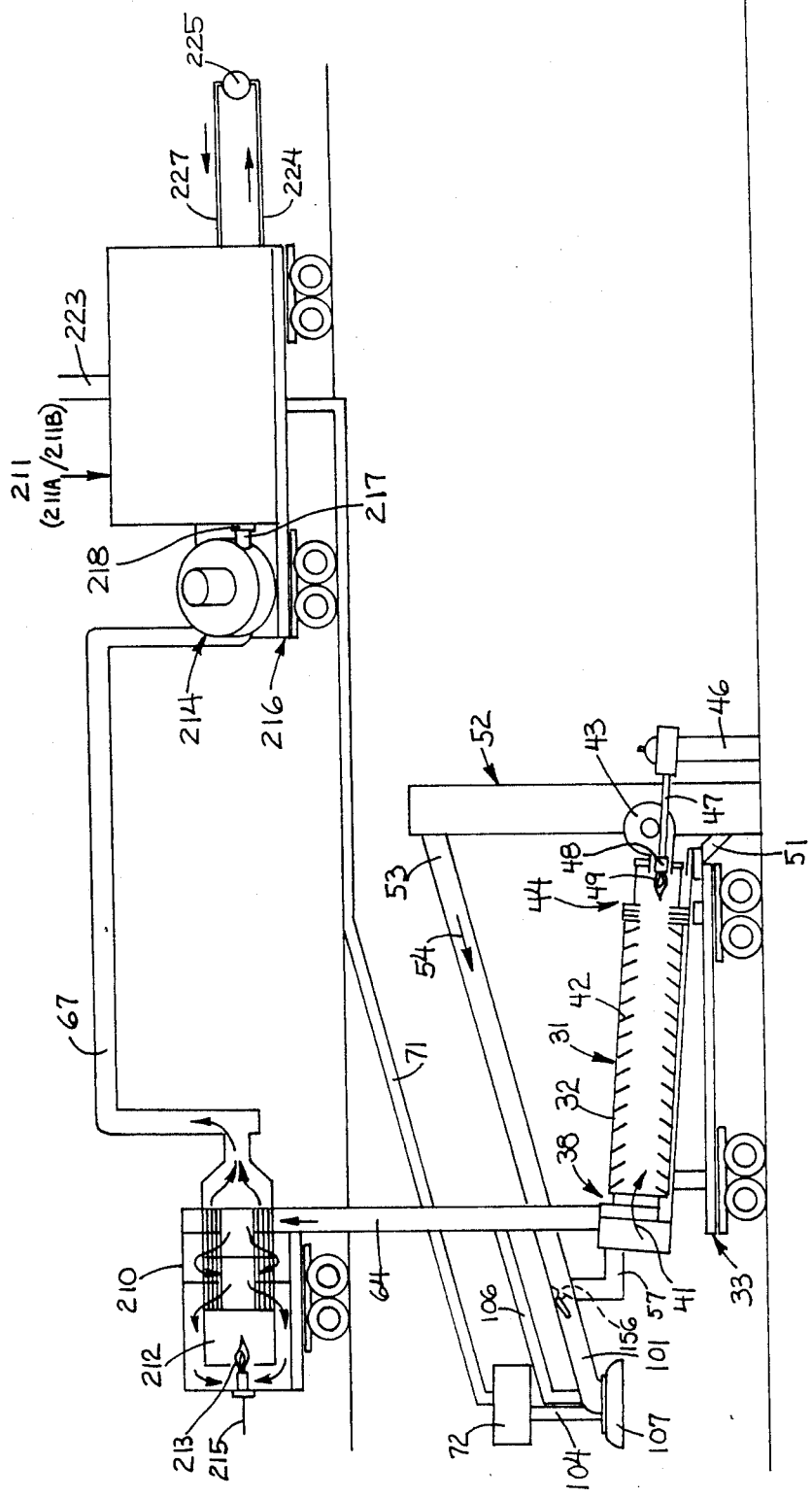
FIG. 6 is a side elevational view of a first alternate embodiment.

FIG. 6 is a side view of the first alternate embodiment, which side view is similar in some respects to the side view illustrated in FIG. 3. In this particular embodiment, a trailer supported afterburner 210 has been connected in circuit with the outlet conduit 64 extending between the materials dryer 31 and the inlet conduit 67 to a trailer mounted spray contactor 211. The afterburner 210 is provided as an economical structure to effect a heating of a combustion chamber 212 using a conventional fuel inputted at 215, and feeding the volatilized gas stream into this chamber and even into the burner flame 213. Usually, the volatilized gas stream is essentially air and, therefore, contains enough oxygen to complete combustion of the organic contaminant. However, in some cases, where sufficient oxygen is not present in the fume, it can be added by means of a fan or blower, either by premixing with the fume or by injecting air into a secondary combustion chamber along with the fume. Of importance is a making of the temperature high enough to oxidize the organic contaminant. Specifically, this is above the autoignition temperature of the pure contaminant and, for practical reasons in this type of system, usually several hundred degrees above the autoignition temperature. The time period that the gas remains in residence in the afterburner depends upon the temperature of the combustion chamber and the turbulence of the gas moving through the afterburner. The turbulence is the degree of mixing achieved between the contaminant and air so that oxygen molecules reach each of the organic molecules within the combustion chamber at the required temperature. It will be readily understood that if the temperature is high, less turbulence and less residence time will suffice. On the other hand, if the temperature is low, longer residence time and better turbulence will be required.

The exhaust gas from the afterburner 210 is evacuated from the combustion chamber 212 by a blower housing 214 mounted on the trailer 216 supporting the spray contactor 211. The outlet 217 of the blower housing 214 is connected to the inlet 218 to the spray contactor 211.

Figure 9:
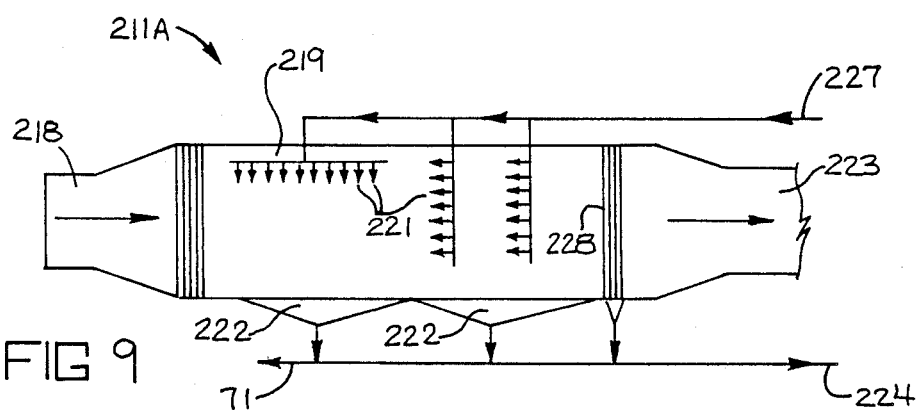
FIG. 9 is a schematic side view of a first alternate embodiment of a spray contactor having structure therein which forces intimate contact of the gas stream with a liquid stream by spraying the liquid stream into a chamber so that the soil fines, acids or phosgenes are mixed thoroughly with the liquid stream in the chamber to cause the gas stream and the liquid now containing the soil fines, acids or phosgenes to exit the chamber as separate streams.
Figure 10:
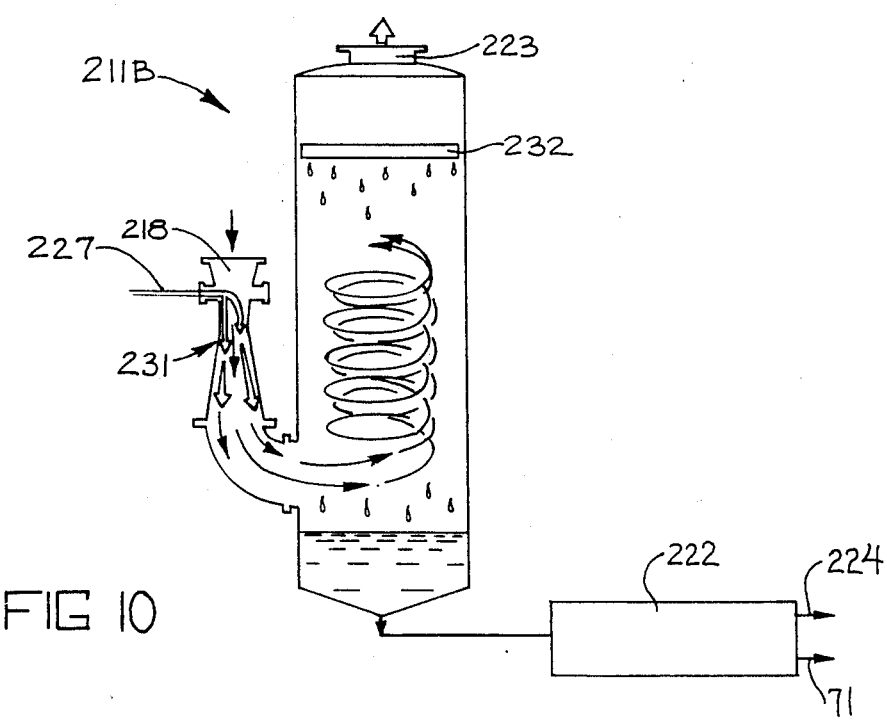
FIG. 10 is a schematic illustration of a second alternate embodiment of a spray contactor which forces intimate contact of a gas stream containing soil fines, acids or phosgenes with a liquid stream by increasing the kinetic energy of the mixture by passage through a restrictive throat and promoting significant contact between the gas stream containing the soil fines, acids or phosgenes and the liquid streams and causing the soil fines, acids or phosgenes to exit as separate streams.

The spray contactor 211 can be of the type schematically illustrated in FIG. 9, and which has been identified as the spray contactor 211A, or the type schematically illustrated in FIG. 10, and which has been identified as the spray contactor 211B. The spray contactor 211A is generally referred to as a "spray chamber arrangement" and, more specifically, as a "horizontal spray chamber (cross-flow)". In this particular embodiment, the particulate-laden volatilized gas stream containing particulates, acids, and any phosgenes, is passed through the inlet conduit 218 into a chamber 219 and contacted with a liquid spray produced by spray nozzles schematically illustrated as at 221. Droplet size is controlled to optimize particle contact and to provide easy droplet separation from the gas stream. As is conventional, nozzles providing a cone spray geometrically are the most effective. A filtration arrangement, schematically shown as at 222 is provided to filter the soil fines from the liquid so that as the liquid is recirculated, the nozzles will not become fouled. The now clean gas stream is discharged into the atmosphere through an outlet conduit 223. The soil fines filtered from the liquid are conveyed through the conduit 71 to the slurry box 72 as described above. The liquid, on the other hand, is collected and delivered through a conduit 224 and pump 225 to the conduit 227 to the spray contactor 211A for purposes of recirculating the liquid back through the spray nozzles 221 for purposes of collecting further particulates, acids or phosgenes as well as enabling a separation of the soil fines therefrom. The spray contactor 211A forces intimate contact of the gas stream and the liquid stream by spraying the liquid stream in the chamber and effecting a thorough mixing of the gas stream containing acids and/or phosgenes with the liquid and, thereafter, allowing the gas stream and the liquid which now contains the acids and/or phosgenes to exit the chamber as separate streams. The entrainment separator/eliminator 228 is the primary structure which effects a separation of the gas stream from the liquid and allows the gas stream to exit separately from the liquid. Gravity, affecting the liquid particles suspended in the air stream also effects the separation as well. The recirculated liquid is periodically neutralized by using a caustic material to maintain pH in the liquid stream at a predetermined value.

The alternate spray contactor 211B is also known as a "Venturi scrubber" having a cyclone separator configuration. The gas or exhaust air stream is inputted at the inlet 218. From the inlet, the gas stream moves into the throat 231 of a Venturi inducing a draft. In this particular embodiment, the blower 214 is connected in circuit on the inlet side of the spray contactor 211B. Alternatively, the blower 214 can be connected in circuit on the outlet side of the spray contactor 211B, such as to the outlet conduit 223. In this case, the exhaust gas stream from the materials dryer will flow through the Venturi throat and the Venturi scrubber due to the negative pressure created by the blower within the scrubber and thence exhaust to the atmosphere. Water from the conduit 227 is introduced into the throat 231 so as to force intimate contact of the gas stream containing the entrained soil fines, acids and/or phosgenes with the liquid stream by increasing the kinetic energy of the mixture by passage through the restrictive throat thereby promoting significant contact between the gas stream, which contains the soil fines, acids and/or phosgenes, and the liquid. The mixture is thereafter passed through an entrainment or mist eliminator to de-entrain the liquid stream now containing the soil fines, acids and/or phosgenes from the mixture and allowing the gas stream and the liquid stream, containing the soil fines, acids and/or phosgenes, to exit as separate streams. The now cleansed gas stream exits, as stated above, into the atmosphere through the outlet conduit 223. The liquid, on the other hand, is filtered by a filter arrangement 222 schematically illustrated in FIG. 10 so as to cause the soil fines to be removed from the liquid and allow the liquid to be recirculated to the liquid inlet conduit 227. As with the spray contactor 211A described above, the liquid stream is periodically neutralized with a caustic material to maintain pH in the liquid stream at a predetermined value.

Figure 8:
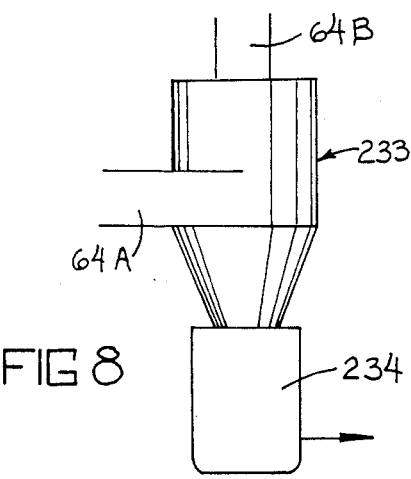
FIG. 8 is a schematic side view of a cyclone separator.

If desired, a cyclone separator 233 (FIG. 8) can be connected in fluid circuit in the conduit 64 extending between the materials dryer 31 and the afterburner 210. In this particular embodiment, an inlet 64A of the cyclone separator 233 is connected to the outlet of the materials dryer 31, whereas an outlet 64B from the cyclone separator 233 is connected to the inlet to the afterburner 210. Thus, the gas stream from the materials dryer passes first through the cyclone separator for the purpose of removing at least a portion of the soil fines from the gas stream before any further treatment of the gas stream occurs. The soil fines so collected from the cyclone separator 233 are collected in a reservoir 234, and thence passed through a flame to oxidize any VOCs that may be present therein. The flame can be comparable to the structure which generates the flame 78 described above and which is shown in FIG. 3 at the right end of the baghouse arrangement 66. The flame acts directly on the material fines as they exit the baghouse 233 to volatilize any of the VOCs that may yet remain on the material fines prior to their introduction into the auger 71 for delivery to the slurry box 72.

The cyclone is primarily beneficial in removing particulates in order to reduce the loading on subsequent particulate removal units. With an initial removal via the cyclones, subsequent units will work more efficiently. Additionally, the fines are more economically handled through the cyclone than the baghouse or the scrubber. The cyclone would be particularly beneficial in circumstances where the contaminated soil contains a high percentage of fines. Conversely, if the soil is a sand and contains very few fines, a cyclone may not provide much benefit to the system performance, though its presence in the circuit would not result in any significant cost impact.

This embodiment is advantageous in circumstances where full and final destruction of the organic compounds at the site is required by agency order or judicial decree, or is warranted by cost requirements or socio-political considerations. Additionally, where soils are contaminated more heavily by semi-volatile and/or relatively non-volatile organics, organic aerosols in the exhaust gas stream tend to condense in the baghouse, included in the first embodiment of FIGS. 1-5, thereby reducing particulate removal efficiency and creating a potential for combustion in the baghouse. This embodiment eliminates the fouling of particulate filtration equipment by destroying the organics prior to particulate filtration.

SECOND ALTERNATE EMBODIMENT (FIGS. 11-12)

This particular embodiment is identical to the embodiment illustrated in FIG. 6, except that a baghouse trailer 236 is connected in circuit with the outlet 223 from the spray contactor 211. More specifically, the gas stream exiting the outlet from the spray contactor is delivered via a conduit 237 to an inlet 238 to the baghouse to facilitate the gas stream to move through the baghouse filter arrangement 239. Periodically, the bags in the baghouse arrangement are pulsed by compressed air and the material fines collected on the bags are dislodged and permitted to drop therefrom into a trough in which an auger 241 is provided. The auger moves the material fines from the baghouse arrangement 239, in direction of the arrow 242 and introduces them into the auger 71 (not shown) and thence to the slurry box 72 whereat the material fines are mixed into a slurry form as has been described above. The now cleansed gas stream is permitted to enter the atmosphere through the outlet 243.

As has been described in the preceding alternate embodiment, a cyclone separator can be provided between the materials dryer 31 and the afterburner 210. Similarly, the baghouse filter arrangement 239 can be replaced with a high-efficiency air filter for the purpose of removing any fine particulates that may yet be present in the gas stream, by passing the gas stream through a sub-micronsized, extended medium, dry type filter contained in a box enclosure, and having a minimum removal efficiency of 90% for 0.3 micron-sized particulate.

This embodiment is advantageous in circumstances where full and final destruction of the organic compounds at the site is required by agency order or judicial decree, or is warranted by cost requirements or socio-political considerations. Additionally, where soils are contaminated more heavily by semi-volatile and/or relatively non-volatile organics, organic aerosols in the exhaust gas stream tend to condense in the baghouse, included in the first embodiment of FIGS. 1-5, thereby reducing particulate removal efficiency and creating a potential for combustion in the baghouse. This embodiment eliminates the fouling of particulate filtration equipment by destroying the organics prior to particulate filtration. This embodiment provides additional filtration of the exhaust gas stream than that provided by the first alternate embodiment, which is advantageous where the soil contains significant quantities of fines, such as silts. The additional filtration provided by the baghouse in this embodiment would also be beneficial where stringent air quality standards require reduction of particulate emissions to low levels not typically achievable by a spray contactor alone.

THIRD ALTERNATE EMBODIMENT (FIGS. 13-14)

Figure 11:
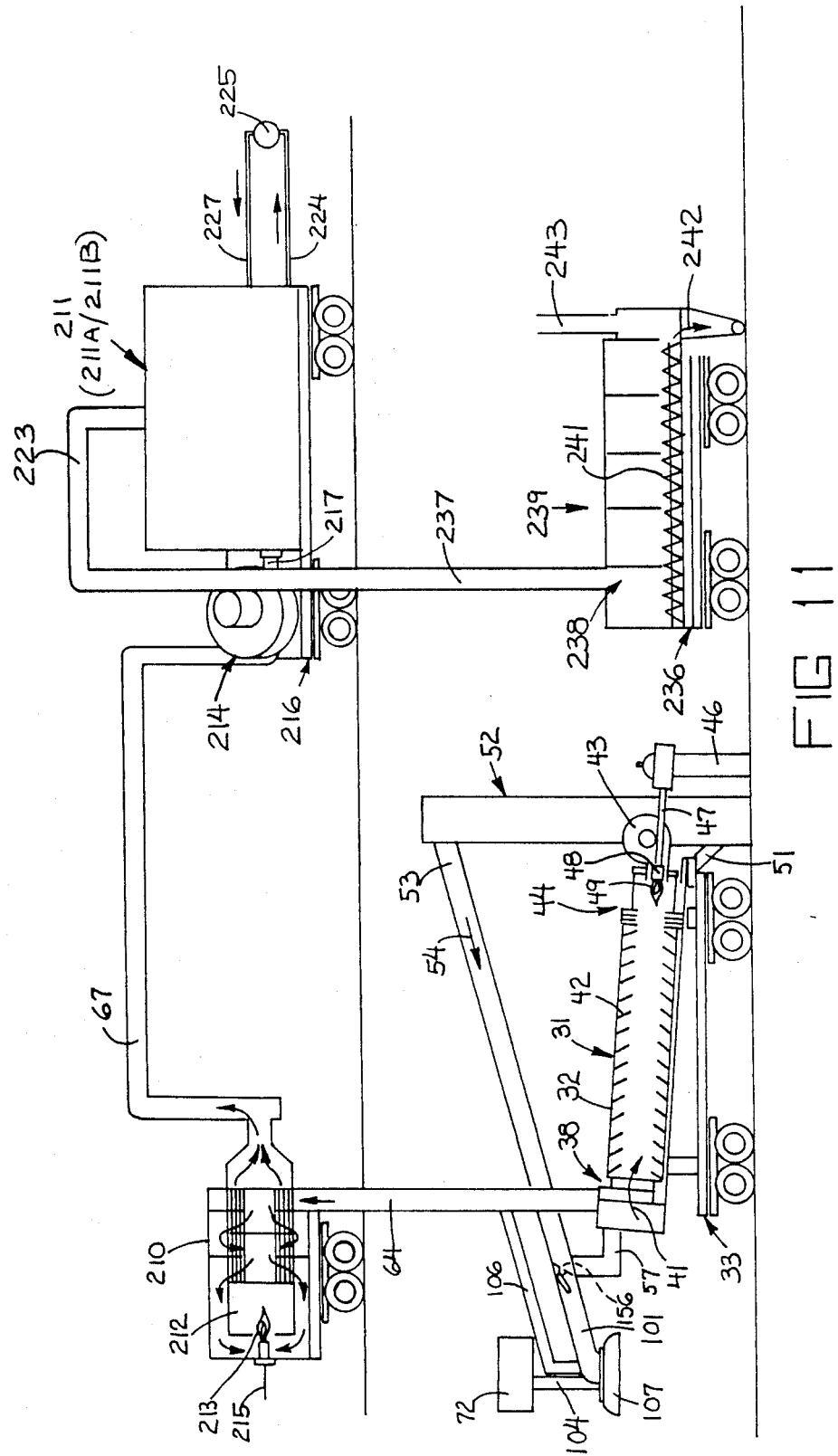
FIG. 11 is a side elevational view of a second alternate embodiment.
Figure 12:
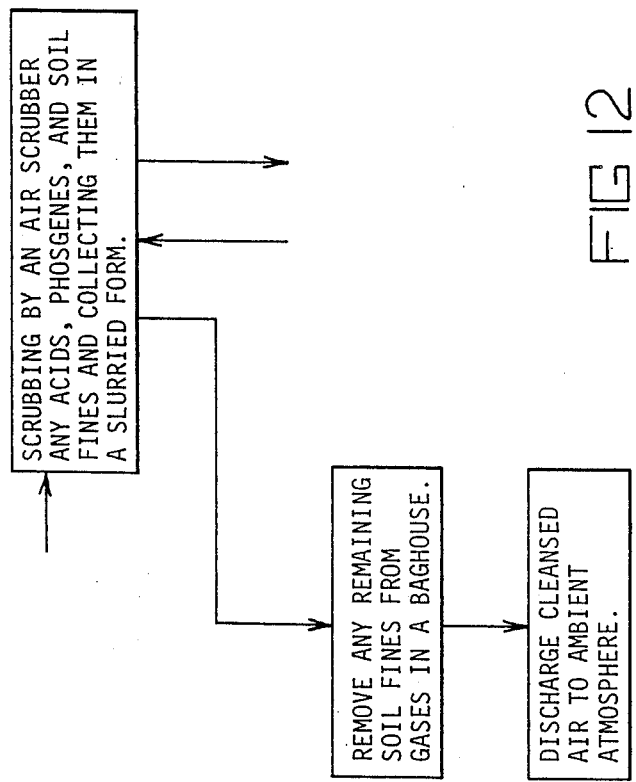
FIG. 12 is a flow chart of the inventive methodology employed in the second alternate embodiment, which flow chart is additive to the flow chart illustrated in FIG. 7.

This alternate embodiment is similar in some respects to the embodiment illustrated in FIGS. 11-12, except that the afterburner 210 (FIG. 11) is not connected in circuit with the outlet conduit 64 from the materials dryer 31. Instead, the conduit 64 extends directly to the blower housing 214 on the spray contactor trailer 216 to cause the gas stream to enter the spray contactor 211 (either 211A or 211B) for purposes of separating the soil fines, acids or phosgenes from the gas stream and the liquid stream. The cleansed gas stream exits the spray contactor 211 through the outlet 223 and conduit 237 and passes through a high-efficiency air filter (HEAF) 244 for purposes of removing any volatilized organics in an aerosol form and remaining particulates from the gas stream. This is accomplished by passing the gas stream through a sub-micron-sized, extended medium, dry type filter contained in a box enclosure, and having a minimum removal efficiency of 90% for 0.3 micronsized particulate.

A carbon adsorption unit 246 is provided on a carbon adsorption trailer 247, the carbon adsorption unit 246 providing a bed of activated carbon. A plenum or manifold structure 248 is, as has been described above with respect to the embodiment illustrated in FIG. 3, provided along with plural conduits 249 covered with a mesh of fabric 251 to prevent entry of the activated carbon to the interior of the conduit 249. Any moisture collecting within the carbon adsorption unit trailer 247 will be permitted to drop into the mesh 251 and eventually make its way to an exhaust opening 252 to facilitate a removal of the collected moisture from within the trailer 247. A canvas-like top 253 may be placed over the top of the bed of activated carbon to prevent water from collecting on the carbon bed from snow, rain or the like.

As indicated by the forgoing discussion, it will be apparent that none of the volatilized gases are permitted to escape into the atmosphere. All of the volatilized gases are drawn into the spray contactor 211, the high efficiency air filter (HEAF) 244 and thence the carbon adsorption unit 246 for purposes of removing organics and the like from the gas stream. Thus, only clean air is permitted to enter the atmosphere as schematically represented by the arrows 254 in FIG. 13.

As has been explained above, the spray contactor 211 (either 211A or 211B) separates the soil fines from the liquid. In this particular embodiment, a fuel tank 256 is provided and effects a supplying of fuel through a conduit 257 to a nozzle 258 whereat the fuel is atomized and ignited to produce a flame 259. The flame acts directly on the material fines as they exit the spray contactor 211 to volatilized any volatile organic compounds (VOCs) that may yet remain on the material fines prior to their introduction into the auger 71 for delivery to the slurry box 72.

If desired, the high efficiency air filter (HEAF) may be replaced with a baghouse trailer unit, such as the baghouse trailer unit 236 described in the embodiment of FIGS. 11-12. If this modification is made, the outlet 243 of the baghouse trailer 236 would be connected in circuit with the inlet or plenum 248 of the carbon adsorption trailer unit 247. Thus, the carbon adsorption system 246 effects an extracting of the remaining volatilized organics from the gas stream by facilitating an adsorption thereof into the granular activated carbon bed.

As with the preceding described embodiments, and if desired, a cyclone separator 233 may be connected in circuit with the conduit 64 and in the same manner as has been described above for purposes of removing at least a portion of the soil fines from the gas stream before any further treatment of the gas stream occurs. In this instance, the soil fines so collected would be combined with the soil fines exiting the spray contactor 211 so that they can simultaneously be subjected to the flame 259 prior to entry into the auger 71 for delivery to the slurry box 72.

This embodiment provides for the removal of organic aerosols through the use of the HEAF (high efficiency air filter) unit. While organics are not destroyed on-site, as under the first and second alternate embodiments, the HEAF is typically more cost effective than the afterburner unit. Additionally, the HEAF unit will usually not require extensive permitting prior to use.

FOURTH ALTERNATE EMBODIMENT (FIGS. 15-16)

Figure 7:
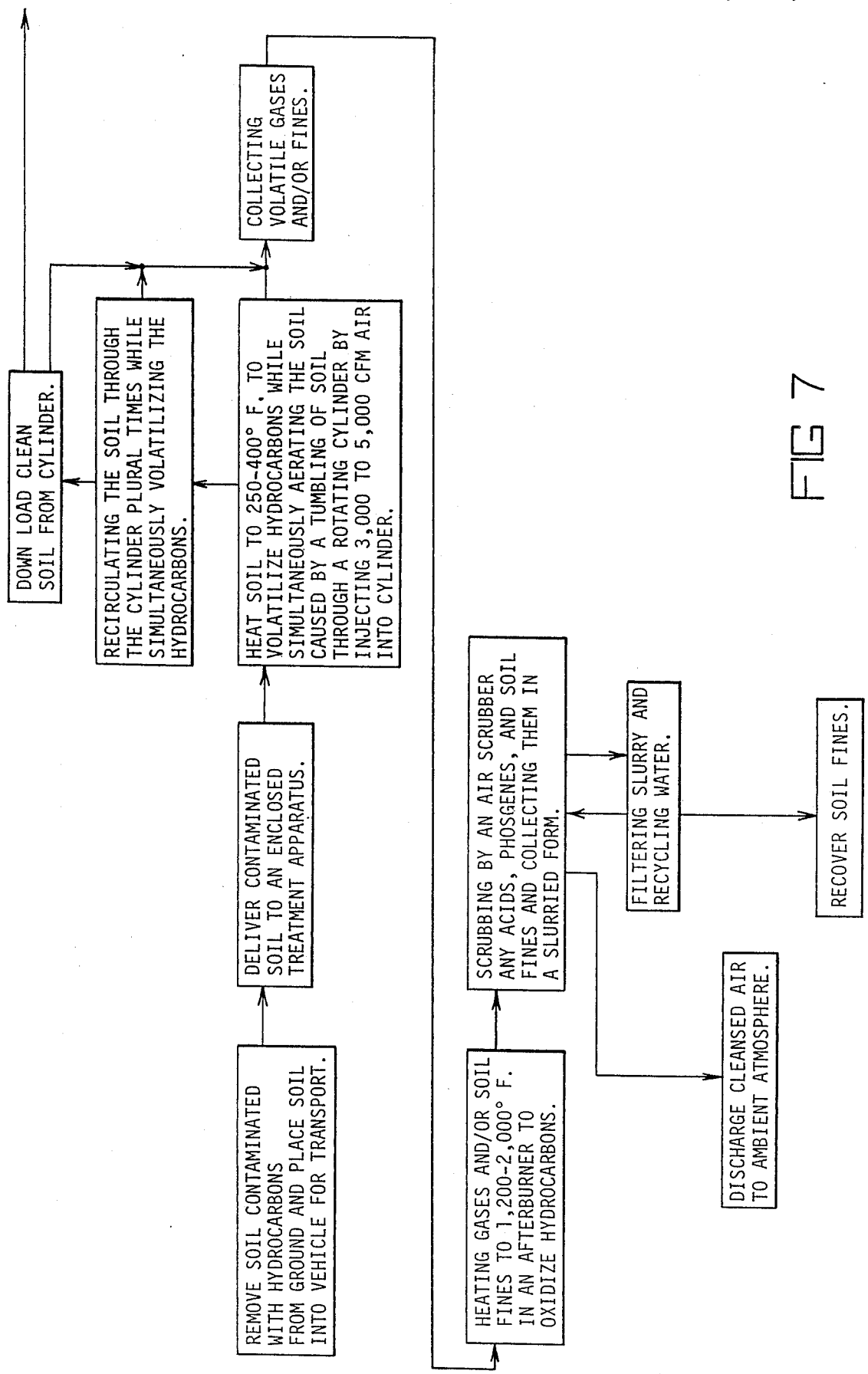
FIG. 7 is a flow chart of the inventive methodology employed in the first alternate embodiment.

This particular embodiment is similar in many respects to the first alternate embodiment described with respect to FIGS. 6 and 7. However, and in this particular embodiment, the position of the afterburner 210 and spray contactor 211 have been reversed. Therefore, and for purposes of convenience, the same reference numerals that have been used above in describing the afterburner 210 will be used in describing it in this particular embodiment. The gas stream exiting the spray contactor 211 at the outlet 223 passes through a conduit 237 into an inlet of the afterburner 210. The afterburner will effect an oxidizing of the volatilized organics remaining in the gas stream with a flame produced from a mixture of an atomized hydrocarbon liquid, or a hydrocarbon gas, and excess air sufficient to expose the volatilized organics to a temperature and for a time span sufficient to completely oxidize the volatilized organics to non-toxic constituents. Thereafter, the gas stream is allowed to pass into the atmosphere through an outlet 261. If desired, a high efficiency air filter 244 or a baghouse trailer unit 246 can be connected in circuit between the spray contactor 211 (either 211A or 211B) and the afterburner 210. These two units will effect a further removal of soil fines from the gas stream prior to entry of the gas stream into the afterburner 210.

In addition, and as has been explained above in each of the preceding embodiments, a cyclone separator 233 can be connected in circuit with the conduit 64 extending between the materials dryer 31 and the spray contactor 211. The cyclone separator will effect a removal of at least a portion of the soil fines from the gas stream before any further treatment of the gas stream occurs.

This embodiment is advantageous in circumstances where soils are not impacted by halogenated organics, or where the concentrations of halogenated organics are minimal. This embodiment is advantageous where contaminated soils contain minimal entrained fines, thereby allowing the system to operate without the added burden of a baghouse or HEAF unit. Since the contaminants will not generate significant quantities of acids in the exhaust air stream upon heating, there is no necessity to provide for the removal or neutralization of acid gases in the final exhaust gas stream prior to discharge to the ambient air. This embodiment provides an advantage over the first alternate embodiment as the particulates are removed prior to the afterburner, thereby reducing abrasion and wear to the afterburner components, and the afterburner is located downstream of the spray contactor so that critical control over flue gas temperatures are not required. Further, if organic aerosols are present following the spray contactor, the afterburner will more efficiently and effectively eliminate the organic aerosols than filtration by carbon.

FIFTH ALTERNATE EMBODIMENT (FIGS. 17-18)

Figure 13:
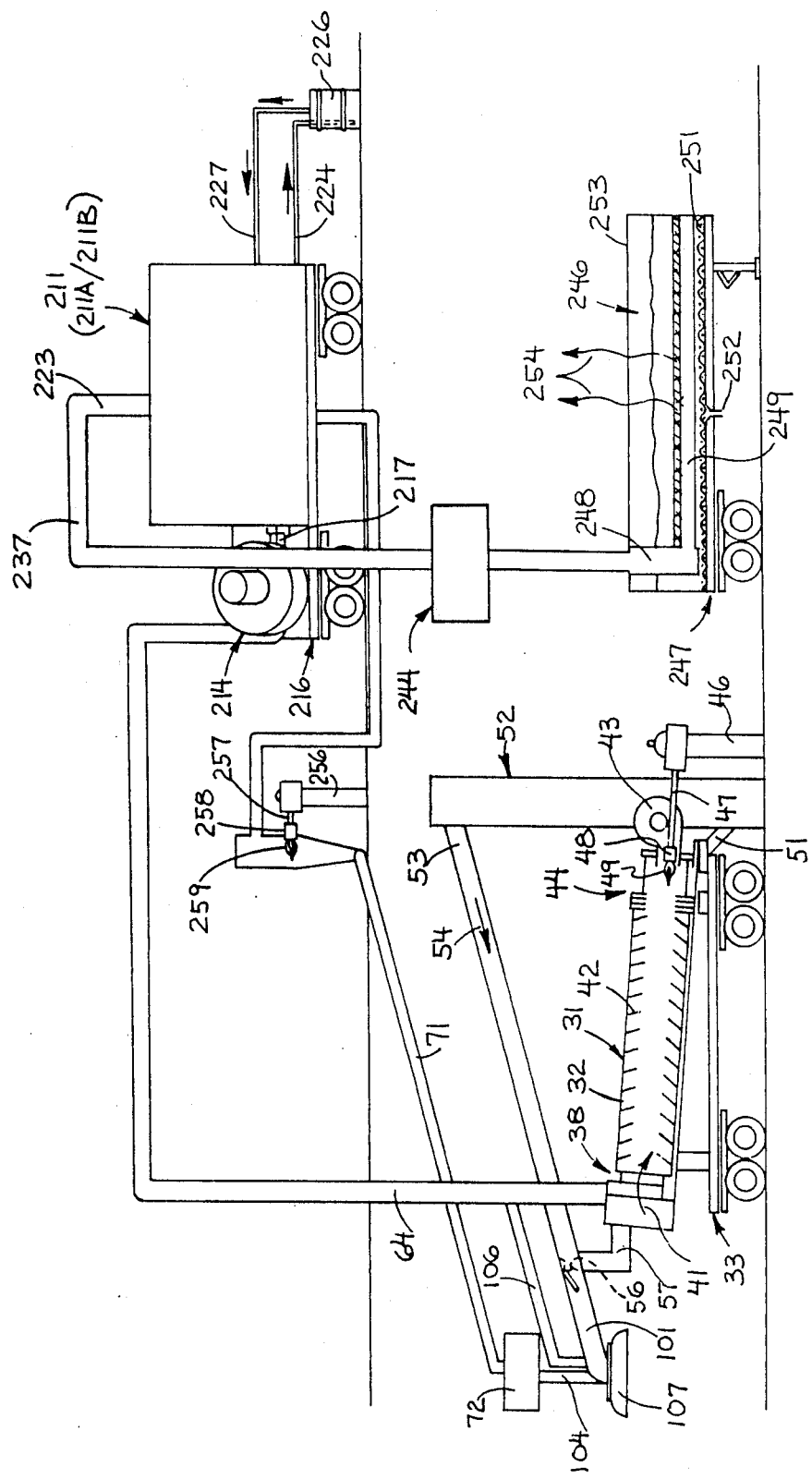
FIG. 13 is a side elevational view of a third alternate embodiment.
Figure 14:
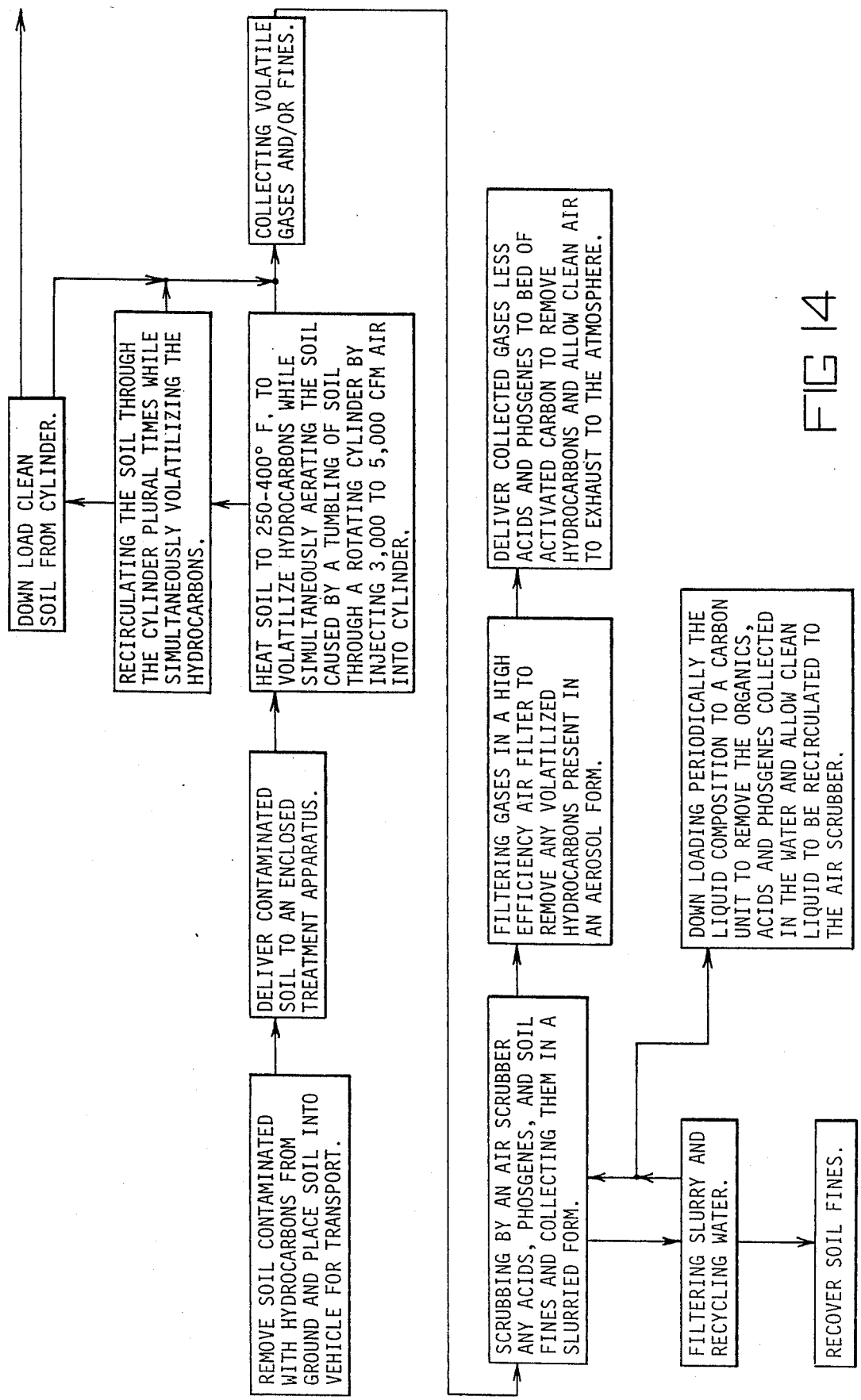
FIG. 14 is a flow chart of the inventive methodology employed in the third alternate embodiment.
Figure 15:
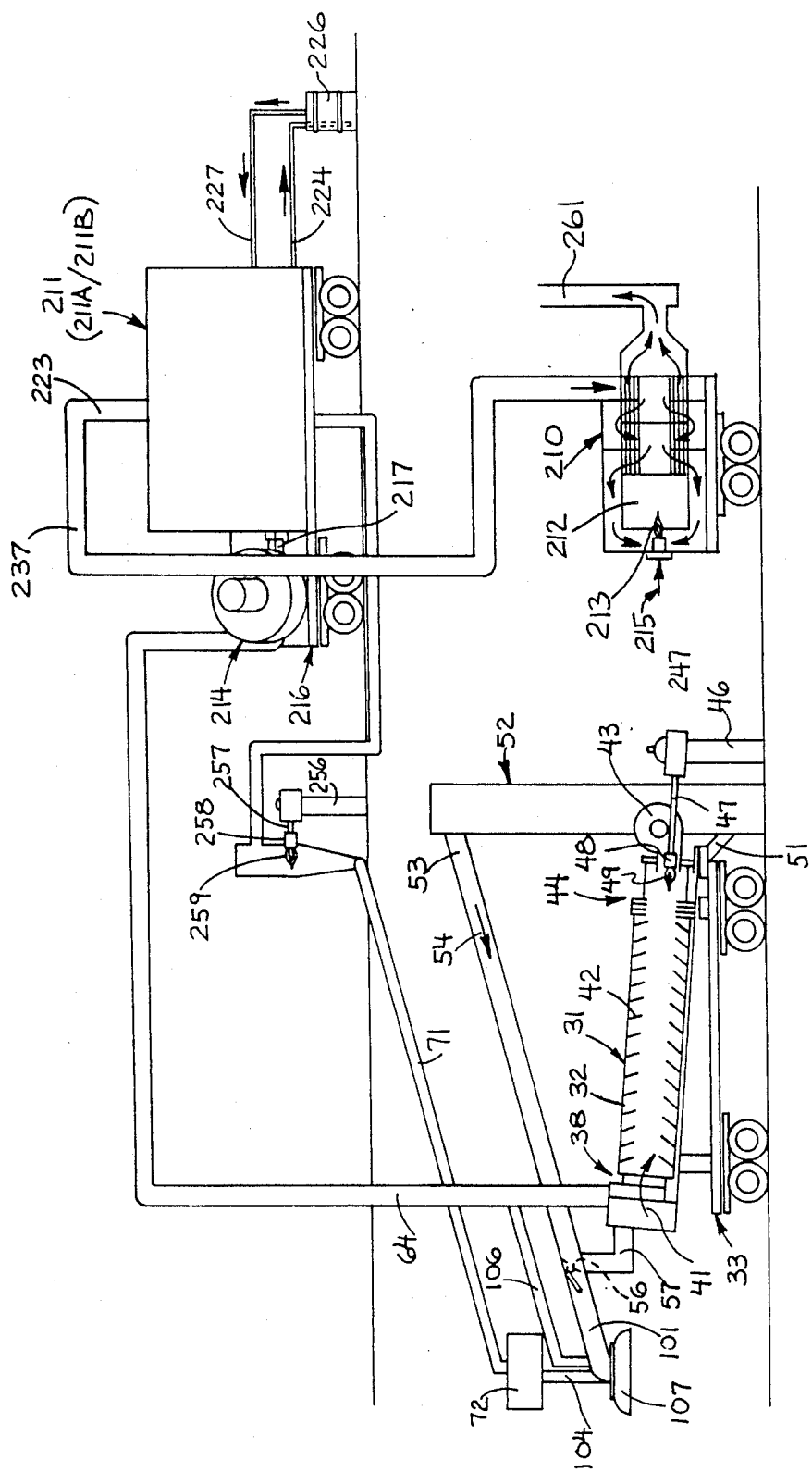
FIG. 15 is a side elevational view of a fourth alternate embodiment of the invention.
Figure 16:
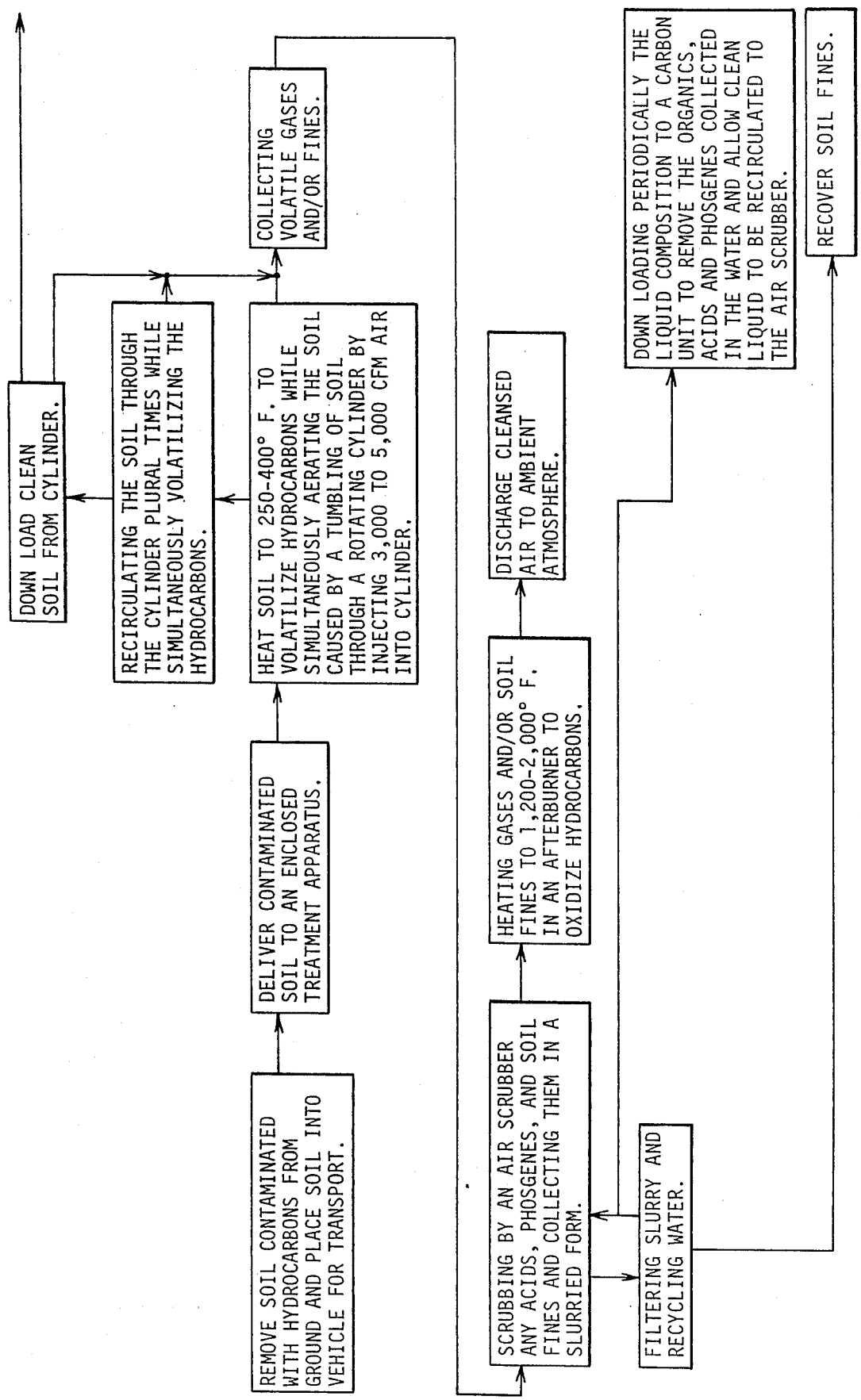
FIG. 16 is a flow chart of the inventive methodology employed in the fourth alternate embodiment.
Figure 17:
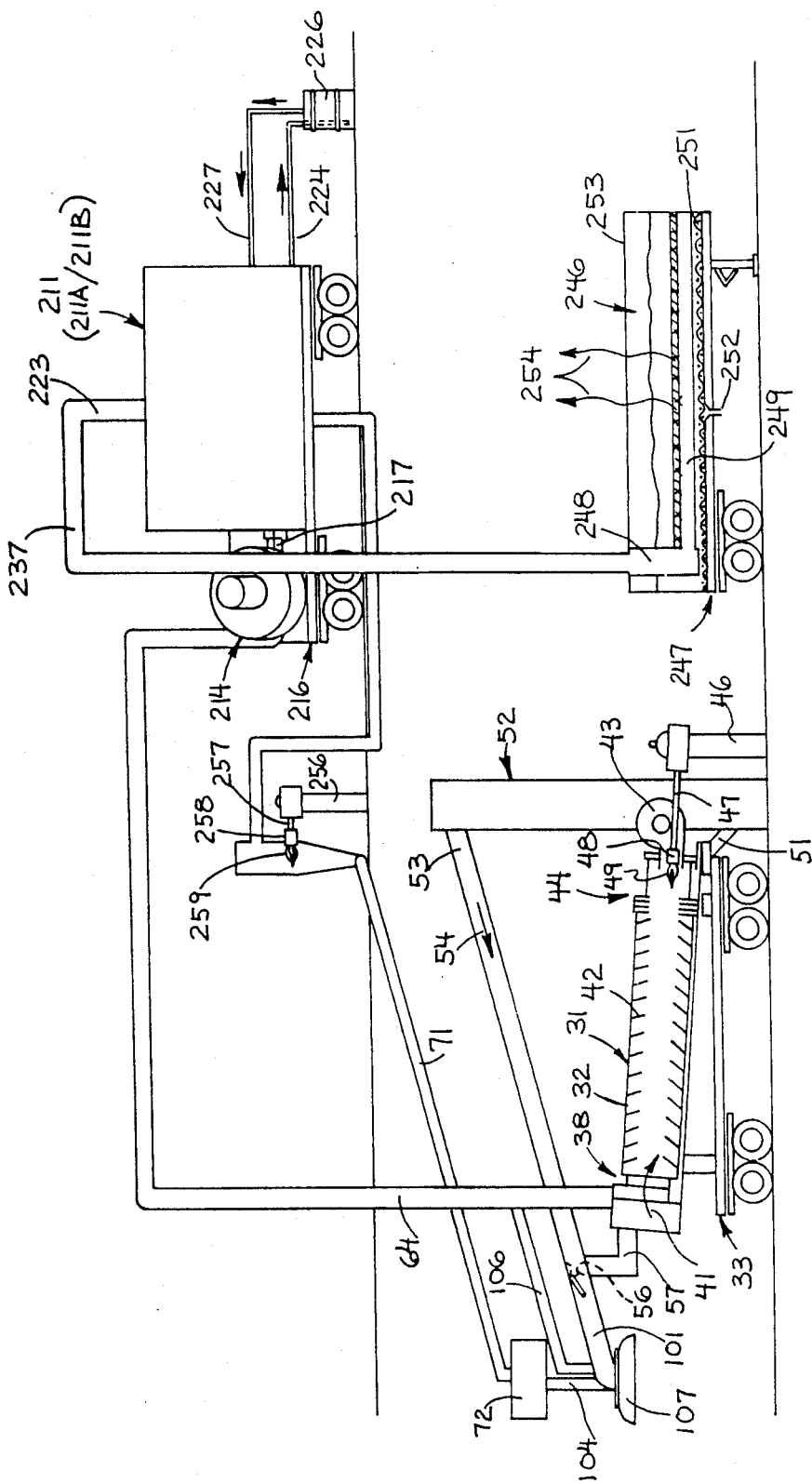
FIG. 17 is a side elevational view of a fifth alternate embodiment of the invention.
Figure 18:
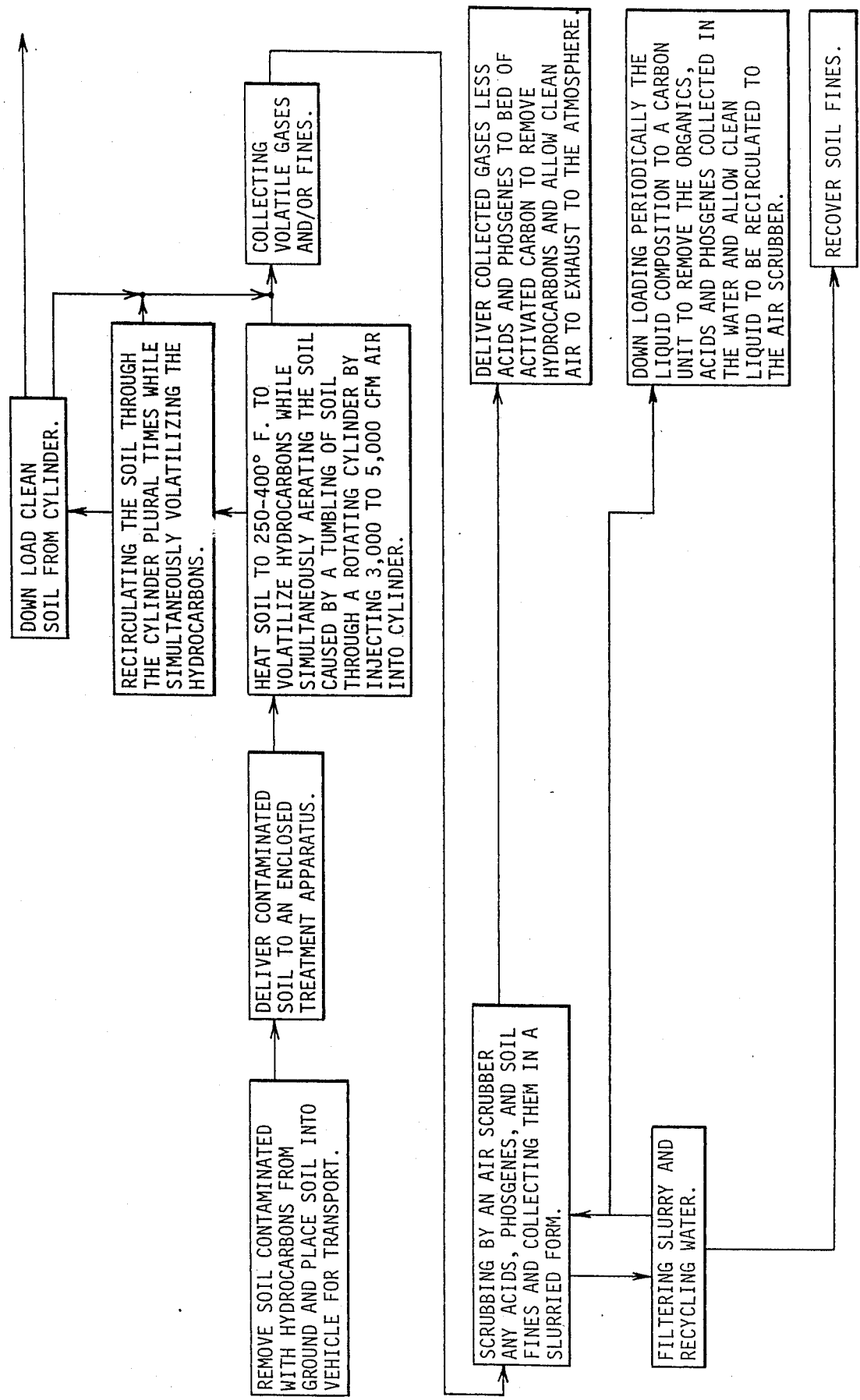
FIG. 18 is a flow chart of the inventive methodology employed in the fifth alternate embodiment.

This particular embodiment is, like the third alternate embodiment, similar to the embodiment described in FIGS. 13 and 14. In this particular embodiment, the high efficiency air filter (HEAF) 244 is not connected in circuit with the conduit 237 extending between the spray contactor 211 and the carbon adsorption trailer unit 247.

The optional equipment that can be utilized with the arrangement described in FIGS. 13 and 14 can also be utilized herewith as well.

This embodiment is advantageous over the fourth alternate embodiment in circumstances where halogenated compounds may generate acid vapors. This embodiment is advantageous where contained soils contain minimal entrained fines, thereby allowing the system to operate without the added burden of a baghouse or HEAF unit. The use of carbon to remove the organics from the final exhaust gas stream is more cost effective than the use of the afterburner, and will not require extensive permitting prior to operation.

SIXTH ALTERNATE EMBODIMENT (FIGS. 19-20)

This particular embodiment is similar in many respects to the embodiment described above with reference to FIG. 3. The only change that has been effected is the addition of a high efficiency air filter (HEAF) identical to the high efficiency air filter 244 described above in the alternate embodiment described in FIGS. 13 and 14 between the spray contactor 211 and the carbon adsorption trailer unit 247. Thus, further comment in regard to this particular embodiment is deemed unnecessary.

Figure 19:
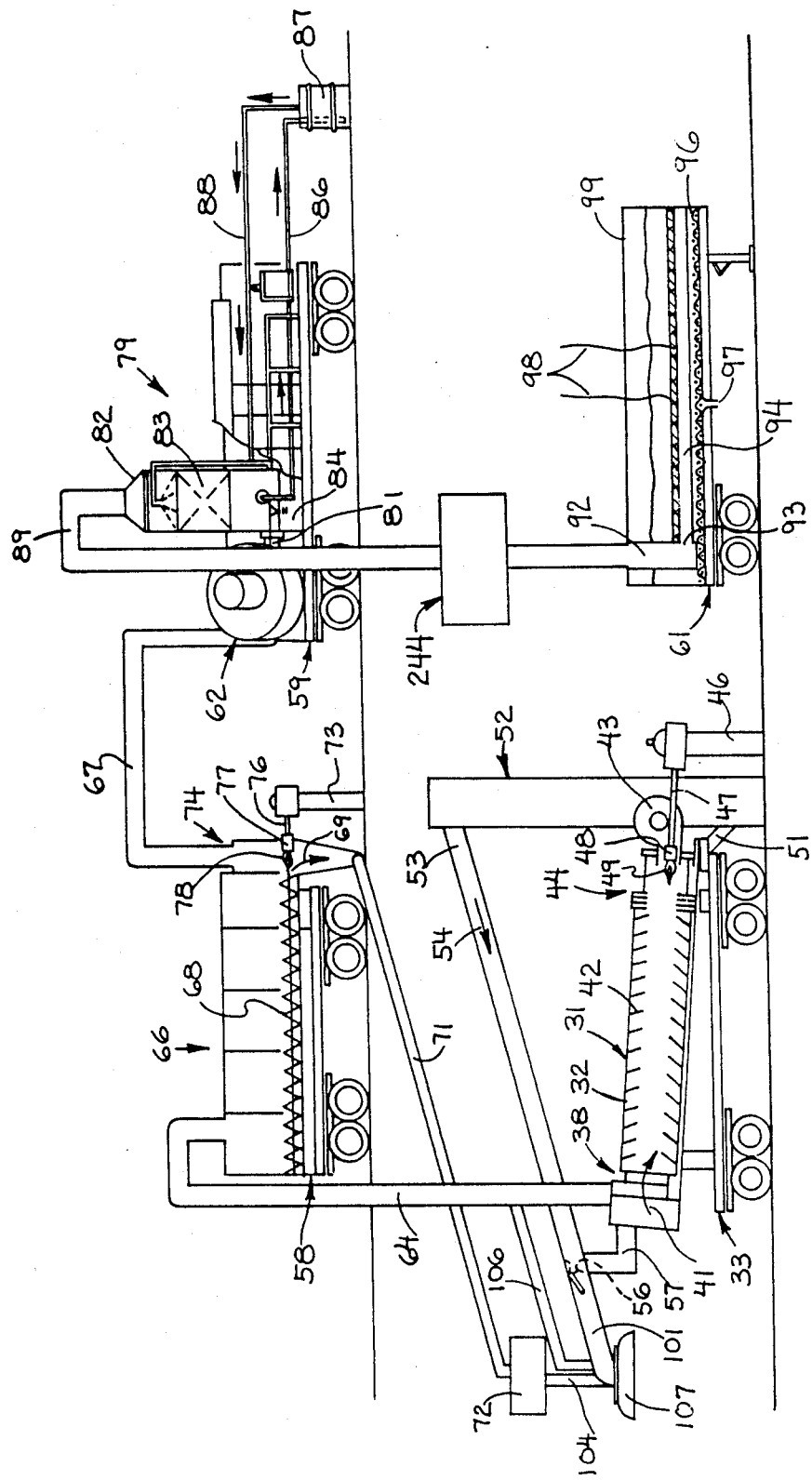
FIG. 19 is a side elevational view of a sixth alternate embodiment of the invention.
Figure 20:
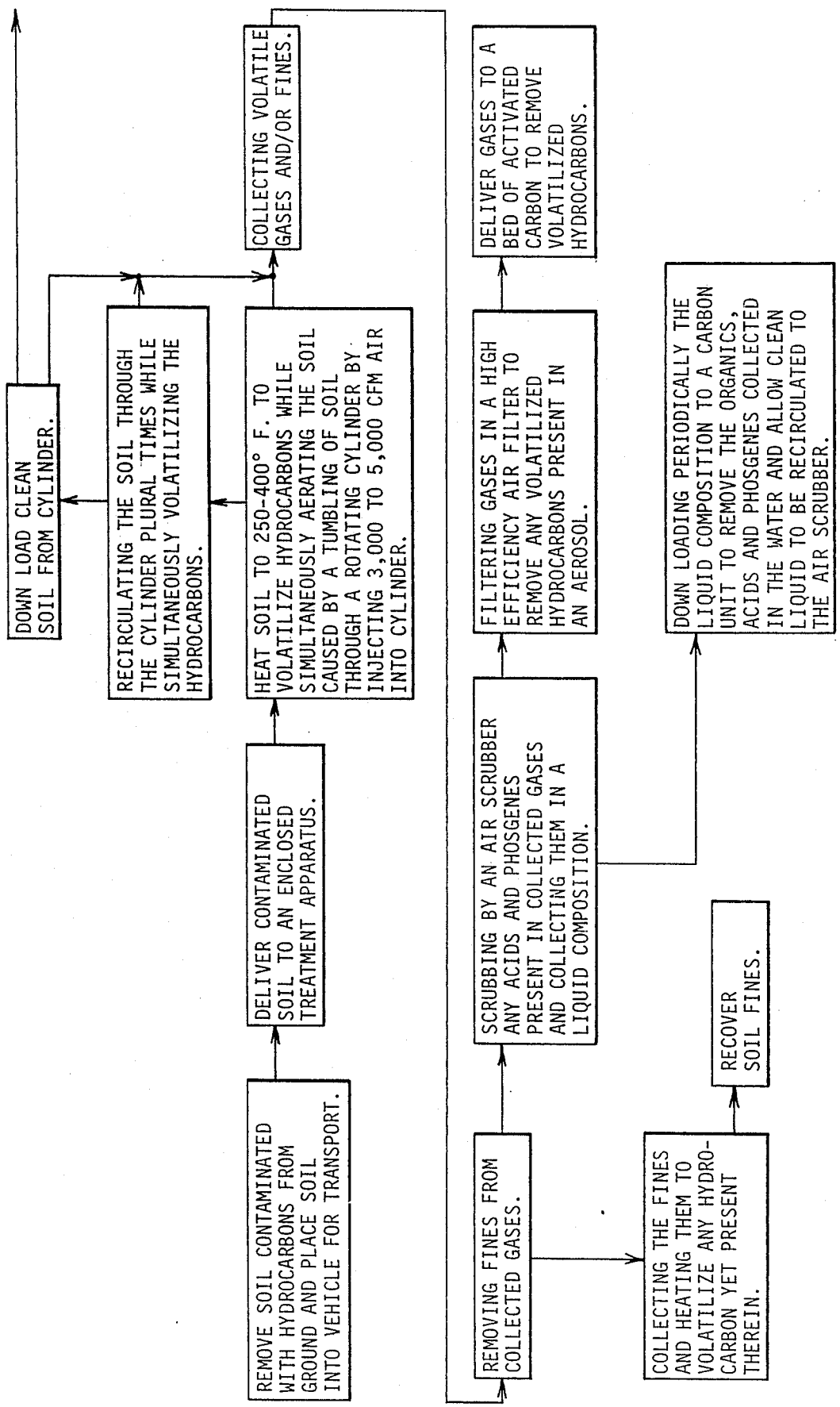
FIG. 20 is a flow chart of the inventive methodology employed in the sixth alternate embodiment.

As with each of the embodiments described previously, a cyclone separator 233 can be connected in circuit with the conduit 64 between the materials dryer 31 and the baghouse trailer 58 for purposes of removing at least a portion of the soil fines from the gas stream before any further treatment of the gas stream occurs. In this particular embodiment, the soil fines so collected by the cyclone separator 233, would be passed through a flame, similar to the flame and the apparatus for generating the flame 78 illustrated in the embodiment of FIGS. 19 and 20. It would be desirable to combine the soil fines with the soil fines exiting the baghouse unit 66 so that they can simultaneously pass through the flame 78 generated by the nozzle 77 oriented at the outlet end of the baghouse trailer unit 58.

This embodiment is the most advantageous equipment assembly where extremely stringent air quality standards must be met during remediation of contaminated soils. The utilization of both a baghouse and a HEAF assures complete removal of particulate matter, including organic aerosols. The scrubber removes or neutralizes any acids in the exhaust gas stream, and the carbon filtration eliminates residual organics in a cost-effective manner. This embodiment is also capable of treating soils containing higher concentrations of soil fines, as well as halogenated and non-halogenated organics. The air treatment equipment is conventional and requires minimal permitting.

SEVENTH ALTERNATE EMBODIMENT (FIGS. 21-22)

As with the first alternate embodiment (FIGS. 6-7), this embodiment also is similar in many respects to the embodiment described above with reference to FIG. 3. In this particular embodiment, the carbon adsorption trailer unit is replaced with a trailerized afterburner unit identical to the afterburner unit 210 described above in the first alternate embodiment of FIGS. 6 and 7. Since the afterburner unit is identical to the one described above, further comment in regard to this unit is believed unnecessary. The gas stream exiting the afterburner unit 210 is allowed to pass into the atmosphere through an outlet 261.

As with each of the embodiments described above, a cyclone separator can be connected in circuit with the conduit 64 between the materials dryer 31 and the baghouse trailer unit 58 for purposes of removing at least a portion of the soil fines from the gas stream before any further treatment of the gas stream occurs.

This embodiment is advantageous in those circumstances where the soils are contaminated with non-halogenated organics and soil fines are more prevalent. This embodiment is also advantageous in circumstances where full and final destruction of the organic compounds at the site is required by agency order or judicial decree, or is warranted by cost requirements or socio-political considerations.

EIGHTH ALTERNATE EMBODIMENT (FIGS. 23-24)

In instances where the soil that is being treated contains a lesser amount of non-halogenated hydrocarbon constituents, this particular embodiment will provide the requisite equipment for treating the soil. For example, if the soil contains non-halogenated light end hydrocarbons, that is, xylene, toluene, ethylbenzene, benzene, acetone, methylethyl ketone, mineral spirits, kerosene or gasoline, it has been discovered that the spray contactor or the air scrubber unit disclosed in FIG. 3 is not required. Instead, the gas stream and any remaining soil fines may exit the baghouse trailer unit via the conduit 67 to a high efficiency air filter (HEAF) identical to the high efficiency air filter 244 described in the preceding embodiments of FIGS. 13, 14 and FIGS. 19, 20. In addition, and as with the embodiment described in FIGS. 19 and 20, the output from the high efficiency air filter 244 can pass into and through a carbon bed provided on a carbon adsorption trailer unit 61 as has been described above with reference to FIG. 3.

As with the preceding embodiments, a cyclone separator 233 can be connected in circuit with the conduit 64 extending between the materials dryer 31 and the baghouse trailer unit 58 for purposes of removing at least a portion of the soil fines from the gas stream before any further treatment of the gas stream occurs.

This embodiment provides an equipment assemblage which is capable of handling soils with a high percentage of fines. The equipment is useful for circumstances where soils are contaminated with non-halogenated organics and organic aerosols may be generated and must be removed prior to discharge. The use of the carbon filtration over the afterburner unit provides for cost savings in the management of residual organic vapors. The elimination of the spray contactor reduces the operation and maintenance costs for the treatment of the exhaust air stream.

NINTH ALTERNATE EMBODIMENT (FIGS. 25–26)

This particular embodiment is similar to the embodiment described previously in FIGS. 21 and 22. In this particular embodiment, the spray contactor has been eliminated for the embodiment described above with reference to FIGS. 21 and 22. As with the eighth alternate embodiment, this particular embodiment will be appropriate in instances where the soil that is being treated contains a lesser amount of non-halogenated hydrocarbon constituents. Since the afterburner unit is identical to that described in FIGS. 6 and 7, no further discussion about it is deemed necessary. The gas stream exiting the afterburner unit 210 is allowed to pass into the atmosphere through the outlet 261.

This embodiment provides for more efficient handling of fines in the exhaust gas stream than that provided in the fourth alternate embodiment, as soil fines are collected and handled in a dry form rather than a slurry. This embodiment is advantageous where non-halogenated organics contaminate soils with low to medium concentrations of fines and where full and final destruction of the organic compounds at the site is required by agency order or judicial decree, or is warranted by cost requirements or socio-political considerations.

TENTH ALTERNATE EMBODIMENT (FIG. 27)

Figure 21:
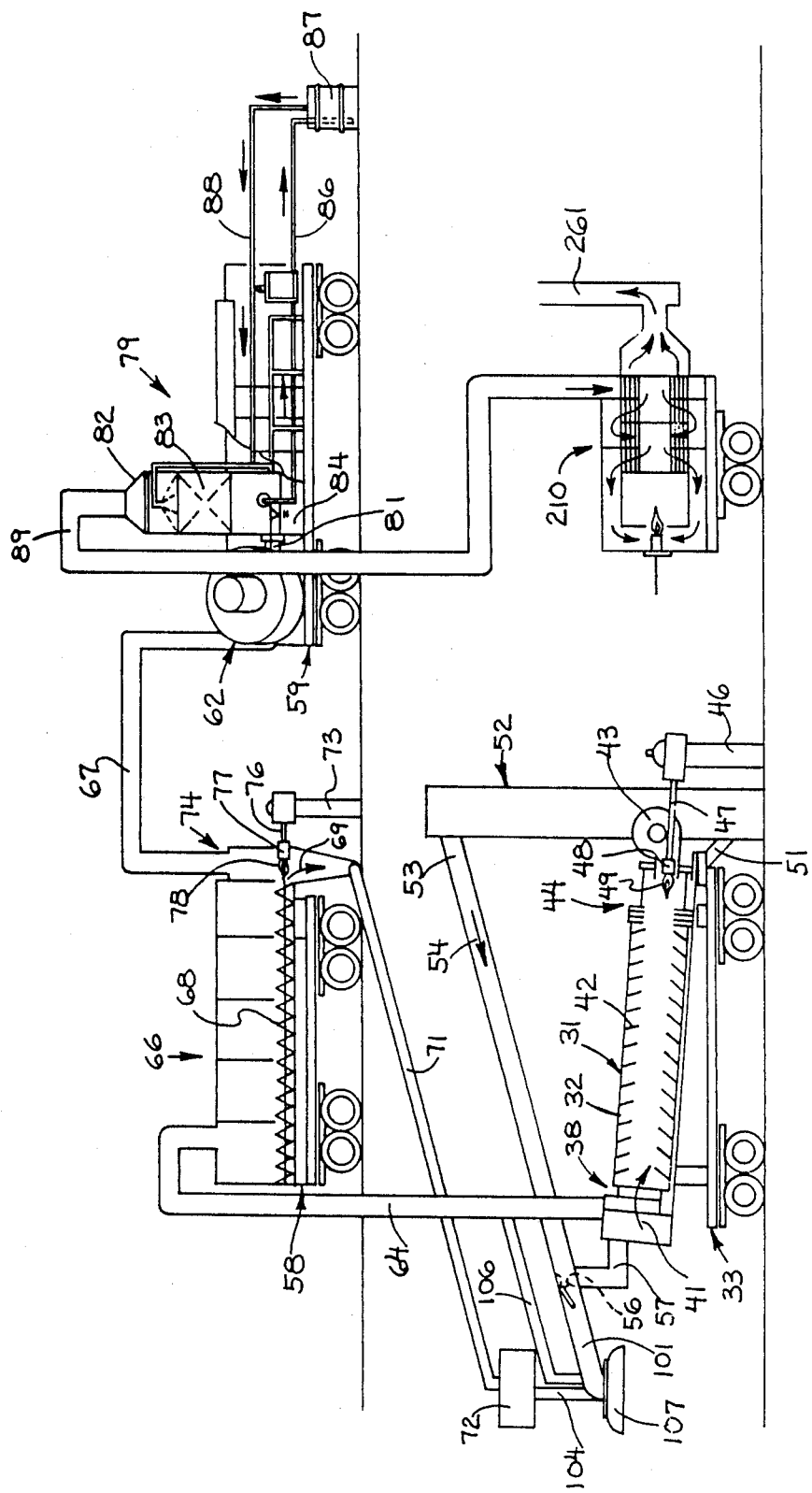
FIG. 21 is a side elevational view of a seventh alternate embodiment.
Figure 22:
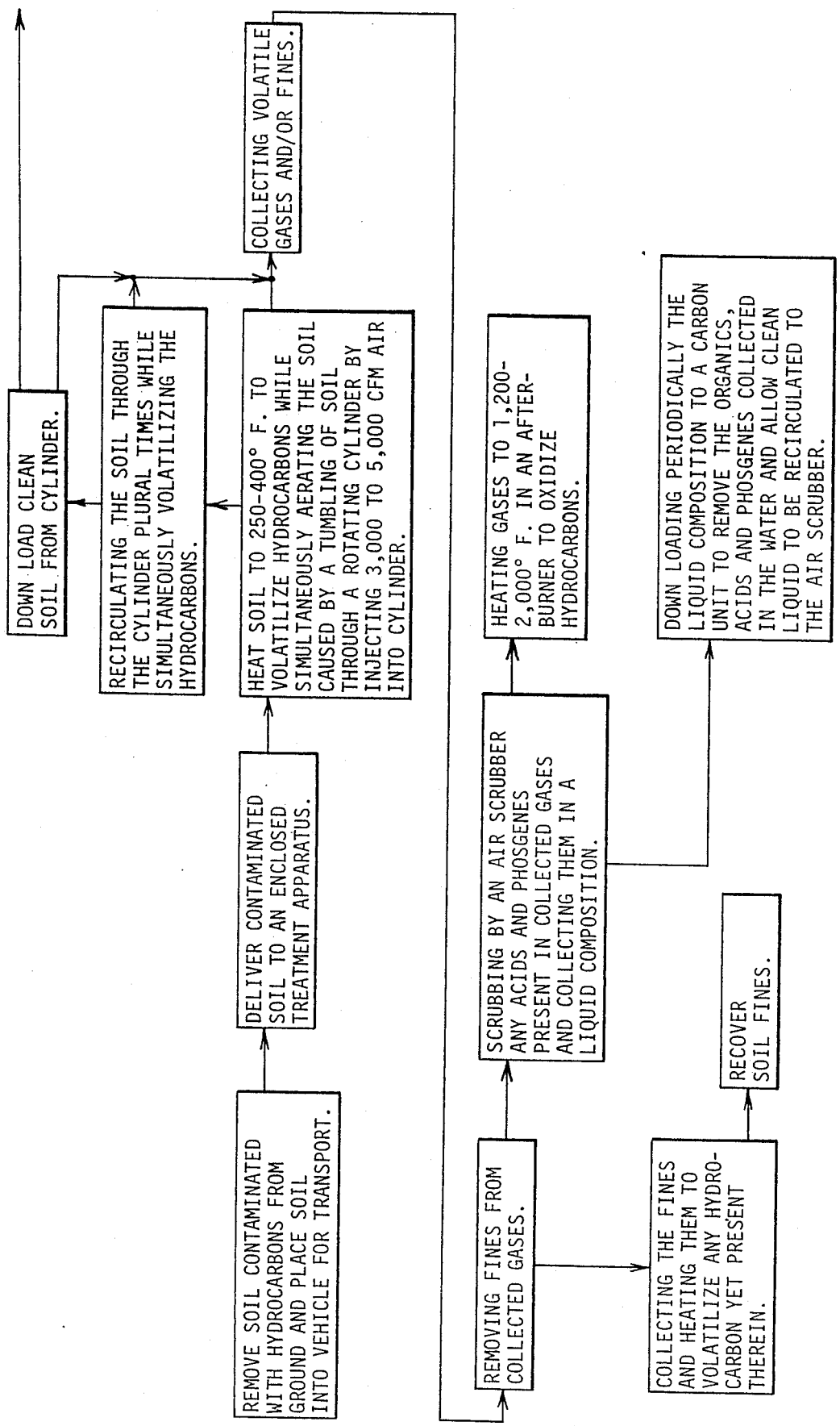
FIG. 22 is a flow chart of the inventive methodology employed in the seventh alternate embodiment.
Figure 23:
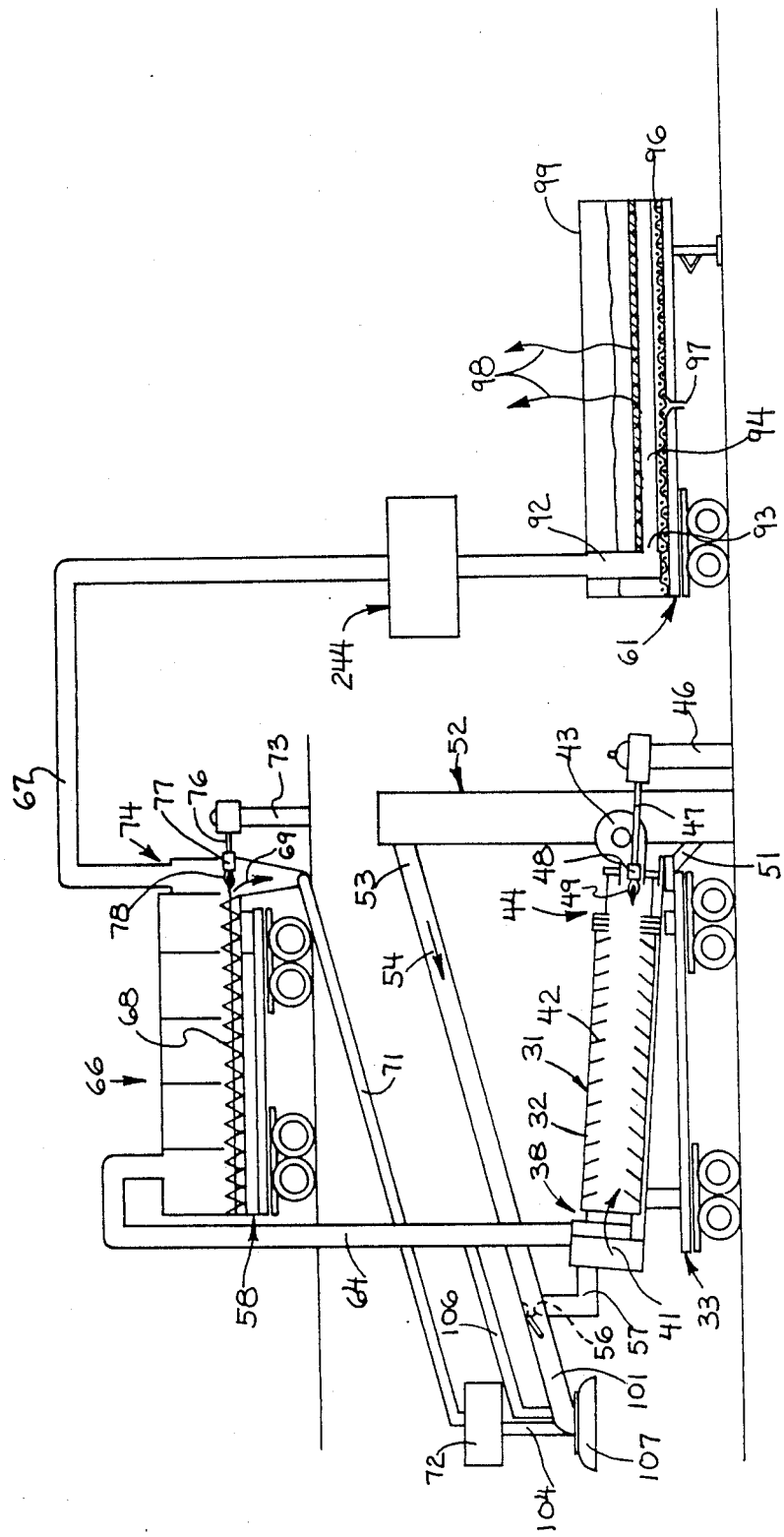
FIG. 23 is a side elevational view of a eighth alternate embodiment.
Figure 24:
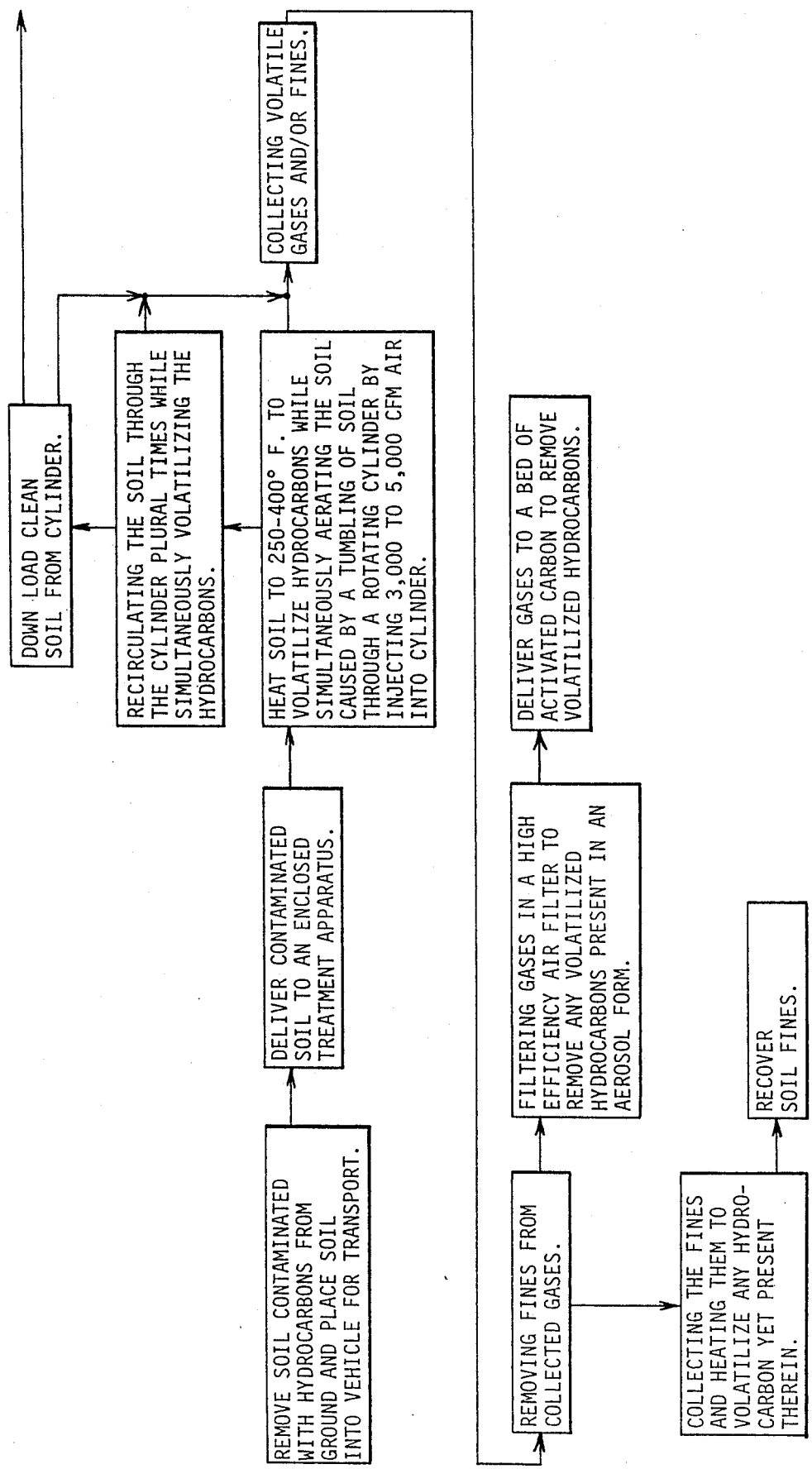
FIG. 24 is a flow chart of inventive methodology employed in the eighth alternate embodiment.
Figure 25:
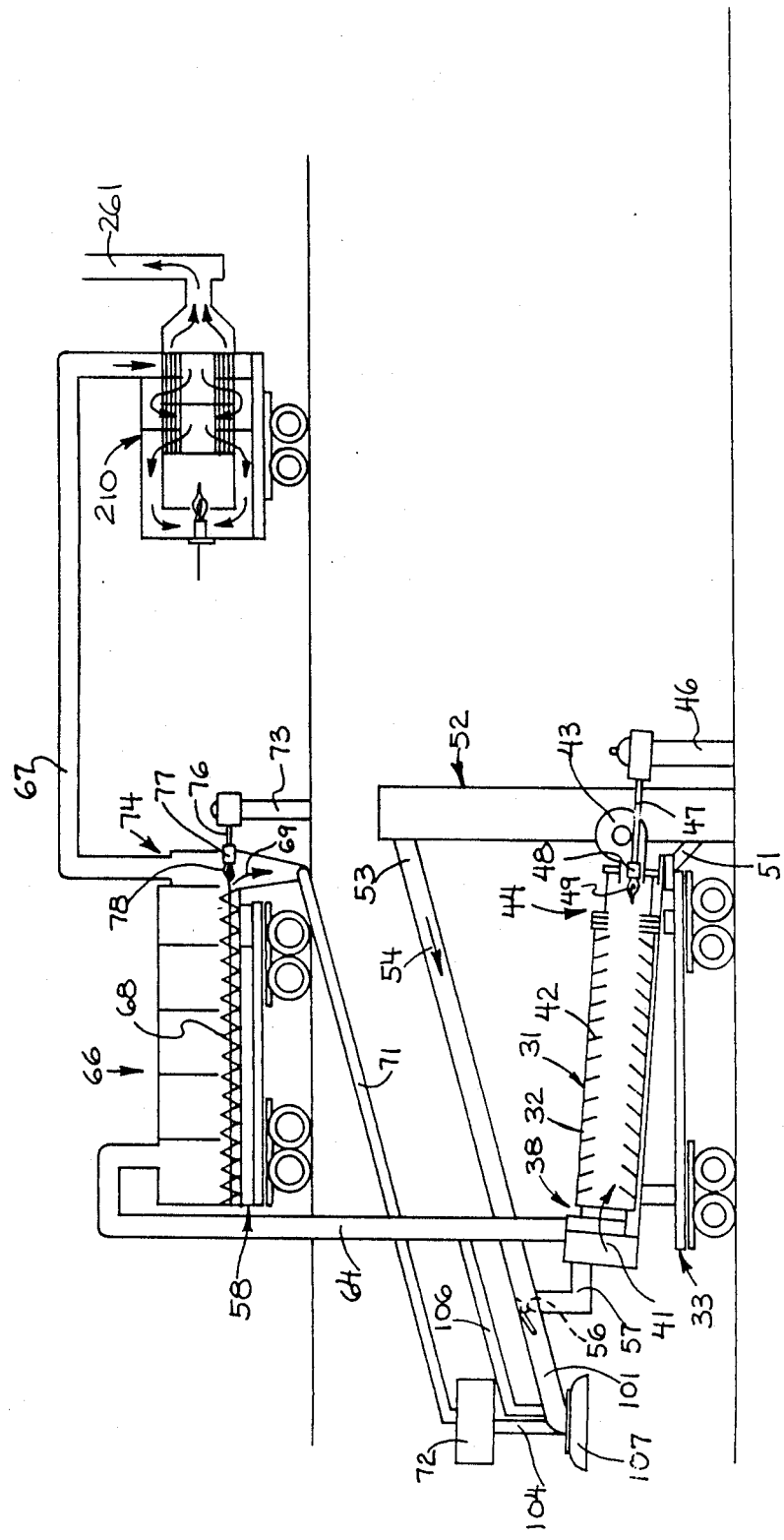
FIG. 25 is a side elevational view of a ninth alternate embodiment.
Figure 26:
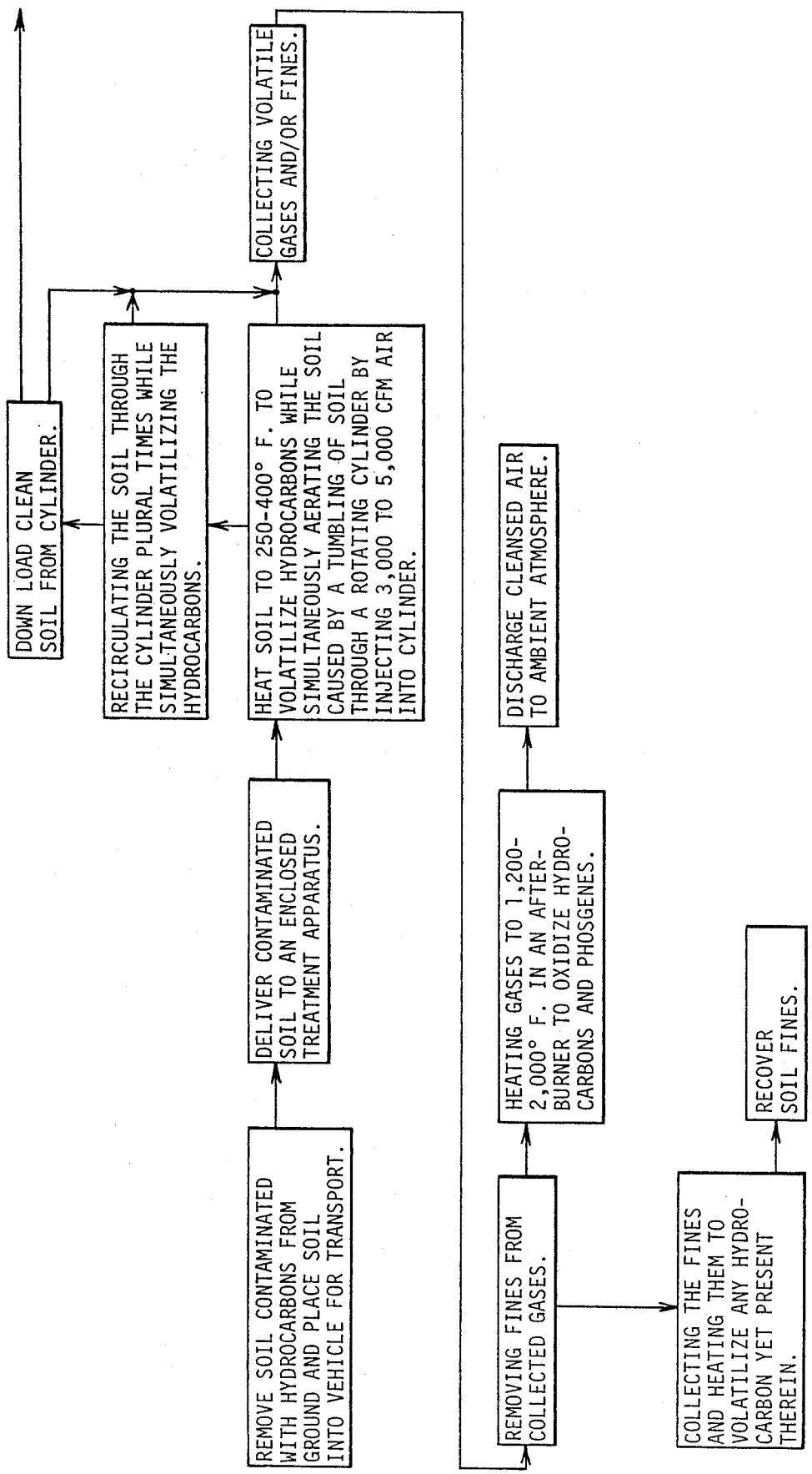
FIG. 26 is a flow chart of the inventive methodology employed in the ninth alternate embodiment.

This particular embodiment is similar in many respects to the embodiment described in FIGS. 21 and 22 above, except that an afterburner unit, identical to the afterburner unit 210 described in FIGS. 21 and 22, is instead connected in circuit between the outlet of the baghouse trailer unit 58 and the air scrubber trailer 59. Since the afterburner unit 210 is identical to the afterburner units described above, further discussion pertaining to same is deemed unnecessary. The afterburner unit is provided for the purpose of oxidizing the volatilized organics in the gas stream with a flame produced from a mixture of an atomized hydrocarbon liquid, or a hydrocarbon gas, and excess air sufficient to expose the volatilized organics to a temperature and for a time span sufficient to completely oxidize the volatilized organics to non-toxic constituents.

If desired, the air scrubber trailer unit 59 can be replaced with the trailerized spray contractor 211 described above.

This embodiment provides for more efficient handling of fines in the exhaust gas stream than that provided in the fourth alternate embodiment, as soil fines are collected and handled in a dry form rather than a slurry. This embodiment is advantageous with respect to the ninth alternate embodiment as this embodiment is capable of handling soils contaminated by both halogenated and nonhalogenated organics. Soils with low to medium concentrations of fines may be successfully treated by this embodiment, and the embodiment offers full and final destruction of the organic compounds at the site where such destruction is required by agency order or judicial decree, or is warranted by cost requirements or socio-political considerations.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A method of on-site remedial soil restoration activity of a work site contaminated with volatile substances disposed at said site at an earlier time, which substances have soaked into said soil, the steps comprising:
    removing contaminated soil from the ground and transporting it to an initial feed hopper means;
    conveying said contaminated soil from said initial feed hopper means to an inlet and of the interior of a low temperature thermal treatment chamber with the soil mixing capability;
    exposing granules of the soil to the ambient temperature in the chamber which is sufficient to cause a volatilization of said volatile substances but insufficient to result in any significant incineration, thereby causing said volatile substances to be volatilized inside said chamber;
    evacuating the interior of said chamber by drawing hot gases and entrained soil fines containing the volatilized substances therefrom;
    following an exposing of the granules of the soil to the ambient temperature in said chamber, conveying the now cleansed said from said chamber to a selected location;
    extracting any organics, acids and phosgenes present in the gas stream containing the volatilized substances; and
    discharging the now clean gas stream into the ambient atmosphere.

2. The method according to claim 1, wherein said extracting step further includes a feeding of said gas stream containing said volatilized organics, acids, phosgenes, and soil fines to an afterburner for the purpose of oxidizing said volatilized substances in said gas stream with a flame produced from a mixture of an atomized hydrocarbon liquid, or a hydrocarbon gas, and excess air sufficient to expose said volatilized substances to a temperature and for a time span sufficient to completely oxidize said volatilized components to non-toxic constituents;
    feeding the gases produced by the afterburner and evacuated therefrom to a spray contactor, for the purpose of removing said soil fines, and any residual acids or phosgenes therefrom by combining said gas stream containing said soil fines, acids, or phosgenes with a liquid stream, and forcing intimate contact of said gas stream containing the said entrained soil fines, acids, or phosgenes with said liquid stream by increasing the kinetic energy of said mixture by passage through a restrictive throat and promoting significant contact between said gas stream containing the said soil fines, acids, or phosgenes and the liquid stream;

passing said mixture through an entrainment separator to de-entrain said liquid stream now containing said soil fines, acids, or phosgenes from said mixture and allow said gas stream and said liquid stream containing said soil fines, acids, or phosgenes to exit as separate streams; and filtering said liquid stream containing said soil fines, acids, or phosgenes for the purpose of removing said soil fines from said liquid stream by mechanical filtration, and recirculating said liquid stream to said spray contactor, periodically neutralizing said liquid stream with a caustic material to maintain pH in said liquid stream at a predetermined value.

3. The method according to claim 2, wherein said extracting step further includes a feeding of said gas stream to a cyclone separator for the purpose of removing at least a portion of the soil fines from said gas stream before any further treatment of said gas stream occurs.

4. The method according to claim 3, wherein said soil fines collected by said cyclone separator are heated with a flame to volatilize any residual organics therefrom.

5. The method according to claim 9, wherein said extracting step further includes an evacuating of said gas stream from said spray contactor to a baghouse, for the purpose of filtering any residual soil fines therein and allowing said gas stream and said soil fines removed therefrom to exit as separate streams.

6. The method according to claim 5, wherein said extracting step further includes a feeding of said gas stream to a cyclone separator for the purpose of removing at least a portion of the soil fines from said gas stream before any further treatment of said gas stream occurs.

7. The method according to claim 6, wherein said soil fines collected by said cyclone separator are heated with a flame to volatilize any residual organics therefrom.

8. The method according to claim 1, wherein said extracting step further includes a feeding of said gas stream containing said volatilized organics, acids, phosgenes, and soil fines to an afterburner for the purpose of oxidizing said volatilized substances in said gas stream with a flame produced from a mixture of an atomized hydrocarbon liquid, or a hydrocarbon gas, and excess air sufficient to expose said volatilized substances to a temperature and for a time span sufficient to completely oxidize said volatilized components to non-toxic constituents;

feeding the gases produced by the afterburner and evacuated therefrom to a spray contactor, for the purpose of removing said soil fines, and any residual acids or phosgenes therefrom by combining said gas stream containing said soil fines with a liquid stream, and forcing intimate contact of said gas stream and said liquid stream by spraying said liquid stream in a further chamber, where said gas stream containing said soil fines, acids, or phosgenes and said liquid stream are mixed thoroughly in said chamber, and said gas stream and said liquid now containing said soil fines, acids, or phosgenes are allowed to exit said chamber as separate streams;

passing said mixture through an entrainment separator to de-entrain said liquid stream now containing said soil fines, acids, or phosgenes from said mixture and allow said gas stream and said liquid stream containing said soil fines, acids, or phosgenes to exit as separate streams; and filtering said liquid stream containing said soil fines, acids, or phosgenes for the purpose of removing said soil fines from said liquid stream by mechanical filtration, and recirculating said liquid stream to said spray contactor, periodically neutralizing said liquid stream with a caustic material to maintain pH in said liquid stream at a predetermined value.

9. The method according to claim 8, wherein said extracting step further includes a feeding of said gas stream to a cyclone separator for the purpose of removing at least a portion of the soil fines from said gas stream before any further treatment of said gas stream occurs.

10. The method according to claim 9, wherein said soil fines collected by said cyclone separator are heated with a flame to volatilize any residual organics therefrom.

11. The method according to claim 5, wherein said extracting step further includes an evacuating of said gas stream from said further chamber to a baghouse, for the purpose of filtering any residual soil fines therein and allowing said gas stream and said soil fines removed therefrom to exit as separate streams.

12. The method according to claim 11, wherein said extracting step further includes a feeding of said gas stream to a cyclone separator for the purpose of removing at least a portion of the soil fines from said gas stream before any further treatment of said gas stream occurs.

13. The method according to claim 12, wherein said soil fines collected by said cyclone separator are heated with a flame to volatilize any residual organics therefrom.

14. The method according to claim 1, wherein said extracting step further includes a feeding of said gas stream containing said volatilized organics, acids, phosgenes, and soil fines to a spray contactor, for the purpose of removing said soil fines therefrom by combining said gas stream containing said soil fines, acids, and phosgenes with a liquid stream, and forcing intimate contact of said gas stream containing the said entrained soil fines, acids, and phosgenes with said liquid stream by increasing the kinetic energy of said mixture by passage through a restrictive throat and promoting significant contact between said gas stream containing the said soil fines, acids, and phosgenes and the liquid stream;

passing said mixture through an entrainment separator to de-entrain said liquid stream now containing said soil fines, acids, and phosgenes from said mixture and allow said gas stream and said liquid stream containing said soil fines, acids, and phosgenes to exit as separate streams;

filtering said liquid stream containing said soil fines, acids, phosgenes, and volatile organics for the purpose of removing said soil fines from said liquid stream by mechanical filtration, downloading, periodically, the liquid composition to a carbon unit to remove volatilized organics, acids, and phosgenes collected in the water, periodically neutralizing said liquid stream with a caustic material to maintain pH in said liquid stream at a predetermined value, and recirculating said liquid stream to said spray contactor;

heating said recovered soil fines from said filtration process with a flame to volatilize any residual organics therefrom;

discharging said gas from said spray contactor containing said volatilized organics to a high-efficiency air filter for the purpose of removing any volatilized organics present in an aerosol from therefrom, by passing said gas stream through a sub-micron-sized, extended medium, dry-type filter contained in a box enclosure, and having a minimum removal efficiency of 90 percent for 0.3 micronsized particulate; and discharging said gas stream containing any residual volatilized organics from said air filter to a carbon adsorption system, for the purpose of extracting the remaining volatilized organics therefrom, by diffusing said gas stream through granular activated carbon and promoting intimate contact between said gas stream and said granular activated carbon, thereby causing said volatilized organics to adsorb onto said granular activated carbon.

15. The method according to claim 14, wherein said extracting step further includes a feeding of said gas stream to a cyclone separator for the purpose of removing at least a portion of the soil fines from said gas stream before any further treatment of said gas stream occurs.

16. The method according to claim 15, wherein said soil fines collected by said cyclone separator are heated with a flame to volatilize any residual organics therefrom.

17. The method according to claim 1, wherein said extracting step further includes a feeding of said gas stream containing said volatilized organics, acids, phosgenes, and soil fines to a spray contactor, for the purpose of removing said soil fines therefrom by combining said gas stream containing said soil fines, acids, and phosgenes with a liquid stream, and forcing intimate contact of said gas stream and said liquid stream by spraying said liquid stream in a chamber, where said gas stream containing said soil fines, acids, and phosgenes and said liquid stream are mixed thoroughly in said chamber, and said gas stream and said liquid now containing said soil fines, acids, and phosgenes are allowed to exit said chamber as separate streams;

passing said mixture through an entrainment separator to de-entrain said liquid stream now containing said soil fines, acids, and phosgenes from said mixture and allow said gas stream and said liquid stream containing said soil fines, acids, and phosgenes to exit as separate streams;

filtering said liquid stream containing said soil fines, acids, phosgenes, and volatile organics for the purpose of removing said soil fines from said liquid stream by mechanical filtration, downloading, periodically, the liquid composition to a carbon unit to remove volatilized organics, acids, and phosgenes collected in the water, periodically neutralizing said liquid stream with a caustic material to maintain pH in said liquid stream at a predetermined value, and recirculating said liquid stream to said spray contactor;

heating said recovered soil fines from said filtration process with a flame to volatilize any residual organics therefrom;

discharging said gas from said spray contactor containing said volatilized organics to a high-efficiency air filter for the purpose of removing any volatilized organics present in an aerosol form therefrom, by passing said gas stream through a sub-micron-sized, extended medium, dry-type filter contained in a box enclosure, and having a minimum removal efficiency of 90 percent for 0.3 micron-sized particulate; and discharging said gas stream containing any residual volatilized organics from said air filter to a carbon adsorption system, for the purpose of extracting the remaining volatilized organics therefrom, by diffusing said gas stream through granular activated carbon and promoting intimate contact between said gas stream and said granular activated carbon, thereby causing said volatilized organics to adsorb onto said granular activated carbon.

18. The method according to claim 17, wherein said extracting step further includes a feeding of said gas stream to a cyclone separator for the purpose of removing at least a portion of the soil fines from said gas stream before any further treatment of said gas stream occurs.

19. The method according to claim 18, wherein said soil fines collected by said cyclone separator are heated with a flame to volatilize any residual organics therefrom.

20. The method according to claim 1, wherein said extracting step further includes a feeding of said gas stream containing said volatilized organics, acids, phosgenes, and soil fines to a spray contactor, for the purpose of removing said soil fines therefrom by combining said gas stream containing said soil fines, acids, and phosgenes with a liquid stream, and forcing intimate contact of said gas stream containing the said entrained soil fines, acids, and phosgenes with said liquid stream by increasing the kinetic energy of said mixture by passage through a restrictive throat and promoting significant contact between said gas stream containing the said soil fines, acids, and phosgenes and the liquid stream;

passing said mixture through an entrainment separator to de-entrain said liquid stream now containing said soil fines, acids, and phosgenes from said mixture and allow said gas stream and said liquid stream containing said soil fines, acids, and phosgenes to exit as separate streams;

filtering said liquid stream containing said soil fines, acids, phosgenes, and volatile organics for the purpose of removing said soil fines from said liquid stream by mechanical filtration, downloading, periodically, the liquid composition to a carbon unit to remove volatilized organics, acids, and phosgenes collected in the water, periodically neutralizing said liquid stream with a caustic material to maintain pH in said liquid stream at a predetermined value, and recirculating said liquid stream to said spray contactor;

heating said recovered soil fines from said filtration process with a flame to volatilize any residual organics therefrom; and evacuating said gas stream from said spray contactor to an afterburner for the purpose of oxidizing said volatilized organics in said gas stream with a flame produced from a mixture of an atomized hydrocarbon liquid, or a hydrocarbon gas, and excess air sufficient to expose said volatilized organics to a temperature and for a time span sufficient to completely oxidize said volatilized organics to non-toxic constituents.

21. The method according to claim 20, wherein said extracting step further includes a feeding of said gas stream to a cyclone separator for the purpose of removing at least a portion of the soil fines from said gas stream before any further treatment of said gas stream occurs.

22. The method according to claim 21, wherein said soil fines collected by said cyclone separator are heated with a flame to volatilize any residual organics therefrom.

23. The method according to claim 1, wherein said extracting step further includes a feeding of said gas stream containing said volatilized organics, acids, phosgenes, and soil fines to a spray contactor, for the purpose of removing said soil fines therefrom by combining said gas stream containing said soil fines, acids, and phosgenes with a liquid stream, and forcing intimate contact of said gas stream containing the said entrained soil fines, acids, and phosgenes with said liquid stream by increasing the kinetic energy of said mixture by passage through a restrictive throat and promoting significant contact between said gas stream containing the said soil fines, acids, and phosgenes and the liquid stream;

passing said mixture through an entrainment separator to de-entrain said liquid stream now containing said soil fines, acids, and phosgenes from said mixture and allow said gas stream and said liquid stream containing said soil fines, acids, and phosgenes to exit as separate streams;

filtering said liquid stream containing said soil fines, acids, phosgenes, and volatile organics for the purpose of removing said soil fines from said liquid stream by mechanical filtration, downloading, periodically, the liquid composition to a carbon unit to remove volatilized organics, acids, and phosgenes collected in the water, periodically neutralizing said liquid stream with a caustic material to maintain pH in said liquid stream at a predetermined value, and recirculating said liquid stream to said spray contactor;

heating said recovered soil fines from said filtration process with a flame to volatilize any residual organics therefrom; and discharging said gas stream containing said volatilized organics from said spray contactor to a carbon adsorption system, for the purpose of extracting the remaining volatilized organics therefrom, by diffusing said gas stream through granular activated carbon and promoting intimate contact between said gas stream and said granular activated carbon, thereby causing said volatilized organics to adsorb onto said granular activated carbon.

24. The method according to claim 23, wherein said extracting step further includes a feeding of said gas stream to a cyclone separator for the purpose of removing at least a portion of the soil fines from said gas stream before any further treatment of said gas stream occurs.

25. The method according to claim 24, wherein said soil fines collected by said cyclone separator are heated with a flame to volatilize any residual organics therefrom.

26. The method according to claim 1, wherein said extracting step further includes a feeding of said gas stream containing said volatilized organics, acids, phosgenes, and soil fines to a baghouse, for the purpose of filtering the soil fines therein and allowing said gas stream and said soil fines removed therefrom to exit as separate streams;

removing said soil fines from said baghouse and heating said soil fines with a flame to volatilize any residual organics therefrom;

feeding the baghouse gases evacuated therefrom to a spray contactor, for the purpose of removing said acids and phosgenes therefrom by combining said gas stream containing said acids and phosgenes with a liquid stream, and forcing intimate contact of said gas stream containing the said acids and phosgenes with said liquid stream by increasing the kinetic energy of said mixture by passage through a respective throat and promoting significant contact between said gas stream containing the said acids and phosgenes and the liquid stream;

passing said mixture through an entrainment separator to de-entrain said liquid stream now containing said acids and phosgenes from said mixture and allow said gas stream and said liquid stream containing said acids and phosgenes to exit as separate streams;

downloading, periodically, the liquid composition to a carbon unit to remove volatilized organics, acids, and phosgenes collected in the water, periodically neutralizing said liquid stream with a caustic material to maintain pH in said liquid stream at a predetermined value, and recirculating said liquid stream to said spray contactor;

evacuating said gas stream containing volatilized organics from said spray contactor to a high-efficiency air filter for the purpose of removing any volatilized organics present in an aerosol form therefrom by passing said gas stream through a sub-micron-sized, extended medium, dry-type filter contained in a box enclosure, and having a minimum removal efficiency of at least 90 percent for 0.3 micron-sized particulate; and feeding said gas stream evacuated from said air filter to a carbon adsorption system, for the purpose of extracting the remaining volatilized organics therefrom, by diffusing said gas stream through granular activated carbon and promoting intimate contact between said gas stream and said granular activated carbon, thereby causing said volatilized organics to adsorb on said granular activated carbon.

27. The method according to claim 26, wherein said extracting step further includes a feeding of said gas stream to a cyclone separator for the purpose of removing at least a portion of the soil fines from said gas stream before any further treatment of said gas stream occurs.

28. The method according to claim 27, wherein said soil fines collected by said cyclone separator are heated with a flame to volatilize any residual organics therefrom.

29. The method according to claim 1, wherein said extracting step further includes a feeding of said gas stream containing said volatilized organics, acids, phosgenes, and soil fines to a baghouse, for the purpose of filtering the soil fines therein and allowing said gas stream and said soil fines removed therefrom to exit as separate streams;

removing said soil fines from said baghouse and heating said soil fines with a flame to volatilize any residual organics therefrom;

feeding the baghouse gases evacuated therefrom to a spray contactor, for the purpose of removing said acids and phosgenes therefrom by combining said gas stream containing said acids and phosgenes with a liquid stream, and forcing intimate contact of said gas stream and said liquid stream by spraying said liquid stream in a chamber, where said gas stream containing said acids and phosgenes and said liquid stream are mixed thoroughly in said chamber therein, and said gas stream and said liquid now containing said acids and phosgenes are allowed to exit said chamber as separate streams;

passing said mixture through an entrainment separator to de-entrain said liquid stream now containing said acids and phosgenes from said mixture and allow said gas stream and said liquid stream containing said acids and phosgenes to exit as separate streams;

downloading, periodically, the liquid composition to a carbon unit to remove volatilized organics, acids, and phosgenes collected in the water, periodically neutralizing said liquid stream with a caustic material to maintain pH in said liquid stream at a predetermined value, and recirculating said liquid stream to said spray contactor; and evacuating said gas stream containing volatilized organics from said chamber to an afterburner for the purpose of oxidizing said volatilized organics in said gas stream with a flame produced from a mixture of an atomized hydrocarbon liquid, or a hydrocarbon gas, and excess air sufficient to expose said volatilized organics to a temperature and for a time span sufficient to completely oxidize said volatilized organics to non-toxic constituents.

30. The method according to claim 29, wherein said extracting step further includes a feeding of said gas stream to a cyclone separator for the purpose of removing at least a portion of the soil fines from said gas stream before any further treatment of said gas stream occurs.

31. The method according to claim 30, wherein said soil fines collected by said cyclone separator are heated with a flame to volatilize any residual organics therefrom.

32. The method according to claim 1, wherein said extracting step further includes a feeding of said gas stream containing said volatilized organics, acids, phosgenes, and soil fines to a baghouse, for the purpose of filtering the soil fines therein and allowing said gas stream and said soil fines removed therefrom to exit as separate streams;

removing said soil fines from said baghouse and heating said soil fines with a flame to volatilize any residual organics therefrom; and feeding said baghouse gases evacuated therefrom, containing said volatilized organics, acids, and phosgenes, to an afterburner, for the purpose of oxidizing said volatilized components in said gas stream with a flame produced from a mixture of an atomized hydrocarbon liquid, or a hydrocarbon gas, and excess air sufficient to expose the said volatilized components to a temperature and for a time span sufficient to completely oxidize said volatilized components to non-toxic constituents.

33. The method according to claim 32, wherein said extracting step further includes a feeding of said gas stream to a cyclone separator for the purpose of removing at least a portion of the soil fines from said gas stream before any further treatment of said gas stream occurs.

34. The method according to claim 33, wherein said soil fines collected by said cyclone separator are heated with a flame to volatilize any residual organics therefrom.

35. The method according to claim 1, wherein said extracting step further includes a feeding of said gas stream containing said volatilized organics, acids, phosgenes, and soil fines to a baghouse, for the purpose of filtering the soil fines therein and allowing said gas stream and said soil fines removed therefrom to exit as separate streams;

removing said soil fines from said baghouse and heating said soil fines with a flame to volatilize any residual organics therefrom;

feeding the said baghouse gases evacuated therefrom containing said acids, phosgenes, and volatilized organics to a high efficiency air filter for the purpose of removing any volatilized organics present in an aerosol form therefrom by passing said gas stream through sub-micron-sized, extended-medium, dry-type filter contained in a box enclosure, and having a minimum removal efficiency of 90 percent for 0.3 micron-sized particulate; and discharging said gas stream containing residual, volatilized organics from said air filter to a carbon adsorption system, for the purpose of extracting the remaining volatilized organics therefrom, by diffusing said gas stream through granular activated carbon and promoting intimate contact between said gas stream and said granular activated carbon, thereby causing said volatilized organics to adsorb onto said granular activated carbon.

36. The method according to claim 1, wherein said extracting step further includes a feeding of said gas stream containing said volatilized organics, acids, phosgenes, and soil fines to a baghouse, for the purpose of filtering the soil fines therein and allowing said gas stream and said soil fines removed therefrom to exit as separate streams;

removing said soil fines from said baghouse and heating said soil fines with a flame to volatilize any residual organics therefrom;

feeding said baghouse gases evacuated therefrom, containing said volatilized organics, acids, and phosgenes, to an afterburner, for the purpose of oxidizing said volatilized components in said gas stream with a flame produced from a mixture of an atomized hydrocarbon liquid, or a hydrocarbon gas, and excess air sufficient to expose the said volatilized components to a temperature and for a time span sufficient to completely oxidize said volatilized components to non-toxic constituents; and feeding the afterburner gases evacuated therefrom to a spray contactor, for the purpose of removing said acids and phosgenes therefrom by combining said gas stream containing said acids and phosgenes with a liquid stream, and forcing intimate contact of said gas stream and said liquid stream by spraying said liquid stream in a chamber, where said gas stream containing said acids and phosgenes and said liquid stream are mixed thoroughly in said chamber therein, and said gas stream and said liquid now containing said acid and phosgenes are allowed to exit said chamber as separate streams.

37. An apparatus for on-site remedial soil restoration activity of a work site contaminated with volatile substances disposed at said site at an earlier time, which substances have soaked into said soil, comprising:
an initial feed hopper means;
a low temperature thermal treatment chamber means adapted to receive contaminated soil at an inlet end and having heating means for heating said contaminated soil to an ambient temperature which is sufficient to cause a volatilization of said volatile substances but insufficient to result in any significant incineration;
first means for conveying said contaminated soil from said initial feed hopper means to said inlet end of the interior of said low temperature thermal treatment chamber means;
soil mixing means in said low temperature thermal chamber means for exposing granules of the soil to the ambient temperature in said chamber, said volatile substances being volatilized inside said chamber;
evacuating means for evacuating the interior of said chamber by drawing hot gases and entrained soil fines containing the volatilized substances therefrom;
second means for conveying the now cleansed soil, following an exposing of the granules of the soil to the ambient temperature in said chamber, from said chamber to a selected location;
extracting means for extracting any organics, acids and phosgenes present in the gas stream containing the volatilized substances; and
discharging means for facilitating a discharging of the now clean gas stream into the ambient atmosphere.

38. The apparatus according to claim 37, wherein said extracting means further includes an afterburner means which has the ability of oxidizing said volatilized substances and a first feed means for feeding said gas stream containing said volatilized organics, acids, phosgenes, and soil fines to said afterburner for the purpose of oxidizing said volatilized substances in said gas stream with a flame produced from a mixture of an atomized hydrocarbon liquid, or a hydrocarbon gas, and excess air sufficient to expose said volatilized substances to a temperature and for a time span sufficient to completely oxidize said volatilized components to non-toxic constituents;
wherein a spray contactor is provided for the purpose of removing said soil fines, and any residual acids or phosgenes from said gas stream by combining said gas stream containing said soil fines, acids, or phosgenes with a liquid stream, and forcing intimate contact of said gas stream containing the said entrained soil fines, acids, or phosgenes with said liquid stream by increasing the kinetic energy of said mixture by passage through a restrictive throat and promoting significant contact between said gas stream containing the said soil fines, acids, or phosgenes and the liquid stream;
second feed means for feeding gases produced by said afterburner to said spray contactor;
wherein an entrainment separator means is provided for de-entraining said liquid stream now containing said soil fines, acids, or phosgenes from said mixture and allow said gas stream and said liquid stream containing said soil fines, acids, or phosgenes to exit as separate streams;
third feed means for passing said mixture through said entrainment separator means; and
filtering means for filtering said liquid stream containing said soil fines, acids, or phosgenes for the purpose of removing said soil fines from said liquid stream, and recirculating said liquid stream to said spray contactor, periodically neutralizing said liquid stream with a caustic material to maintain pH in said liquid stream at a predetermined value.

39. The apparatus according to claim 38, wherein said extracting means further includes a cyclone separator means which has the ability of removing soil fines from said gas stream and a fourth feed means for feeding said gas stream to said cyclone separator for the purpose of removing at least a portion of the soil fines from said gas stream before any further treatment of said gas stream occurs.

40. The apparatus according to claim 39, wherein a flame generating means is provided for heating said soil fines collected by said cyclone separator with a flame to volatilize any residual organics therefrom.

41. The apparatus according to claim 38, wherein said extracting means further includes a baghouse means which has the ability of filtering residual soil fines from said gas stream and fourth feed means for facilitating an evacuating of said gas stream from said spray contactor means to said baghouse means, for the purpose of filtering any residual soil fines therein and allowing said gas stream and said soil fines removed therefrom to exit as separate streams.

42. The apparatus according to claim 41, wherein said extracting means further includes a cyclone separator means which has the ability of removing soil fines from said gas stream and a fifth feed means for feeding said gas stream to said cyclone separator for the purpose of removing at least a portion of the soil fines from said gas stream before, any further treatment of said gas stream occurs.

43. The apparatus according to claim 42, wherein a flame generating means is provided for heating said soil fines collected by said cyclone separator with a flame to volatilize any residual organics therefrom.

44. The apparatus according to claim 37, wherein said extracting means further includes an afterburner means which has the ability of oxidizing said volatilized substances and a first feed means for feeding said gas stream containing said volatilized organics, acids, phosgenes, and soil fines to said afterburner for the purpose of oxidizing said volatilized substances in said gas stream with a flame produced from a mixture of an atomized hydrocarbon liquid, or a hydrocarbon gas, and excess air sufficient to expose said volatilized substances to a temperature and for a time span sufficient to completely oxidize said volatilized components to non-toxic constituents;
wherein a spray contactor is provided for the purpose of removing said soil fines, and any residual acids or phosgenes from said gas stream by combining said gas stream containing said soil fines with a liquid stream, and forcing intimate contact of said gas stream and said liquid stream by spraying said liquid stream in a further chamber, where said gas stream containing said soil fines, acids, or phosgenes and said liquid stream are mixed thoroughly in said chamber, and said gas stream and said liquid now containing said soil fines, acids, or phosgenes are allowed to exit said chamber as separate streams;

second feed means for feeding gases produced by said afterburner to said spray contactor;

wherein an entrainment separator means is provided for de-entraining said liquid stream now containing said soil fines, acids, or phosgenes from said mixture and allow said gas stream and said liquid stream containing said soil fines, acids, or phosgenes to exit as separate streams;

third feed means for passing said mixture through said entrainment separator means; and filtering means for filtering said liquid stream containing said soil fines, acids, or phosgenes for the purpose of removing said soil fines from said liquid stream, and recirculating said liquid stream to said spray contactor, periodically neutralizing said liquid stream with a caustic material to maintain pH in said liquid stream at a predetermined value.

45. The apparatus according to claim 44, wherein said extracting means further includes a cyclone separator means which has the ability of removing soil fines from said gas stream and a fourth feed means for feeding said gas stream to said cyclone separator for the purpose of removing at least a portion of the soil fines from said gas stream before any further treatment of said gas stream occurs.

46. The apparatus according to claim 45, wherein a flame generating means is provided for heating said soil fines collected by said cyclone separator with a flame to volatilize any residual organics therefrom.

47. The apparatus according to claim 41, wherein said extracting means further includes a baghouse means which has the ability of filtering residual soil fines from said gas stream and fourth feed means for facilitating an evacuating of said gas stream from said spray contactor means to said baghouse means, for the purpose of filtering any residual soil fines therein and allowing said gas stream and said soil fines removed therefrom to exit as separate streams.

48. The apparatus according to claim 47, wherein said extracting means further includes a cyclone separator means which has the ability of removing soil fines from said gas stream and a fourth feed means for feeding said gas stream to said cyclone separator for the purpose of removing at least a portion of the soil fines from said gas stream before any further treatment of said gas stream occurs.

49. The apparatus according to claim 48, wherein said extracting means further includes a cyclone separator means which has the ability of removing soil fines from said gas stream and a fourth feed means for feeding said gas stream to said cyclone separator for the purpose of removing at least a portion of the soil fines from said gas stream before any further treatment of said gas stream occurs.

50. The apparatus according to claim 37, wherein said extracting step further includes a spray contactor for the purpose of removing said soil fines from said gas stream by combining said gas stream containing said soil fines acids, and phosgenes with a liquid stream, and forcing intimate contact of said gas stream containing the said entrained soil fines, acids, and phosgenes with said liquid stream by increasing the kinetic energy of said mixture by passage through a restrictive throat and promoting significant contact between said gas stream containing the said soil fines, acids, and phosgenes and the liquid stream;

an entrainment separator means for de-entraining said liquid stream now containing said soil fines, acids, and phosgenes from said mixture and allow said gas stream and said liquid stream containing said soil fines, acids, and phosgenes to exit as separate streams;

filtering means for filtering said liquid stream containing said soil fines, acids, phosgenes, and volatile organics for the purpose of removing said soil fines from said liquid stream, downloading, periodically, the liquid composition to a carbon unit to remove volatilized organics, acids, and phosgenes collected in the water, periodically neutralizing said liquid stream with a caustic material to maintain pH in said liquid stream at a predetermined value, and recirculating said liquid stream to said spray contactor;

a flame generating means for heating said recovered soil fines from said filtration process with a flame to volatilize any residual organics therefrom;

first passage means for facilitating a discharging of said gas from said spray contactor containing said volatilized organics to a high-efficiency air filter for the purpose of removing any volatilized organics present in an aerosol form therefrom, by passing said gas stream through a sub-micron-sized, extended medium, dry-type filter contained in a box enclosure, and having a minimum removal efficiency of 90 percent for 0.3 micron-sized particulate; and second passage means for facilitating a discharging of said gas stream containing any residual volatilized organics from said air filter to a carbon adsorption system, for the purpose of extracting the remaining volatilized organics therefrom, by diffusing said gas stream through granular activated carbon and promoting intimate contact between said gas stream and said granular activated carbon, thereby causing said volatilized organics to adsorb onto said granular activated carbon.

51. The apparatus according to claim 50, wherein said extracting means further includes a cyclone separator means which has the ability of removing soil fines from said gas stream and a third passage means for feeding said gas stream to said cyclone separator for the purpose of removing at least a portion of the soil fines from said gas stream before any further treatment of said gas stream occurs.

52. The apparatus according to claim 51, wherein a flame generating means is provided for heating said soil fines collected by said cyclone separator with a flame to volatilize any residual organics therefrom.

53. The apparatus according to claim 37, wherein said extracting step further includes a spray contactor for the purpose of removing said soil fines from said gas stream by combining said gas stream containing said soil fines, acids, and phosgenes with a liquid stream, and forcing intimate contact of said gas stream and said liquid stream by spraying said liquid stream in a chamber, where said gas stream containing said soil fines, acids, and phosgenes and said liquid stream are mixed thoroughly in said chamber, and said gas stream and said liquid now containing said soil fines, acids, and phosgenes are allowed to exit said chamber as separate streams;

an entrainment separator means for de-entraining said liquid stream now containing said soil fines, acids, and phosgenes from said mixture and allow said gas stream and said liquid stream containing said soil fines, acids, and phosgenes to exit as separate streams;

filtering means for filtering said liquid stream containing said soil fines, acids, phosgenes, and volatile organics for the purpose of removing said soil fines from said liquid stream, downloading, periodically, the liquid composition to a carbon unit to remove volatilized organics, acids, and phosgenes collected in the water, periodically neutralizing said liquid stream with a caustic material to maintain pH in said liquid stream at a predetermined value, and recirculating said liquid stream to said spray contactor;

a flame generating means for heating said recovered soil fines from said filtration process with a flame to volatilize any residual organics therefrom;

first passage means for facilitating a discharging of said gas from said spray contactor containing said volatilized organics to a high-efficiency air filter for the purpose of removing any volatilized organics present in an aerosol form therefrom, by passing said gas stream through a sub-micron-sized, extended medium, dry-type filter contained in a box enclosure, and having a minimum removal efficiency of 90 percent for 0.3 micron-sized particulate; and second passage means for facilitating a discharging of said gas stream containing any residual volatilized organics from said air filter to a carbon adsorption system, for the purpose of extracting the remaining volatilized organics therefrom, by diffusing said gas stream through granular activated carbon and promoting intimate contact between said gas stream and said granular activated carbon, thereby causing said volatilized organics to adsorb onto said granular activated carbon.

54. The apparatus according to claim 53, wherein said extracting means further includes a cyclone separator means which has the ability of removing soil fines from said gas stream and a third passage means for feeding said gas stream to said cyclone separator for the purpose of removing at least a portion of the soil fines from said gas stream before any further treatment of said gas stream occurs.

55. The apparatus according to claim 54, wherein a flame generating means is provided for heating said soil fines collected by said cyclone separator with a flame to volatilize any residual organics therefrom.

56. The apparatus according to claim 37, wherein said extracting step further includes a spray contactor for the purpose of removing said soil fines from said gas stream by combining said gas stream containing said soil fines, acids, and phosgenes with a liquid stream, and forcing intimate contact of said gas stream containing the said entrained soil fines, acids, and phosgenes with said liquid stream by increasing the kinetic energy of said mixture by passage through a restrictive throat and promoting significant contact between said gas stream containing the said soil fines, acids, and phosgenes and the liquid stream;

passing said mixture through an entrainment separator to de-entrain said liquid stream now containing said soil fines, acids, and phosgenes from said mixture and allow said gas stream and said liquid stream containing said soil fines, acids, and phosgenes to exit as separate streams;

filtering said liquid stream containing said soil fines, acids, phosgenes, and volatile organics for the purpose of removing said soil fines from said liquid stream by mechanical filtration, downloading, periodically, the liquid composition to a carbon unit to remove volatilized organics, acids, and phosgenes collected in the water, periodically neutralizing said liquid stream with a caustic material to maintain pH in said liquid stream at a predetermined value, and recirculating said liquid stream to said spray contactor;

heating said recovered soil fines from said filtration process with a flame to volatilize any residual organics therefrom;

an afterburner means which has the ability of oxidizing said volatilized organics; and evacuating means for evacuating said gas stream from said spray contactor to said afterburner for the purpose of oxidizing said volatilized organics in said gas stream with a flame produced from a mixture of an atomized hydrocarbon liquid, or a hydrocarbon gas, and excess air sufficient to expose said volatilized organics to a temperature and for a time span sufficient to completely oxidize said volatilized organics to non-toxic constituents.

57. The apparatus according to claim 56, wherein said extracting means further includes a cyclone separator means which has the ability of removing soil fines from said gas stream and a third passage means for feeding said gas stream to said cyclone separator for the purpose of removing at least a portion of the soil fines from said gas stream before any further treatment of said gas stream occurs.

58. The apparatus according to claim 57, wherein a flame generating means is provided for heating said soil fines collected by said cyclone separator with a flame to volatilize any residual organics therefrom.

59. The apparatus according to claim 37, wherein said extracting step further includes a spray contactor for the purpose of removing said soil fines from said gas stream by combining said gas stream containing said soil fines, acids, and phosgenes with a liquid stream, and forcing intimate contact of said gas stream containing the said entrained soil fines, acids, and phosgenes with said liquid stream by increasing the kinetic energy of said mixture by passage through a restrictive throat and promoting significant contact between said gas stream containing the said soil fines, acids, and phosgenes and the liquid stream;

an entrainment separator means for de-entraining said liquid stream now containing said soil fines, acids, and phosgenes from said mixture and allow said gas stream and said liquid stream containing said soil fines, acids, and phosgenes to exit as separate streams;

filtering means for filtering said liquid stream containing said soil fines, acids, phosgenes, and volatile organics for the purpose of removing said soil fines from said liquid stream, downloading, periodically, the liquid composition to a carbon unit to remove volatilized organics, acids, and phosgenes collected in the water, periodically neutralizing said liquid stream with a caustic material to maintain pH in said liquid stream at a predetermined value, and recirculating said liquid stream to said spray contactor;

a flame generating means for heating said recovered soil fines from said filtration process with a flame to volatilize any residual organics therefrom; and first passage means for facilitating a discharging of said gas stream containing said volatilized organics from said spray contactor to a carbon adsorption system, for the purpose of extracting the remaining volatilized organics therefrom, by diffusing said gas stream through granular activated carbon and promoting intimate contact between said gas stream and said granular activated carbon, thereby causing said volatilized organics to adsorb onto said granular activated carbon.

60. The apparatus according to claim 59, wherein said extracting means further includes a cyclone separator means which has the ability of removing soil fines from said gas stream to said cyclone separator for the purpose of removing at least a portion of the soil fines from said gas stream before any further treatment of said gas stream occurs.

61. The apparatus according to claim 60, wherein a flame generating means is provided for heating said soil fines collected by said cyclone separator with a flame to volatilize any residual organics therefrom.

62. The apparatus according to claim 37, wherein said extracting step further includes a baghouse for filtering soil fines from said gas stream and a first feed means for a feeding of said gas stream containing said volatilized organics, acids, phosgenes, and soil fines to a baghouse, for the purpose of filtering the soil fines therein and allowing said gas stream and said soil fines removed therefrom to exit as separate streams;

means for removing said soil fines from said baghouse;

a flame generating means for heating said soil fines with a flame to volatilize any residual organics therefrom;

a spray contactor for removing said acids and phosgenes from said gas stream by combining said gas stream containing said acids and phosgenes with a liquid stream, and forcing intimate contact of said gas stream containing the said acids and phosgenes with said liquid stream by increasing the kinetic energy of said mixture by passage through a respective throat and promoting significant contact between said gas stream containing the said acids and phosgenes and the liquid stream;

an entrainment separator for de-entraining said liquid stream now containing said acids and phosgenes from said mixture and allow said gas stream and said liquid stream containing said acids and phosgenes to exit as separate streams and facilitating to a carbon unit to remove volatilized organics, acids, and phosgenes collected in the water, periodically neutralizing said liquid stream with a caustic material to maintain pH in said liquid stream at a predetermined value, and recirculating said liquid stream to said spray contactor;

a high-efficiency air filter for the purpose of removing any volatilized organics present in an aerosol form from said gas stream from said spray contactor by passing said gas stream through a submicron-sized, extended medium, dry-type filter contained in a box enclosure, and having a minimum removal efficiency of at least 90 percent for 0.3 micron-sized particulate; and a carbon adsorption system and feed means for feeding said gas stream evacuated from said air filter to said carbon adsorption system for the purpose of extracting the remaining volatilized organics therefrom, by diffusing said gas stream through granular activated carbon and promoting intimate contact between said gas stream and said granular activated carbon, thereby causing said volatilized organics to adsorb on said granular activated carbon.

63. The apparatus according to claim 62, wherein said extracting means further includes a cyclone separator means which has the ability of removing soil fines from said gas stream and a third passage means for feeding said gas stream to said cyclone separator for the purpose of removing at least a portion of the soil fines from said gas stream before any further treatment of said gas stream occurs.

64. The apparatus according to claim 63, wherein a flame generating means is provided for heating said soil fines collected by said cyclone separator with a flame to volatilize any residual organics therefrom.

65. The apparatus according to claim 37, wherein said extracting step further includes a baghouse for filtering soil fines from said gas stream and a first feed means for a feeding of said gas stream containing said volatilized organics, acids, phosgenes, and soil fines to a baghouse, for the purpose of filtering the soil fines therein and allowing said gas stream and said soil fines removed therefrom to exit as separate streams;

means for removing said soil fines from said baghouse;

a flame generating means for heating said soil fines with a flame to volatilize any residual organics therefrom;

a spray contactor for removing said acids and phosgenes from said gas stream by combining said gas stream containing said acids and phosgenes with a liquid stream, and forcing intimate contact of said gas stream containing the said acids and phosgenes with said liquid stream by increasing the kinetic energy of said mixture by passage through a respective throat and promoting significant contact between said gas stream containing the said acids and phosgenes and the liquid stream;

an entrainment separator for de-entraining said liquid stream now containing said acids and phosgenes from said mixture and allow said gas stream and said liquid stream containing said acids and phosgenes to exit as separate streams and facilitating a downloading, periodically, of the liquid composition to a carbon unit to remove volatilized organics, acids, and phosgenes collected in the water, periodically neutralizing said liquid stream with a caustic material to maintain pH in said liquid stream at a predetermined value, and recirculating said liquid stream to said spray contactor;

a high-efficiency air filter for the purpose of removing any volatilized organics present in an aerosol form from said gas stream from said spray contactor by passing said gas stream through a submicron-sized, extended medium, dry-type filter contained in a box enclosure, and having a minimum removal efficiency of at least 90 percent for 0.3 micron-sized particulate; and an afterburner means for oxidizing said volatilized organics in said gas stream from said chamber with a flame produced from a mixture of an atomized hydrocarbon liquid, or a hydrocarbon gas, and excess air sufficient to expose said volatilized organics to a temperature and for a time span sufficient to completely oxidize said volatilized organics to non-toxic constituents.

66. The apparatus according to claim 65, wherein said extracting means further includes a cyclone separator means which has the ability of removing soil fines from said gas stream and a third passage means for feeding said gas stream to said cyclone separator for the purpose of removing at least a portion of the soil fines from said gas stream before any further treatment of said gas stream occurs.

67. The apparatus according to claim 66, wherein a flame generating means is provided for heating said soil fines collected by said cyclone separator with a flame to volatilize any residual organics therefrom.

68. The apparatus according to claim 37, wherein said extracting step further includes a baghouse for filtering soil fines from said gas stream and a first feed means for a feeding of said gas stream containing said volatilized organics, acids, phosgenes, and soil fines to a baghouse, for the purpose of filtering the soil fines therein and allowing said gas stream and said soil fines removed therefrom to exit as separate streams;

means for removing said soil fines from said baghouse;

a flame generating means for heating said soil fines with a flame to volatilize any residual organics therefrom; and an afterburner means for oxidizing said volatilized components in said gas stream from said baghouse with a flame produced from a mixture of an atomized hydrocarbon liquid, or a hydrocarbon gas, and excess air sufficient to expose the said volatilized components to a temperature and for a time span sufficient to completely oxidize said volatilized components to non-toxic constituents.

69. The apparatus according to claim 68, wherein said extracting means further includes a cyclone separator means which has the ability of removing soil fines from said gas stream and a third passage means for feeding said gas stream to said cyclone separator for the purpose of removing at least a portion of the soil fines from said gas stream before any further treatment of said gas stream occurs.

70. The apparatus according to claim 69, wherein a flame generating means is provided for heating said soil fines collected by said cyclone separator with a flame to volatilize any residual organics therefrom.

71. The apparatus according to claim 37, wherein said extracting step further includes a baghouse for filtering soil fines from said gas stream and a first feed means for a feeding of said gas stream containing said volatilized organics, acids, phosgenes, and soil fines to a baghouse, for the purpose of filtering the soil fines therein and allowing said gas stream and said soil fines removed therefrom to exit as separate streams;

means for removing said soil fines from said baghouse;

a flame generating means for heating said soil fines with a flame to volatilize any residual organics therefrom;

a high efficiency air filter for removing any volatilized organics present in an aerosol form from said baghouse by passing said gas stream through submicronsized, extended-medium, dry-type filter contained in a box enclosure, and having a minimum removal efficiency of 90 percent for 0.3 micron-sized particulate; and a carbon adsorption system for extracting the remaining volatilized organics from said air filter, by diffusing said gas stream through granular activated carbon and promoting intimate contact between said gas stream and said granular activated carbon, thereby causing said volatilized organics to adsorb onto said granular activated carbon.

72. The apparatus according to claim 37, wherein said extracting step further includes a baghouse for filtering soil fines from said gas stream and a first feed means for a feeding of said gas stream containing said volatilized organics, acids, phosgenes, and soil fines to a baghouse, for the purpose of filtering the soil fines therein and allowing said gas stream and said soil fines removed therefrom to exit as separate streams;

means for removing said soil fines from said baghouse;

a flame generating means for heating said soil fines with a flame to volatilize any residual organics therefrom;

an afterburner means, for oxidizing said volatilized components in said gas stream from said baghouse with a flame produced from a mixture of an atomized hydrocarbon liquid, or a hydrocarbon gas, and excess air sufficient to expose the said volatilized components to a temperature and for a time span sufficient to completely oxidize said volatilized components to non-toxic constituents; and a spray contactor for removing said acids and phosgenes therefrom by combining said gas stream from said afterburner containing said acids and phosgenes with a liquid stream, and forcing intimate contact of said gas stream and said liquid stream by spraying said liquid stream in a chamber, where said gas stream containing said acids and phosgenes and said liquid stream are mixed thoroughly in said chamber therein, and said gas stream and said liquid now containing said acid and phosgenes are allowed to exit said chamber as separate streams.

* * * * *

UNITED STATES PATENT AND TRADEMARK OFFICE
CERTIFICATE OF CORRECTION

PATENT NO. : 4,951,417

DATED : August 28, 1990

INVENTOR(S) : Steven L. Gerken et al.

It is certified that error appears in the above-identified patent and that said Letters Patent is hereby corrected as shown below:

Column 28, line 31; change "and" to ---end---.

line 33; delete "the".

line 45; change "said" (first occurrence) to ---soil---.

Column 29, line 31; change "claim 9" to ---claim 2---.

Column 31, line 12; change "from" to ---form---.

Column 38, line 40; delete ",".

Column 39, line 63; after "fines" insert ---,---.

Column 43; line 17; after "stream" insert ---and a third passage means for feeding said gas stream---.

line 52; after "facilitating" insert ---a downloading, periodically, of the liquid composition---.

Signed and Sealed this

Tenth Day of December, 1991

Attest:

HARRY F. MANBECK, JR.

*Attesting Officer*  *Commissioner of Patents and Trademarks*